(12) United States Patent  
Fox, Jr.

(10) Patent No.: US 12,545,405 B2  
(45) Date of Patent: Feb. 10, 2026

(54) AERIAL DELIVERY PLATFORM TO PAYLOAD ADAPTER

(71) Applicant: Roy L. Fox, Jr., Yuma, AZ (US)

(72) Inventor: Roy L. Fox, Jr., Yuma, AZ (US)

(*) Notice: Subject to any disclaimer, the term of this patent is extended or adjusted under 35 U.S.C. 154(b) by 0 days.

(21) Appl. No.: 18/917,203

(22) Filed: Oct. 16, 2024

(65) Prior Publication Data

US 2025/0128812 A1   Apr. 24, 2025

Related U.S. Application Data

(60) Provisional application No. 63/631,615, filed on Apr. 9, 2024, provisional application No. 63/591,225, filed on Oct. 18, 2023.

(51) Int. Cl.
*B64D 1/12* (2006.01)
*B64D 17/24* (2006.01)

(52) U.S. Cl.
CPC ............... *B64D 1/12* (2013.01); *B64D 17/24* (2013.01)

(58) Field of Classification Search
CPC ... B64D 1/12; B64D 1/08; B64D 1/10; B64D 1/22; B64D 17/24; B64C 1/20; B65D 19/00273; B65D 19/0002; B65D 19/38; B65D 19/00786
USPC .............. 108/55.1, 55.3, 55.5, 57.2, 57.29; 410/46, 77; 248/346.02, 346.01; 244/137.3, 137.4, 151 A, 151 B
See application file for complete search history.

(56) References Cited

U.S. PATENT DOCUMENTS

| | | | | |
|---|---|---|---|---|
| 3,093,092 A | * | 6/1963 | Martin | B64D 9/00 108/57.1 |
| 3,429,536 A | * | 2/1969 | Weingarten | B65D 88/14 248/346.02 |
| 3,478,995 A | * | 11/1969 | Lautzenhiser | B61D 45/001 410/104 |
| 4,095,769 A | * | 6/1978 | Fengels | B65D 19/0002 248/346.02 |
| 4,342,437 A | * | 8/1982 | Farinacci | B64D 1/08 244/149 |
| 5,505,140 A | * | 4/1996 | Wittmann | B65D 19/38 108/51.11 |
| 6,568,636 B2 | * | 5/2003 | Fitzgerald | B64D 9/003 108/55.1 |
| 8,083,184 B2 | * | 12/2011 | Fox, Jr. | B64D 1/12 244/152 |

(Continued)

*Primary Examiner* — Janet M Wilkens
(74) *Attorney, Agent, or Firm* — SNELL & WILMER L.L.P.

(57) ABSTRACT

An aerial delivery apparatus generally includes a platform and an adapter. The platform includes a panel extending laterally between and to a first side rail and a second side rail. The adapter is mounted to the platform and includes a plurality of anchor points whereby a parachute is configured to be attached to the platform. The adapter is configured to transfer parachute forces directly into the side rails of the platform. The adapter can be mounted to the side rails via a plurality of fittings that are mounted between the side rails and the adapter. The side rails can each define respective slots extending longitudinally along the respective side rail. The fitting can be configured to be received at least partially into the slot. Each fitting can include a first aperture defining a central axis extending laterally through the fitting whereby the fitting is secured to the side rail.

18 Claims, 54 Drawing Sheets

(56) References Cited

U.S. PATENT DOCUMENTS

| | | | | |
|---|---|---|---|---|
| 8,776,698 B2* | 7/2014 | Pherson | ............ | B65D 19/0004 |
| | | | | 108/57.25 |
| 2004/0108416 A1* | 6/2004 | Parkinson | ................ | B64D 9/00 |
| | | | | 244/137.4 |
| 2009/0205999 A1* | 8/2009 | Smith | .................... | B65D 19/40 |
| | | | | 108/55.5 |
| 2010/0140408 A1* | 6/2010 | Stabenau | ................ | F41H 5/013 |
| | | | | 244/131 |
| 2011/0240800 A1* | 10/2011 | Fox, Jr. | .................... | B64D 1/14 |
| | | | | 244/137.1 |
| 2012/0061519 A1* | 3/2012 | Fox, Jr. | .................... | B64D 1/08 |
| | | | | 244/137.3 |
| 2013/0193272 A1* | 8/2013 | Fox, Jr. | .................... | B64D 1/12 |
| | | | | 244/137.3 |
| 2016/0176524 A1* | 6/2016 | Fox, Jr. | .................... | B64D 1/12 |
| | | | | 244/137.3 |

\* cited by examiner

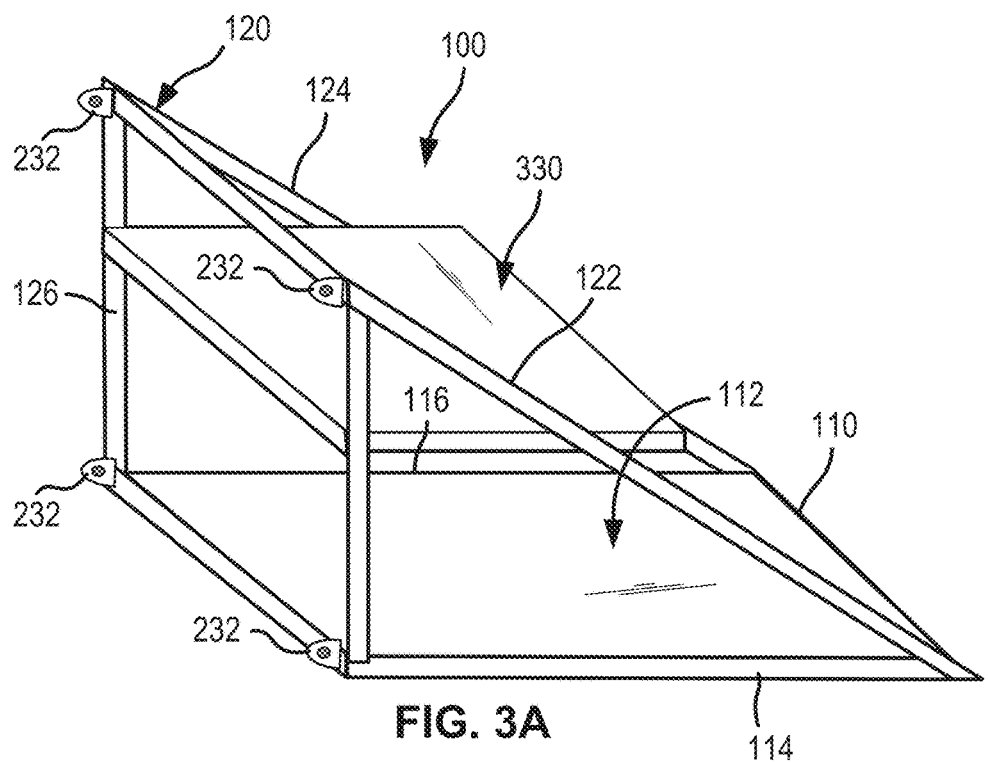
FIG. 3A
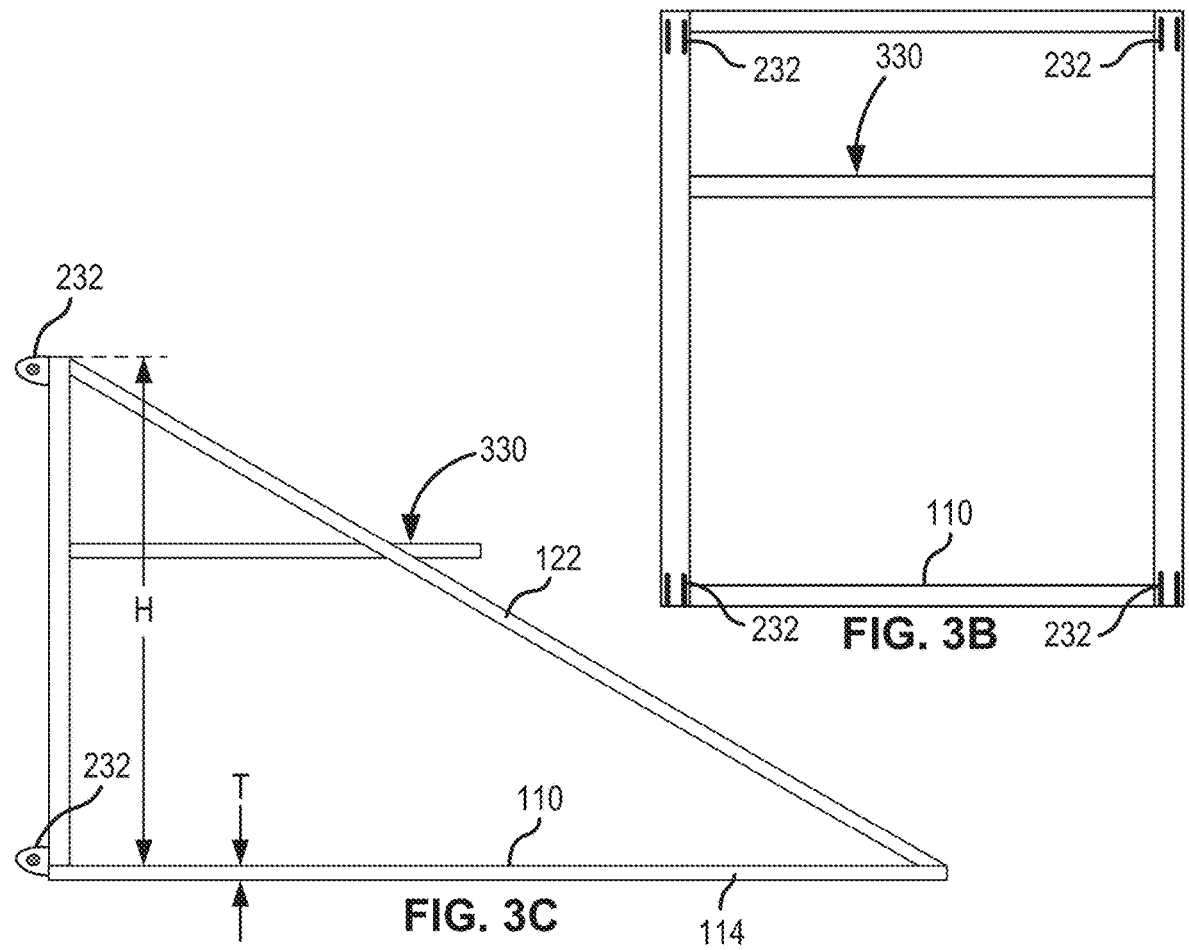
FIG. 3B
FIG. 3C

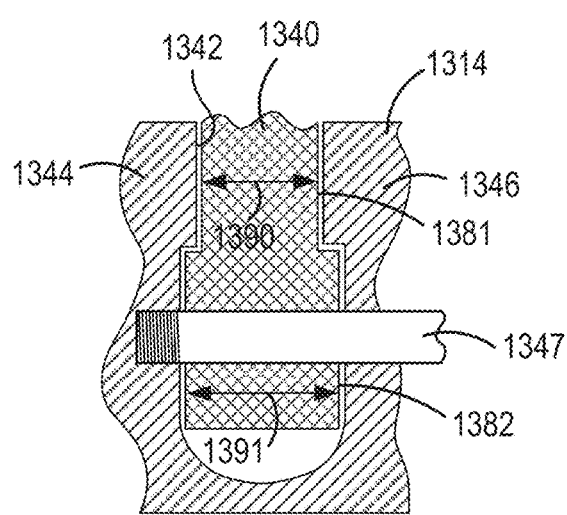
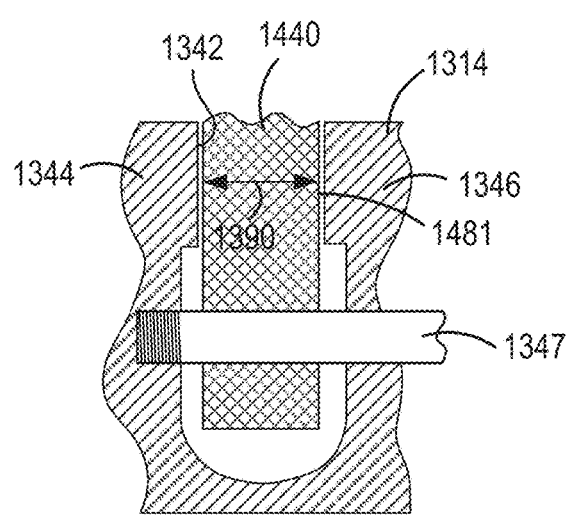
FIG. 13
FIG. 14

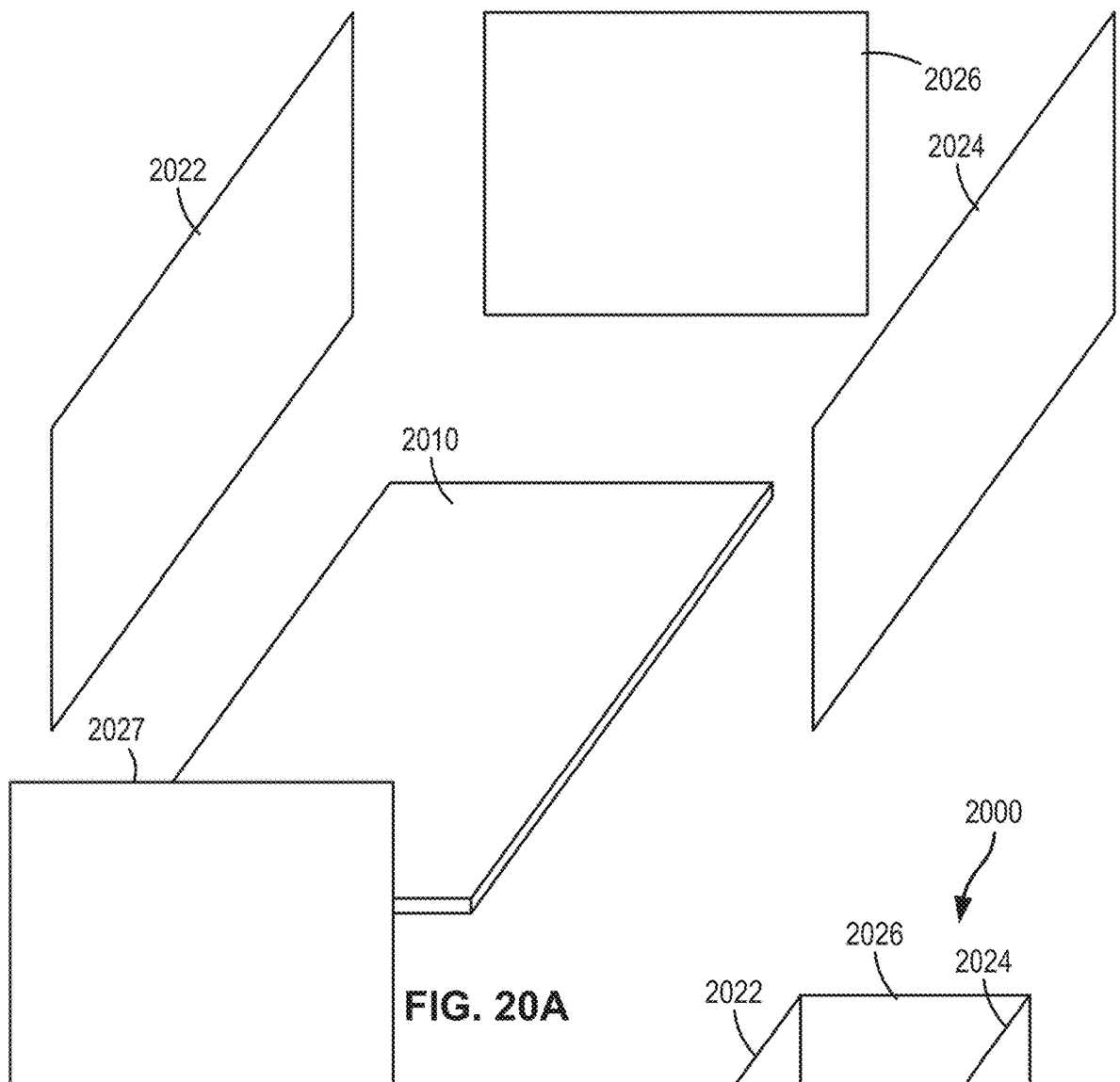
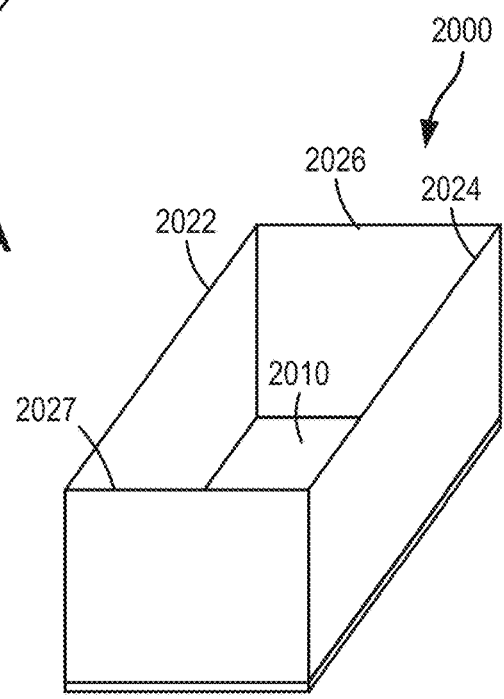

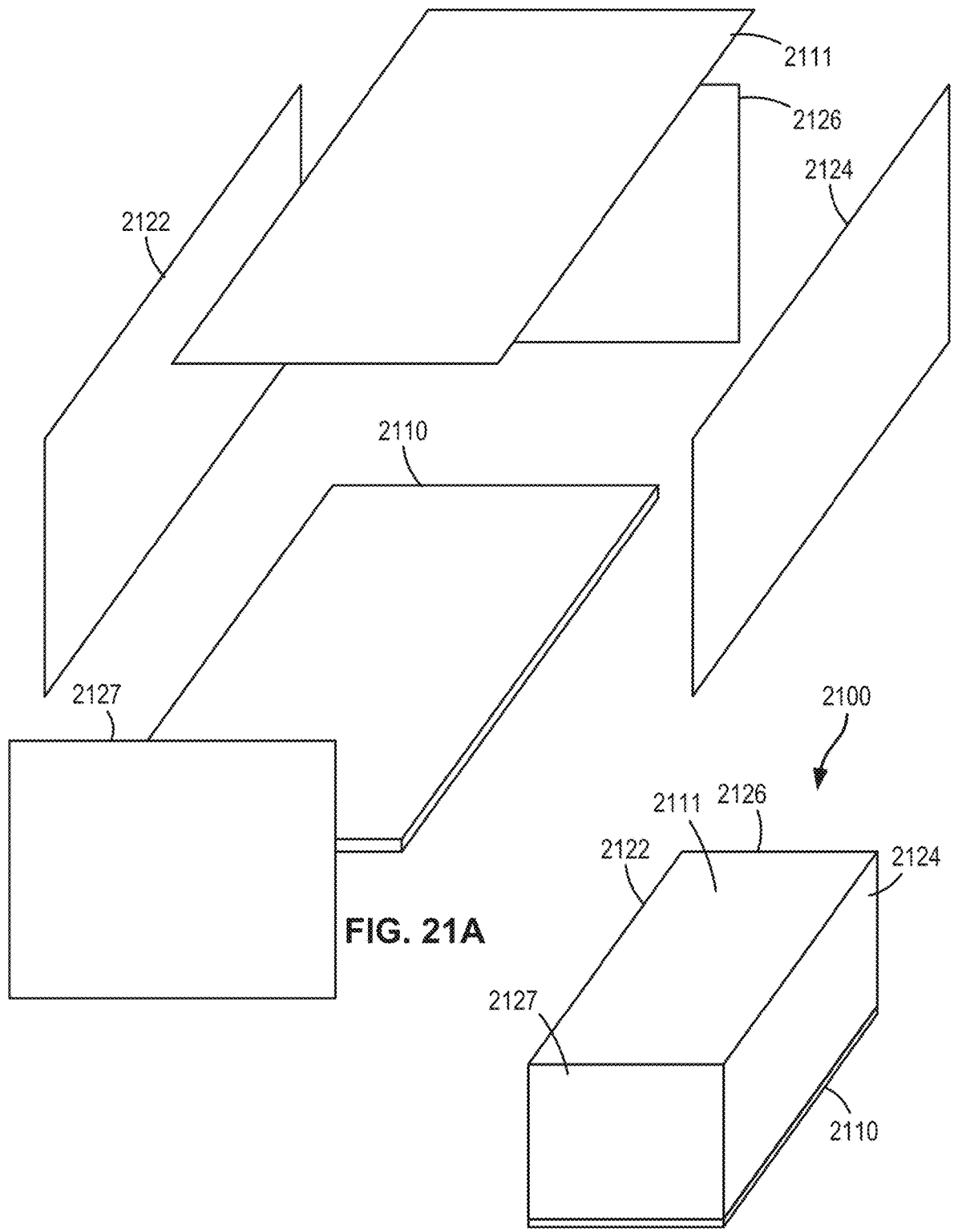

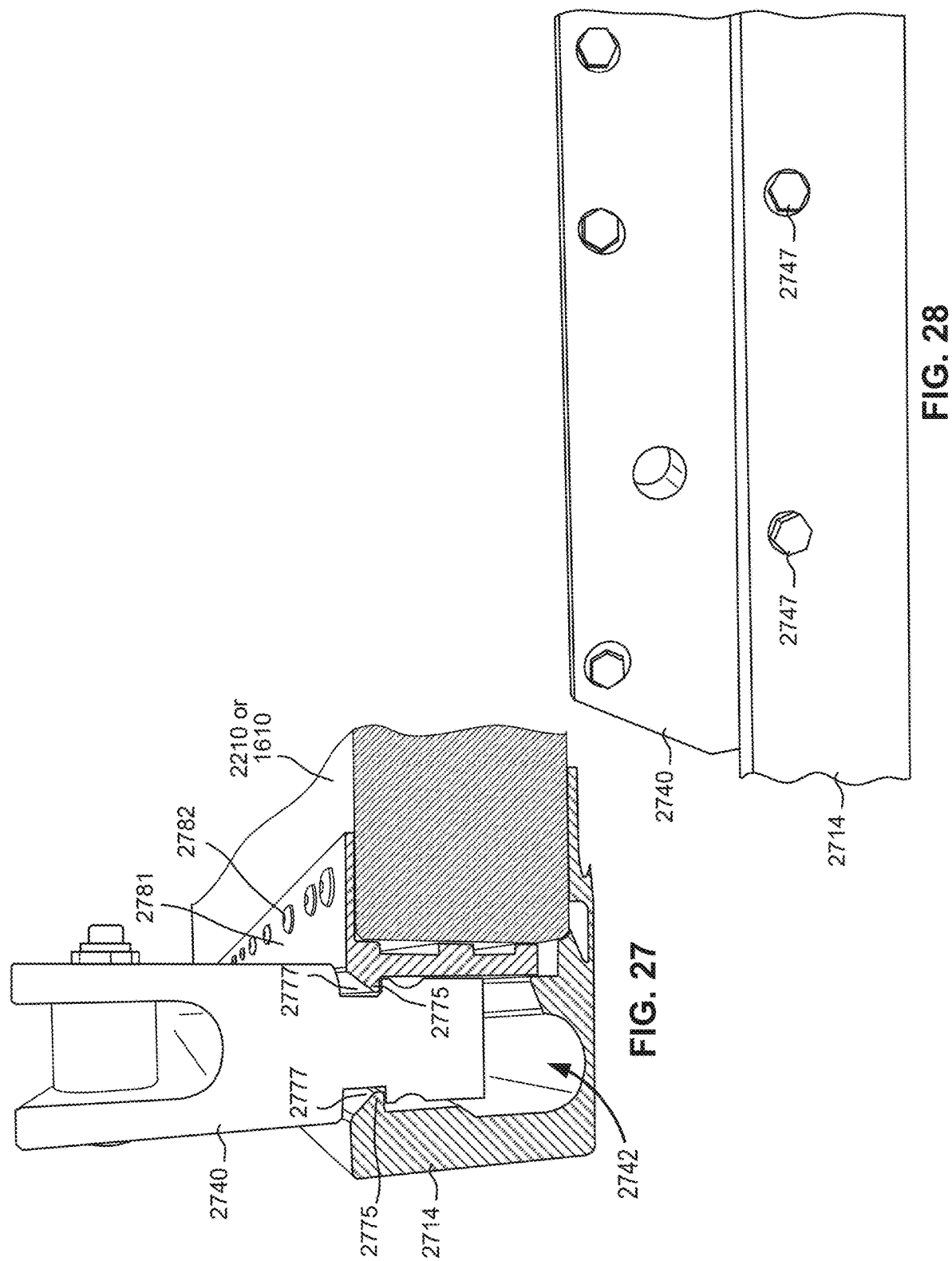

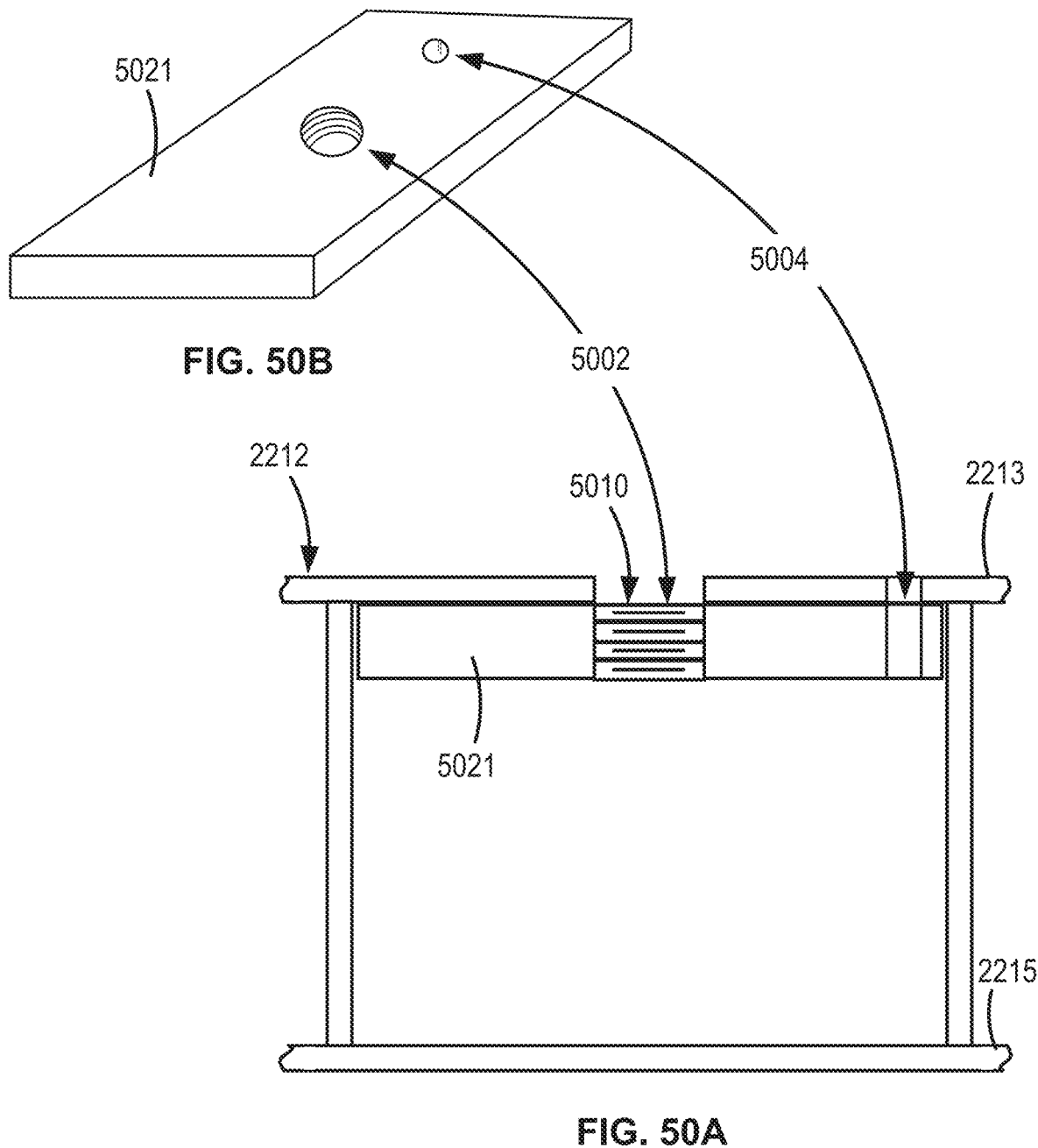

AERIAL DELIVERY PLATFORM TO PAYLOAD ADAPTER

TECHNICAL FIELD

This application claims priority to, and the benefit of, U.S. Provisional Patent Application Ser. No. 63/591,225 entitled "AERIAL DELIVERY PLATFORM TO PAYLOAD ADAPTER" filed on Oct. 18, 2023. This application claims priority to, and the benefit of, U.S. Provisional Patent Application Ser. No. 63/631,615 entitled "MIDAIR ITEM DISPENSER SYSTEMS AND METHODS" filed on Apr. 9, 2024. The disclosures of the foregoing applications are incorporated herein by reference in their entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to aerial delivery, particularly delivery achieved via mid-air extraction from an aircraft.

BACKGROUND

Aerial delivery is a term used to describe extracting an item from an aircraft in flight and then enabling a safe recovery of the item by use of an aerodynamic decelerator, which is most often a parachute system. Additionally, the aerial delivery operation is typically conducted from a cargo-type aircraft. The process may utilize very specific aerial delivery equipment and may adhere to very specific aerial delivery operational procedures. Often, the extracted item consists of an aerial delivery system containing cargo of some sort.

Two general types of extraction are utilized. Gravity extraction is the technique of using positive aircraft pitch angle, or by using some other force to cause the item to simply roll or slide out of the aircraft, which is typically followed by a parachute being deployed by a lanyard that is anchored to the aircraft. Parachute extraction is a technique whereby a parachute is first deployed out the rear of the cargo compartment, and the parachute is used to pull the item from the aircraft. Both techniques may conform to guidelines regarding length, weight, mass, etc., of the item being extracted in order to achieve a safe extraction operation. Generally speaking, relatively short and/or relatively lightweight items may be gravity extracted, but relatively long and/or relatively heavy items may preferably be parachute extracted, which removes the item from the aircraft quickly to prevent it from adversely affecting the aircraft's center of balance.

Items having a generally cylindrical shape, such as bombs that are powered by gravity, will typically be released from the belly or wing of a bomber or fighter aircraft. In practice, these items are released vertically but their longitudinal axis is substantially horizontal. Because the lower bomb racks in a bomb bay may be repositioned before other items can be released from racks above them, a simultaneous release of all items in the bomb bay cannot generally be conducted. The relatively long release time, coupled with a relatively high airspeed that is a feature of these aircraft, prevents the items from impacting in a concentrated area. Instead, the resulting impact path of the items is quite lengthy, and the resulting impact effect is known as carpet bombing.

For aerial launching of chemical energy powered items, such as missiles, yet another technique is used. In this scenario, items are loaded into linear guidance devices, which are typically referred to as launchers. Typically, these launchers are either tubular or monorail (dovetail) in design and are mounted substantially horizontally on fighter airplanes or helicopters. In practice, these items are generally powered by a self-contained rocket motor, allowing only one item to be loaded per launcher. Otherwise, the rocket blast from the front item could damage the item behind it, perhaps even causing it to explode while it is still in the launcher.

SUMMARY

An aerial delivery system enables delivery of releasable items after extraction from an aircraft. In an exemplary embodiment, an aerial delivery apparatus includes a platform that includes a panel extending laterally between and to a first side rail and a second side rail. The aerial delivery apparatus further includes an adapter mounted to the platform, the adapter includes a plurality of anchor points whereby a parachute system is configured to be attached to the platform. The adapter includes a first side frame coupled to the first side rail and extending vertically from the platform, a second side frame coupled to the second side rail and extending vertically from the platform, and a rear frame extending between and to the first side frame and the second side frame.

These and other embodiments may optionally include one or more of the following features. The first side frame can include a first anchor point of the plurality of anchor points and a second anchor point of the plurality of anchor points whereby the platform is configured to be suspended from the parachute system. The second side frame can include a third anchor point of the plurality of anchor points and a fourth anchor point of the plurality of anchor points whereby the platform is configured to be suspended from the parachute system. The first side frame can be configured to transfer a first parachute force into the first side rail and the second side frame can be configured to transfer a second parachute force into the second side rail. A total height of the first side frame can be at least ten times greater than a total thickness of the platform. Each of the first side frame and the second side frame can comprise at least one of a triangular geometry or a rectangular geometry. The rear frame can comprise a rectangular geometry. The first side rail can extend longitudinally between and to a first end of the platform and a second end of the platform.

In another aspect, the subject matter may be embodied in an aerial delivery system includes a platform extending laterally between and to a first side rail and a second side rail, the first side rail defines a slot extending longitudinally along the first side rail, a fitting configured to be received at least partially into the slot, the fitting includes a first aperture and a second aperture, the first aperture extends laterally through the fitting whereby the fitting is configured to be secured to the first side rail, and an adapter mounted to the platform via the fitting, the adapter includes a plurality of anchor points whereby a parachute system is configured to be attached to the platform.

These and other embodiments may optionally include one or more of the following features. The platform can define a first surface facing a first direction. The slot can include an opening facing the first direction. The fitting can further include a first portion disposed in the slot. The first aperture can be disposed in the first portion. The fitting can further include a second portion extending from the first portion and protruding from the slot, the second aperture is disposed in the second portion and the adapter is mounted to the fitting via the second aperture. The second aperture can be oriented at least one of longitudinally, laterally, or vertically within the second portion of the fitting. The fitting can be configured to be moved vertically into the slot during installation. The adapter can further include a first side frame located at the first side rail. A first total height of the first side frame can be greater than ten times a total thickness of the platform. The adapter can further include a second side frame located at the second side rail, a second total height of the second side frame is greater than ten times the total thickness of the platform. The adapter can further include a back frame extending between the first side frame and the second side frame. The adapter can further include a cross member extending between and to a top side of the first side frame and a top side of the second side frame. The first side rail can include a first wall and a second wall, the first wall and the second wall define the slot. The aerial delivery apparatus can further include a parachute compartment coupled to the adapter. The parachute compartment can include a rear-facing opening whereby a parachute is configured to exit the parachute compartment. The aerial delivery apparatus can be configured to receive a payload between the parachute compartment and the platform. The aerial delivery apparatus can further include a plurality of roller pads disposed on a bottom surface of the platform.

In another aspect, the subject matter may be embodied in an aerial delivery apparatus including a platform which includes a platform panel extending laterally between and to a first side rail and a second side rail, a plurality of crossbars extending laterally between and to the first side rail and the second side rail, and each crossbar extends over the platform panel, and an adapter mounted to the platform via the first side rail and the second side rail, the adapter includes a plurality of anchor points whereby a parachute system is configured to be attached to the platform, and the adapter includes a plurality of notches configured to accommodate the plurality of crossbars.

These and other embodiments may optionally include one or more of the following features. The aerial delivery apparatus can further include a fitting configured to be received at least partially into a slot disposed in the first side rail, and the slot extends longitudinally along the first side rail. The fitting can comprise a "T" shape. The fitting can comprise a rectangular shape. The platform can include a first skin, a second skin, and a plurality of support ribs extending between the first skin and the second skin. The platform can further include a channel is at least partially defined by, and located between, a first support rib of the plurality of support ribs and a second support rib of the plurality of support ribs, and the channel is at least partially further defined by, and located between, the first skin and the second skin. The aerial delivery apparatus can further include a reinforcement plate located in the channel, and the crossbar is coupled to the first skin via the reinforcement plate. The platform can further include a plurality of platform panels disposed along a length of the platform, each platform panel extends between and to the first side rail and the second side rail.

In another aspect, the subject matter may be embodied in a method of controlling an attitude of an aerial delivery apparatus. The method can include coupling a parachute to a parachute release mechanism. The method can further include coupling a payload to the parachute release mechanism. The method can further include deploying the payload from an aircraft. The method can further include deploying the parachute. The method can further include suspending the payload from the parachute via a first plurality of payload suspension straps. The method can further include activating the parachute release mechanism to separate the parachute from the first plurality of payload suspension straps. The method can further include, subsequent to activating the parachute release mechanism, suspending the payload from the parachute via a second plurality of payload suspension straps.

These and other embodiments may optionally include one or more of the following features. The method can further include rotating the payload between a first attitude and a second attitude in response to activating the parachute release mechanism. The first plurality of payload suspension straps can be attached to the payload at a different location from the second plurality of payload suspension straps.

In another aspect, the subject matter may be embodied in a two-piece fitting for an aerial delivery platform side rail. The two-piece fitting includes a main fitting body having a first portion configured to be received into a side rail slot and a second portion configured to protrude from the side rail slot whereby an item can be secured to the aerial delivery platform side rail. The two-piece fitting further includes a locking body configured to engage the first portion of the main fitting body to lock the main fitting body and the locking body within the side rail slot.

These and other embodiments may optionally include one or more of the following features. The main fitting body can include a longitudinal keyway and the locking body includes a protrusion configured to be received in the keyway. The keyway can have at least one of a semicircular geometry, a dovetail geometry, a partial dovetail geometry, or a rectangular geometry. The main fitting body can have a first fastener aperture and the locking body can have a second fastener aperture. The locking body can be configured to align with the main fitting body so that the first fastener aperture aligns with the second fastener aperture so as to receive a fastener therethrough.

In another aspect, the subject matter may be embodied in an aerial delivery system including a platform panel and a fitting. The platform panel can include a first skin, a second skin, a plurality of support ribs extending between and to the first skin and the second skin, and an aperture disposed in the first skin. The fitting can be received through the aperture in the first skin and extending between and to the first skin and the second skin, the fitting includes a first opening at a first end thereof configured to receive a first fastener to secure an item to the platform panel and a second opening configured to receive a second fastener through the second skin to secure the fitting to the second skin.

The contents of this summary section are provided only as a simplified introduction to the disclosure and are not intended to be used to limit the scope of the appended claims.

BRIEF DESCRIPTION OF THE DRAWINGS

In order that the advantages of the disclosure will be readily understood, a more particular description of the disclosure is rendered by reference to the appended drawings. Thus, although the subject matter of the present disclosure is particularly pointed out and distinctly claimed in the concluding portion of the specification, a more complete understanding of the present disclosure, may best be obtained by referring to the detailed description and claims when considered in connection with the drawing figures. Understanding that these drawings depict only typical embodiments of the disclosure and are not therefore to be considered to be limiting of its scope, the subject matter of the present application will be described and explained with additional specificity and detail through the use of the accompanying drawings, in which:

FIG. 3A, FIG. 3B, and FIG. 3C are perspective, rear, and side views of an aerial delivery system having a parachute shelf, in accordance with various embodiments;

FIG. 13 is a section view of a fitting installed to a side rail, in accordance with various embodiments;

FIG. 14 is a section view of a fitting installed to a side rail, in accordance with various embodiments;

FIG. 20A and FIG. 20B are assembly and perspective views of an aerial delivery system having rectangular frame elements and including a front frame, in accordance with various embodiments;

FIG. 21A and FIG. 21B are assembly and perspective views of an aerial delivery system having rectangular frame elements and including a front frame and a top frame, in accordance with various embodiments;

FIG. 27 is a section view of a platform for an aerial delivery system having a side rail and a fitting installed in the side rail, in accordance with various embodiments;

FIG. 28 is a side view of the side rail and the fitting installed in the side rail of FIG. 27, in accordance with various embodiments;

FIG. 50A is a schematic view of a reinforcement plate installed onto an aerial delivery platform panel, in accordance with various embodiments;

FIG. 50B is a perspective view of an example reinforcement plate of FIG. 50A, in accordance with various embodiments;

DETAILED DESCRIPTION

Figure 1A:
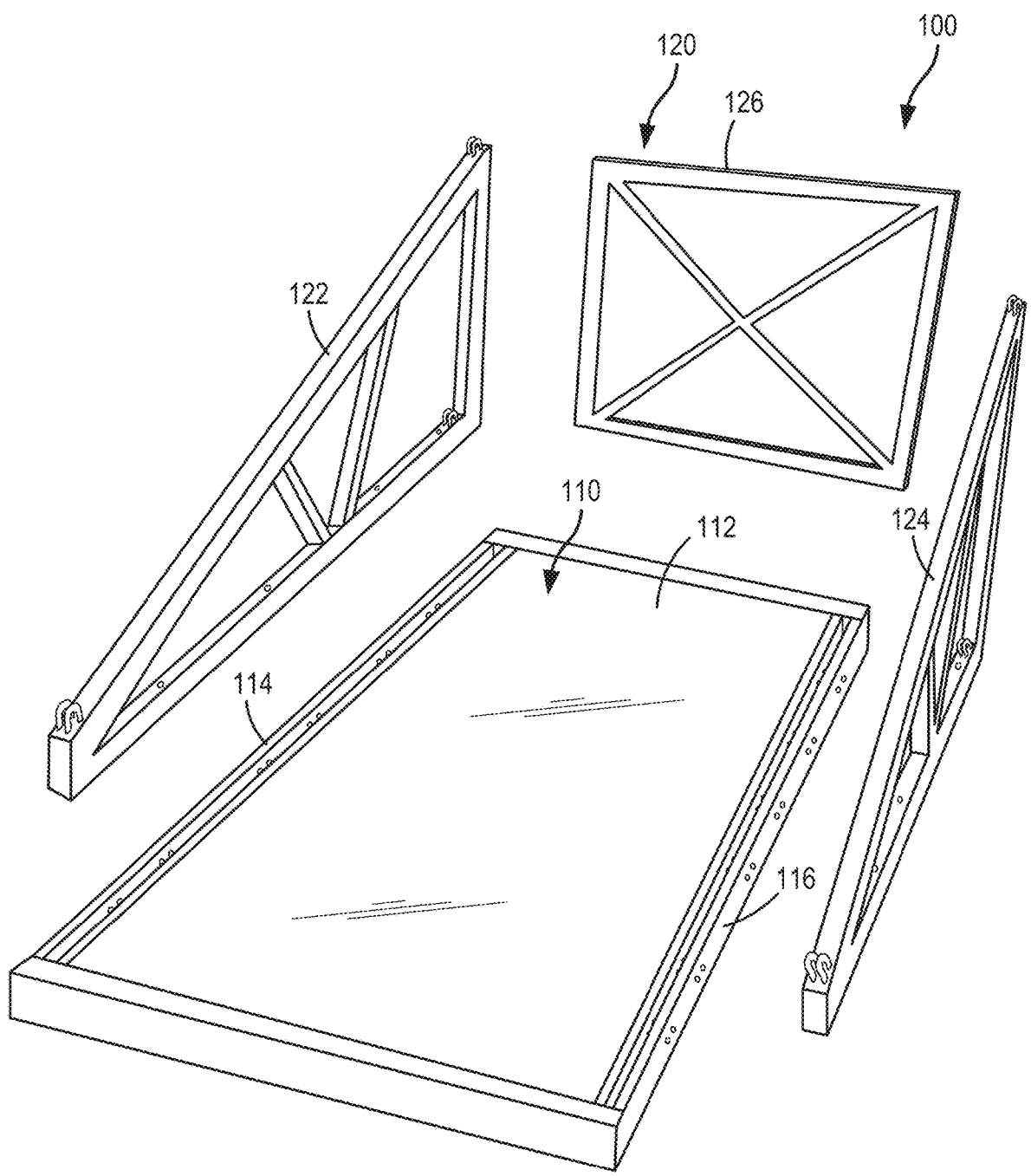
FIG. 1A is an assembly view of an aerial delivery system, in accordance with various embodiments.

Apparatuses, systems, and methods of the present disclosure include an aerial delivery system configured to facilitate controlled descent of a payload toward the ground. Aspects of the present disclosure may be particularly useful with type V aerial delivery platforms which include two longitudinal side rails with lateral platform panels secured therebetween. The platform panels not only serve to laterally position the side rails the correct distance apart and provide diagonal rigidity, but they also provide the surface on which aerial delivery items can be rigged for airdrop operations. The side rails, on the other hand, serve as the primary longitudinal structural members for an aerial delivery platform. In addition to providing the means to lock the platform in the aircraft until time for the airdrop to occur (locking notches can be seen in FIG. 4), the side rails also provide anchor points for payloads to be lashed to the platform. The side rails are also equipped with moveable, or removable, suspension links to which lifting slings or parachute system slings can be attached.

During parachute system inflations, the force to which the platform may be exposed is generally around 3 G's and, with payloads weighing up to 40,000 lb., the side rails must be quite strong.

It may be preferable to avoid lashings to secure certain payloads, such mid-air munitions dispensers, to an aerial delivery platform. Instead, it may be preferable to secure items, such as dispensers or other cargo, directly to the top surface of the platform panels. The panels are formed as hollow rectangles with vertical webs (e.g., see FIG. 7B and FIG. 15A). Because the top skin of a panel is relatively thin (e.g., a thin aluminum), as the platform is being produced, a plurality of reinforcement plates (e.g., see FIG. 15A and FIG. 15B) can be inserted inside the panel openings, in the correct locations, to provide anchor points for the fasteners that are to be used for securing the dispenser(s) to the platform. Retrofitting an existing aerial delivery platform with such reinforcement plates after it has left the factory tends to be an extremely difficult, time-consuming, and expensive task.

Airdropped loads can be suspended beneath a parachute system horizontally, i.e., the platform is on the bottom and the payload is on the top. With midair munitions dispensers, however, because the munitions are typically extracted from their dispenser by the force of gravity, it is desirable for the dispenser to be primarily oriented vertically, nose to earth. In order to suspend the dispensers nose-to-earth, parachute connection means are provided at the rear of the assembly.

Some individual dispensers have parachute system connecting points incorporated into the rear portion of their bodies. But the parachute suspension slings, generally configured as a pyramid, must also provide aerodynamic stability to the dispenser and platform assembly as they descend beneath a parachute system. In some instances, the dispenser assembly is too small, or a group of dispensers or some other item is too irregular in shape for a pyramid of sufficient size to be formed. For instance, three side by side dispensers, which, because of their width, could provide good lateral stability but poor pitch stability. Moreover, three dispensers, one of which is stacked atop another, simply provide no good way for suspension slings of uniform length to be used to form a stability enhancing pyramid.

Aspects of the present disclosure allow for the aerial deliver platforms to be modified during their fabrication to match a certain type of munitions dispenser or match any other type of payload that might need to descend nose first. Aspects of the present disclosure avoid the potentially unfavorable suspension slings connecting points and provide for more favorable suspension sling attachment points (e.g., of uniform length in the shape of a pyramid) to be used to form a stability enhancing pyramid. Moreover, an adapter (also referred to herein as a platform-to-payload adapter) of the present disclosure may be equipped with a built-in provision for rigging the parachute system, simplifying that task, too.

An adapter includes two side elements, which can be triangular or rectangular, to transfer forces from the rear portion of the adapter, where the parachute forces would initially be imposed, into the platform side rails. The adapter can be formed as one unit; two side elements and one rear element. For ease of transportation and storage, however, the adapter can also be built as three independent elements; two side elements and one rear element that would be secured to one another when ready for use. The rear portion of the adapter can have four uniformly positioned suspension sling connection points for providing stability. The forces from those four points can be transferred directly into the platform side rails.

As a stand-alone unit, the adapter can provide an efficient element for sling attachments and for transferring parachute forces into the platform side rails. Moreover, the present disclosure provides means of attaching the payload, be it munitions dispensers or some other type of payload, to either the adapter or the platform, or both.

Aspects of the present disclosure include a fitting that can be installed in the side rails for connecting the adapter side frames to the side rails. The adapter unit may be attached to the top of the fittings, or to any vertical surface of the fitting. Moreover, structural elements may extend between the side rail fitting and the adapter or between the side rail fittings and the dispensers. The fitting provides a simple and quick means for attaching various items to the platform side rails.

The rear of the dispensers or cargo may be configured with some simple means, such as bolts to secure the rear of the dispensers or cargo to the rear frame of the adapter. That arrangement can be more than sufficient to accommodate fore and aft forces, but may do little to accommodate forces in any other axis. This can be overcome by providing lateral elements, such flat bars made of metal or a composite, across the platform that would be anchored to the side rail brackets. These lateral elements can be provided with securing brackets, which would align with mating elements on the dispenser or be provided with bolting provisions, etc.

An aerial delivery system may be any system configured to facilitate controlled descent of a payload toward the ground. In accordance with various embodiments, and with reference to FIG. 1A and FIG. 1B, an aerial delivery system 100 generally includes a platform 110 including one or more panels 112 and opposing side rails (e.g., a first side rail 114 and a second side rail 116). The panel(s) 112 can extend laterally between and to the first side rail 114 and the second side rail 116. The side rails 114, 116 can extend longitudinally along opposite sides of the panel(s) 112. It may be desirable for an airdropped load to be suspended beneath a parachute system horizontally, i.e., the platform is on the bottom and the payload is on the top. With midair munitions dispensers, however, because the munitions are typically extracted from their dispenser by the force of gravity, it is desirable for the dispenser to be primarily oriented vertically, nose to earth. Accordingly, it is desirable that there be some means to connect the parachute system to the rear of the assembly.

Figure 1B:
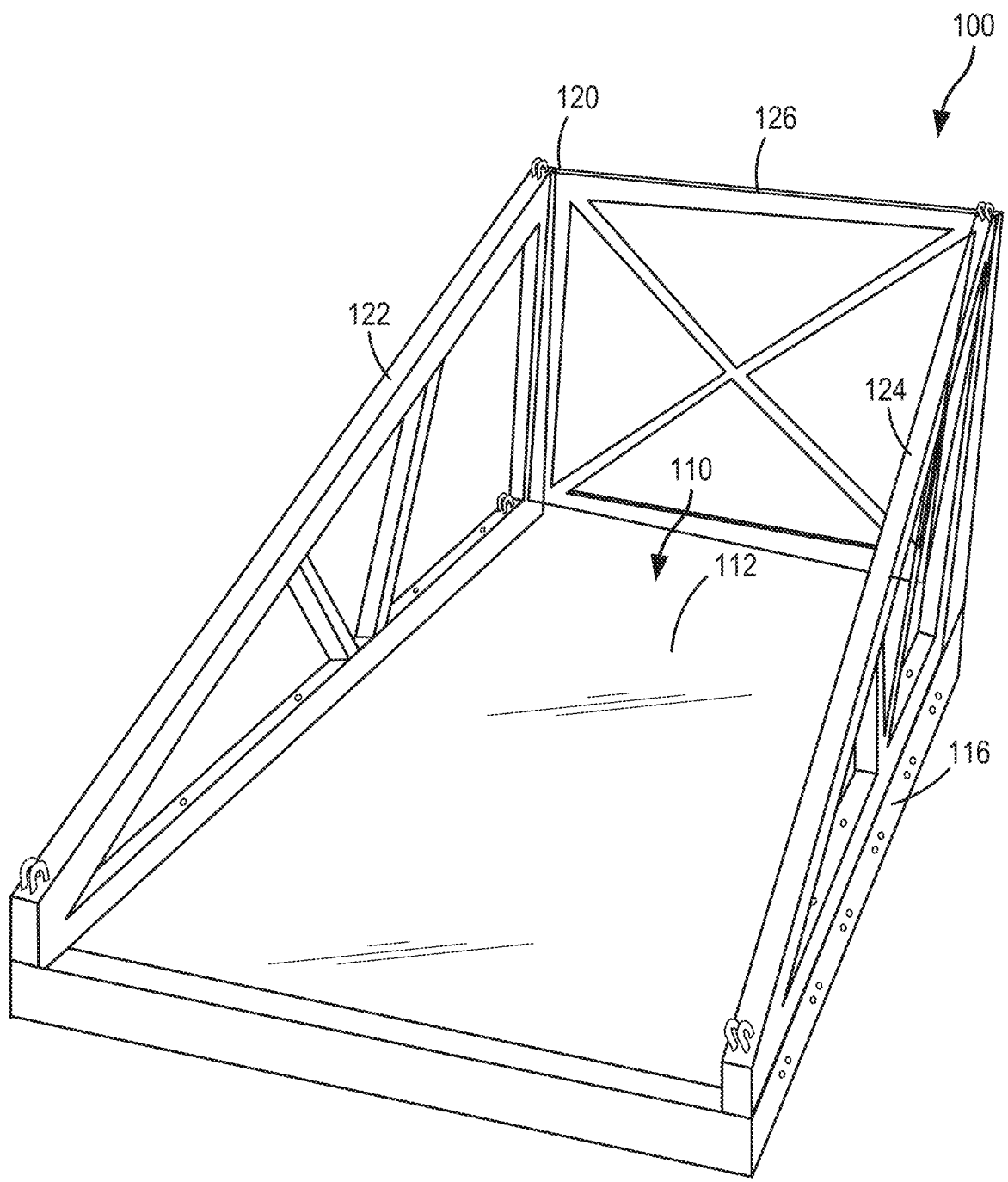
FIG. 1B is a perspective view of an aerial delivery system, in accordance with various embodiments.

The aerial delivery system 100 further includes an adapter 120 (also referred to herein as a platform-to-payload adapter or a payload adapter) including a first side frame 122 configured to be coupled to the first side rail 114 and a second side frame 124 configured to be coupled to the second side rail 116. The platform adapter 120 further includes a back frame 126 configured to be coupled between the first side frame 122 and the second side frame 124. The back frame 126 is configured to extend between and to the first side frame 122 and the second side frame 124. The back frame 126 is configured to be coupled at or near the back end of the platform 110. The back frame 126 can be configured to provide stability and rigidity to the first and second side frames 122, 124. Stated differently, the platform 110 can be coupled to back frame 126 and side frames 122, 124. The back frame 126 and side frames 122, 124 can extend upright from the platform 110. The side frames 122, 124 can be configured to transfer parachute forces from a parachute into the platform side rails 114, 116. The side frames 122, 124 can also be configured to transfer the parachute forces from the back frame 126, where the parachute forces can initially be imposed, into the platform side rails 114, 116. The forces can also be initially imposed in the side frames 122, 124 or the back frame 126, depending on the locations of the parachute attachment points. The first side frame 122 can be configured to transfer a first parachute force into the first side rail 114 and the second side frame 124 can be configured to transfer a second parachute force into the second side rail 116. The side frames 122, 124 can be triangular, as illustrated; though it is also contemplated herein that the side frames 122, 124 can be rectangular. The second side frame 124 can be similar in size and geometry to the first side frame 122 (e.g., the first side frame 122 can be identical, or nearly identical, to the second side frame 124, and/or the first side frame 122 can be a mirrored version of the second side frame 124). FIG. 1A shows an assembly view of the aerial delivery system 100. In various embodiments, the first side frame 122, the second side frame 124, and the back frame 126 are manufactured as three separate pieces for ease of transportation and/or storage. However, the first side frame 122, the second side frame 124, and the back frame 126 can alternatively be manufactured as a single component.

The first side frame 122 and the second side frame 124 can be formed as a triangular truss configured to transfer parachute forces into the platform side rails 114, 116. The platform adapter 120 can be made of metal tubing, piping, angle brackets, or any other suitable materials capable of withstanding parachute loads. The cargo delivered by the aerial delivery system 100 can weigh on the order of 40,000 lbs. (18,144 kg) and the aerial delivery system 100 can experience gravitational forces of around 3 g's (i.e., approximately 29.4 m/s$^2$). Accordingly, it is desirable for the platform adapter 120 to be reinforced to withstand predetermined loads.

Platform 110 and adapter 120 may comprise any suitable material or structure configured to be deployed via the cargo door of an aircraft. In accordance with an exemplary embodiment, platform 110 comprises a substantially planar structure with supporting ribs or other reinforcing elements. In an exemplary embodiment, platform 110 and/or and adapter 120 are made of aluminum. In another exemplary embodiment, platform 110 and/or adapter 120 are made of steel. Moreover, the aerial delivery system 100 may comprise various structural elements, materials, and configurations suitable to be deployed via the cargo door of an aircraft.

Figure 1C:
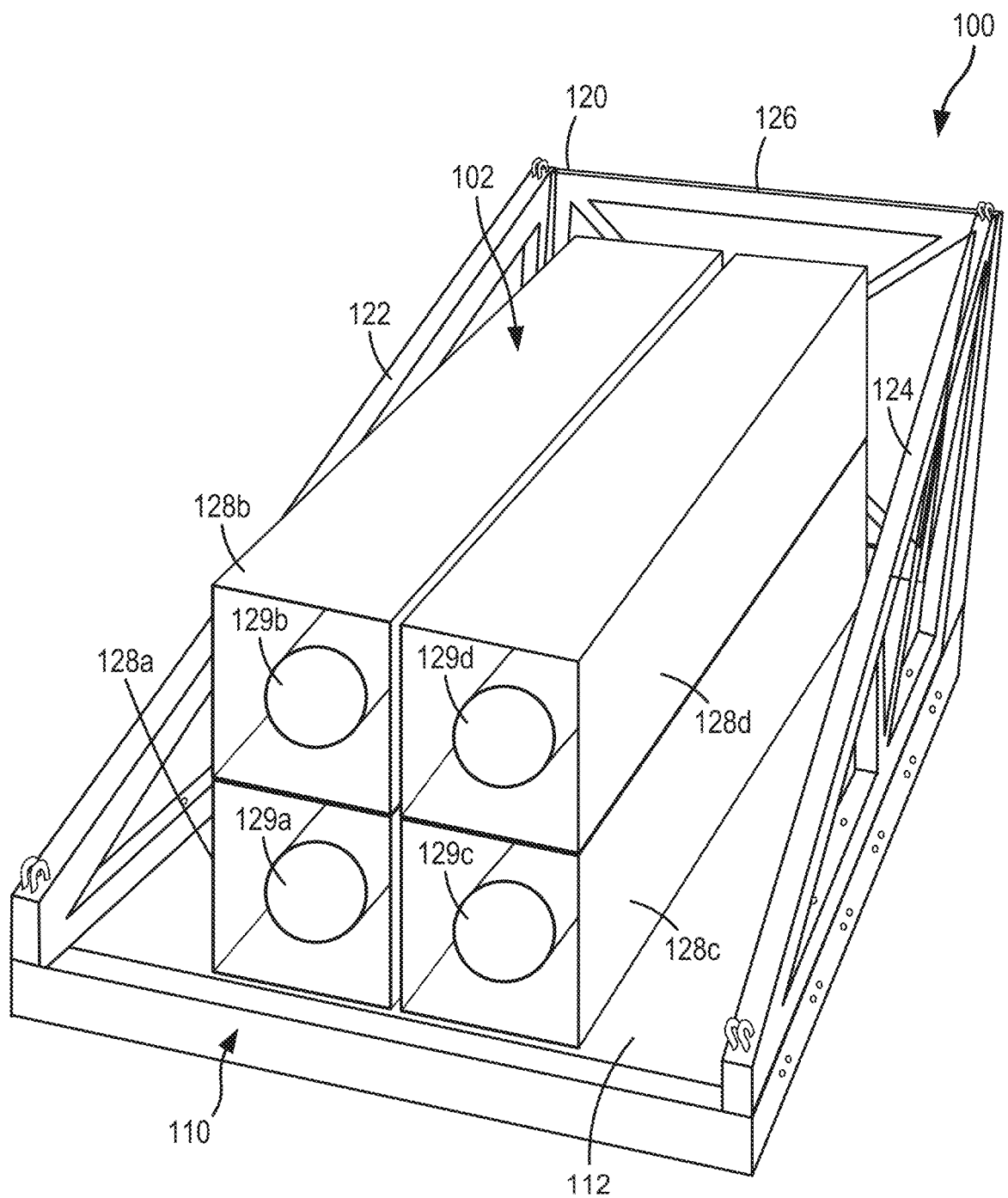
FIG. 1C is a perspective view of an aerial delivery system with a payload, in accordance with various embodiments.

With reference to FIG. 1C, the aerial delivery system 100 is illustrated with a payload 102. The payload 102 can include a plurality of linear guidance devices (e.g., linear guidance device 128*a*, 128*b*, 128*c*, and 128*d*; referred to generally as linear guidance devices 128). Each linear guidance device 128 can be configured to secure a releasable item 129*a*, 129*b*, 129*c*, and 129*d*, respectively, until separation of the releasable item 129 from the aerial delivery system 100 is desired.

Figure 2:
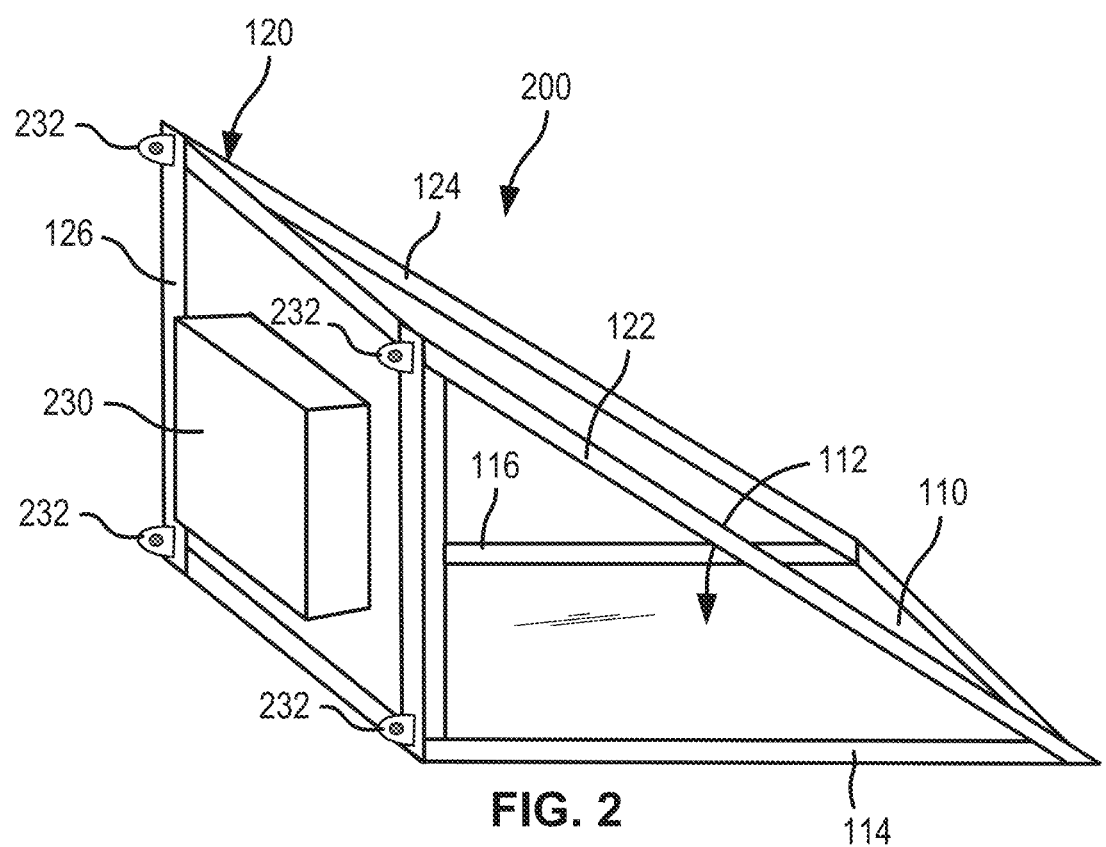
FIG. 2 is a perspective view of an aerial delivery system having a parachute compartment located at a rear portion thereof and having parachute attachment features at each corner of the rear portion thereof, in accordance with various embodiments.

In various embodiments, the platform adapter 120 may be equipped with a built-in provision for rigging the parachute system, which can simplify the rigging procedure. With respect to FIG. 2, elements with like element numbering, as depicted in FIG. 1A, are intended to be the same and will not necessarily be repeated for the sake of clarity. With reference to FIG. 2, the platform adapter 120 may be equipped with a parachute compartment 230 coupled to the back frame 126. The parachute compartment 230 can extend outwardly from the back frame 126. The back frame 126 can include a plurality of suspension sling attachment features 232 (also referred to herein as anchor points, e.g., a lug, a clevis, or the like) located at each corner of the back frame 126. In various embodiments, the plurality of suspension sling attachment features 232 are located at the rear of the first side frame 122 and the second side frame 124 (e.g., at the top and bottom of the rear side of the first side frame 122 and the second side frame 124).

With respect to FIG. 3A, FIG. 3B, and FIG. 3C, elements with like element numbering, as depicted in FIG. 1A and FIG. 2, are intended to be the same and will not necessarily be repeated for the sake of clarity. With reference to FIG. 3A, FIG. 3B, and FIG. 3C, the platform adapter 120 can be equipped with a parachute shelf or compartment 330 coupled to the back frame 126. The parachute compartment 230 can extend inward from the back frame 126. The parachute compartment 330 can include a platform extending parallel to the platform 110.

The total height H of the side frame 122 is greater than ten times the total thickness T of the platform 110 in accordance with various embodiments, greater than fifteen times the total thickness T of the platform 110 in accordance with various embodiments, and greater than twenty times the total thickness T of the platform 110 in accordance with various embodiments. The height of the second side frame 124 can be the same as the height H of the first side frame 122. The total height H is limited by the size of a cargo door of an aircraft.

Figure 4:
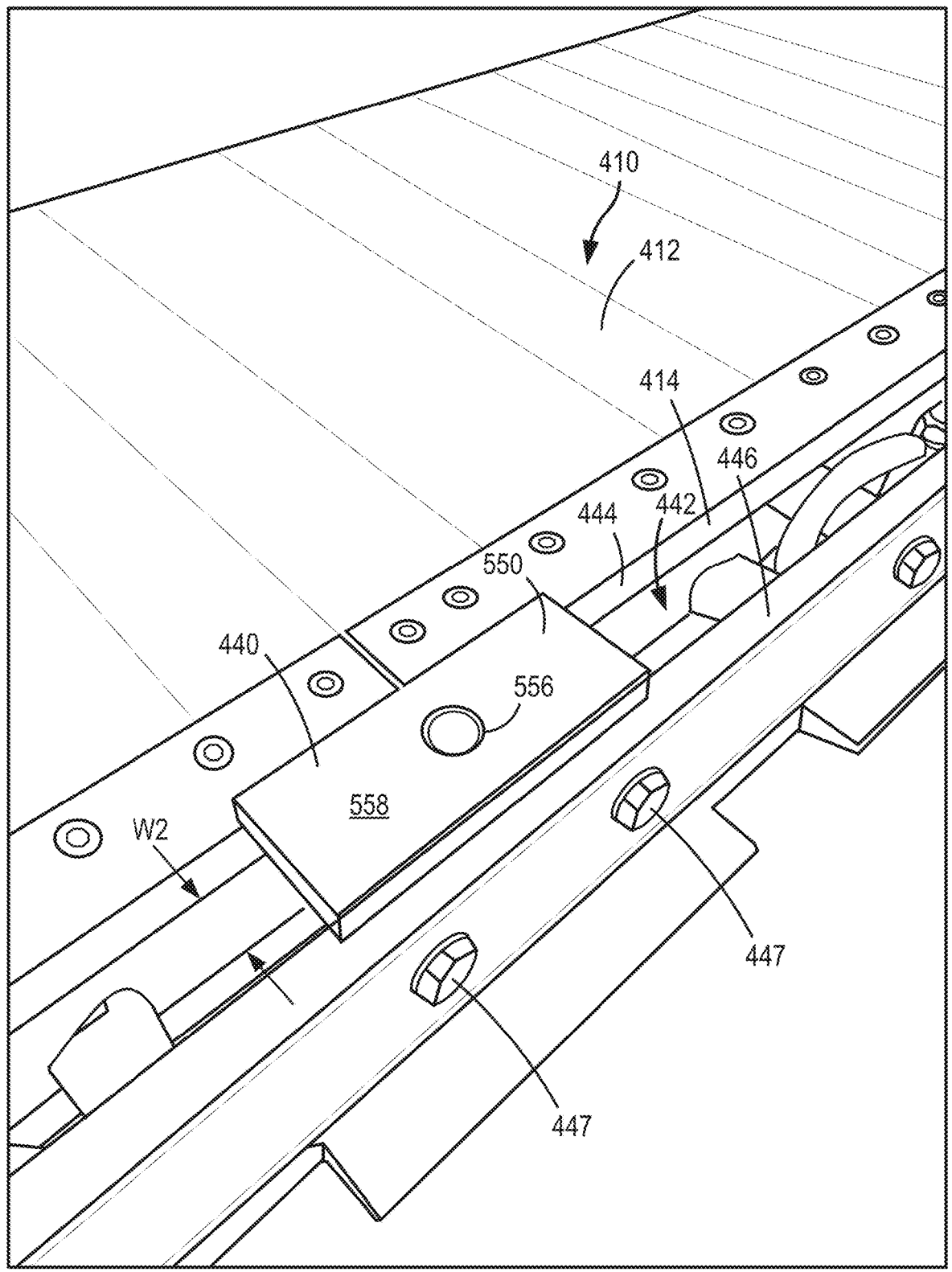
FIG. 4 is a perspective view of a side rail of a platform for an aerial delivery system and a fitting installed on the side rail, in accordance with various embodiments.

With reference to FIG. 4, a fitting 440 installed to a side rail 414 of a platform 410 is illustrated, in accordance with various embodiments. In various embodiments, the platform 110 of FIG. 1A through FIG. 3C can be similar to the platform 410. One or more panels 412 can extend from the side rail 414 to an opposing side rail (not shown). The side rail 414 can include a longitudinally extending slot 442 with an upward facing opening. The side rail 414 can include a first wall 444 and a second wall 446 disposed at opposing sides of the slot 442 and at least partially defining the slot 442. The first wall 444 and the second wall 446 can define top surfaces of the side rail 414. The fitting 440 can be placed at least partially into the slot 442 to install the fitting 440 to the side rail 414.

Figure 5:
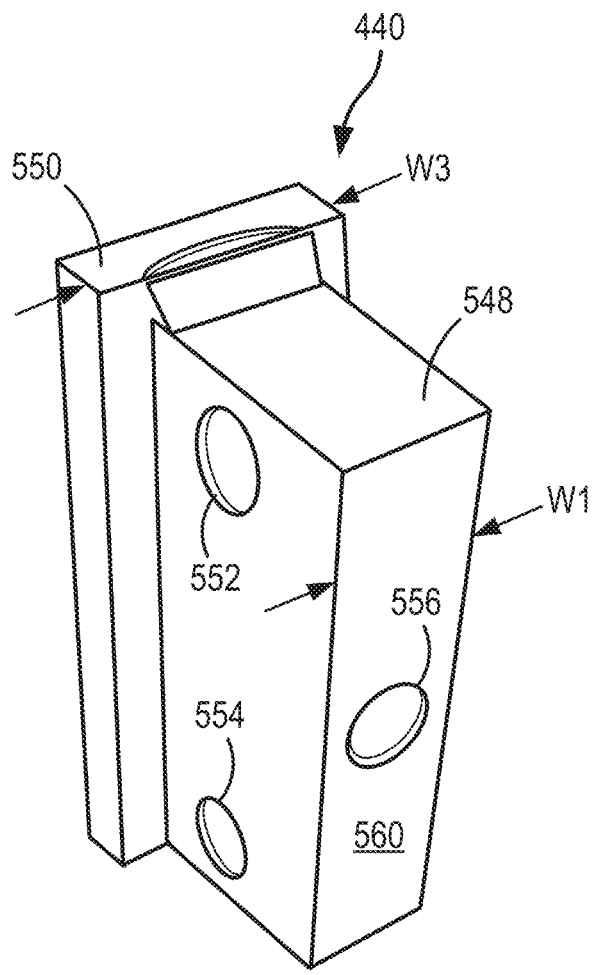
FIG. 5 is a perspective view of a fitting for a side rail of a platform for an aerial delivery system, in accordance with various embodiments.

With combined reference to FIG. 4 and FIG. 5, the fitting 440 can include a first portion 548 configured to be received into the slot 442. The fitting 440 can further include a second portion 550 configured to protrude from the slot 442 when the fitting 440 is in an installed position, as illustrated in FIG. 4. The first portion 548 can have a lateral dimension (e.g., width) W1 which is equal to or slightly less than the lateral dimension (e.g., width) W2 of the slot 442. For example, lateral dimension W1 can be between 80% and 100% of lateral dimension W2, between 90% and 100% of lateral dimension W2, between 95% and 100% of lateral dimension W2, or between 95% and 99% of lateral dimension W2, in accordance with various embodiments. The second portion 550 can have a lateral dimension (e.g., width) W3 which is greater than the lateral dimension W2 of the slot 442. The first portion 548 can include a first lateral aperture 552 and a second lateral aperture 554 extending laterally therethrough. The first lateral aperture 552 and the second lateral aperture 554 can align with lateral apertures in the side rail 414 and be configured to receive fasteners 447 (e.g., bolts) therethrough for securing the fitting 440 to the side rail 414. Stated differently, the first lateral aperture 552 and the second lateral aperture 554 can each define central axes oriented laterally with respect to the platform 410 when the fitting 440 is in the installed position.

The fitting 440 can further include an aperture 556 extending through the second portion 550. The aperture 556 can extend through a top surface 558 of the fitting 440. The aperture 556 can extend from the top surface 558 to a bottom surface 560 of the fitting 440. The aperture 556 can be used to secure an item to the platform 410.

Figure 6:
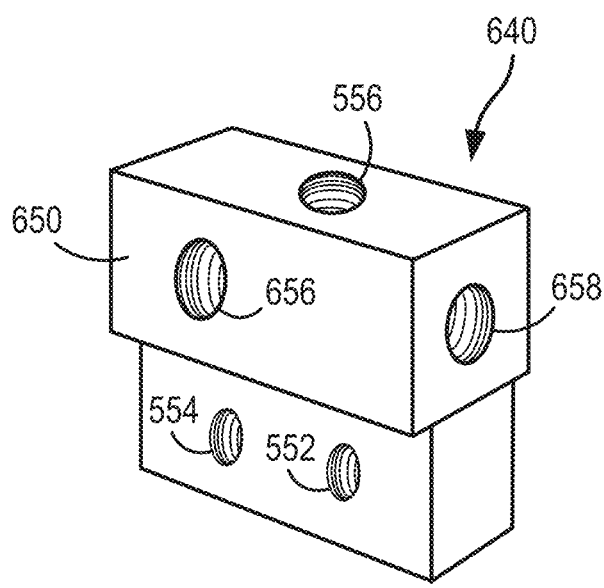
FIG. 6 is a perspective view of a fitting for a side rail of a platform for an aerial delivery system, in accordance with various embodiments.

With reference to FIG. 6, a fitting 640 is illustrated, in accordance with various embodiments. The fitting 640 can be similar to fitting 440, except that second portion 650 further includes a lateral aperture 656 extending laterally through the second portion 650 and a longitudinal aperture 658 extending longitudinally through the second portion 650. Accordingly, the second portion 650 can have one or more apertures on a top surface, a side surface, or an end surface for coupling one or more items to the fitting 640.

Figure 7A:
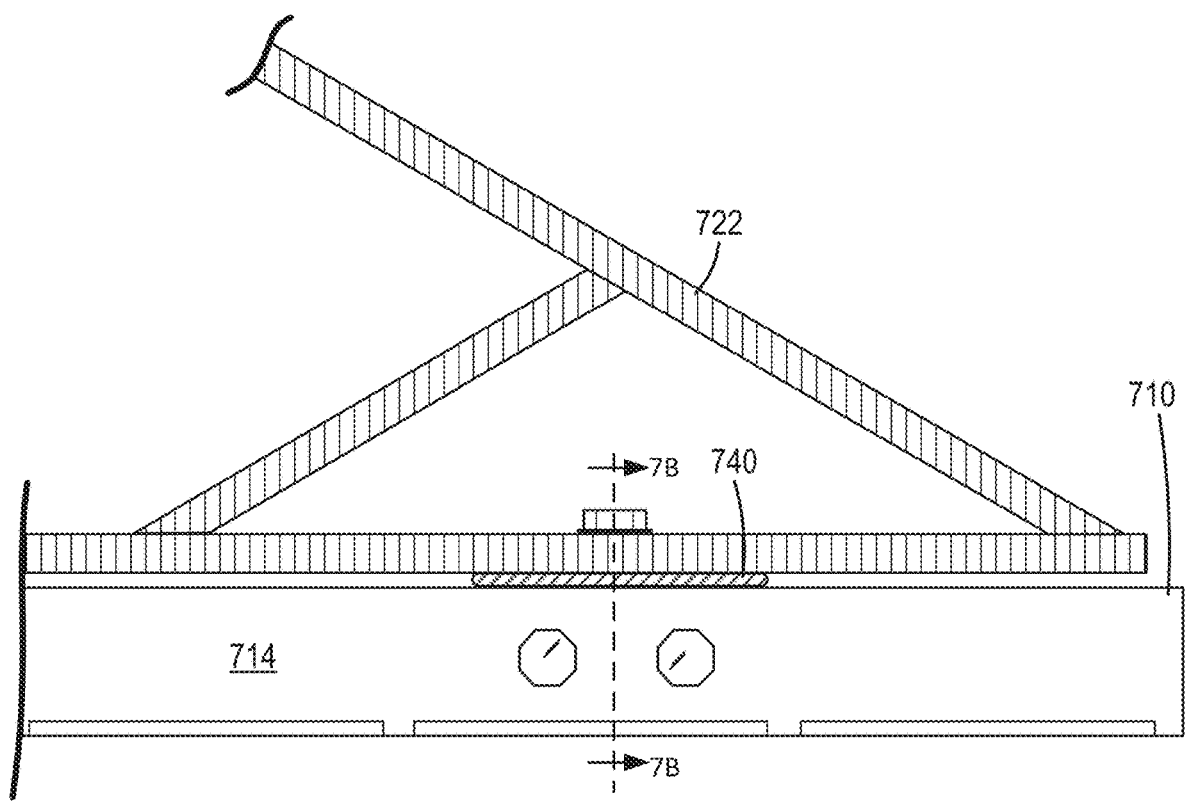
FIG. 7A is a side view of the aerial delivery system including a side frame of a platform-to-payload adapter mounted to a side rail of a platform via a fitting, in accordance with various embodiments.
Figure 7B:
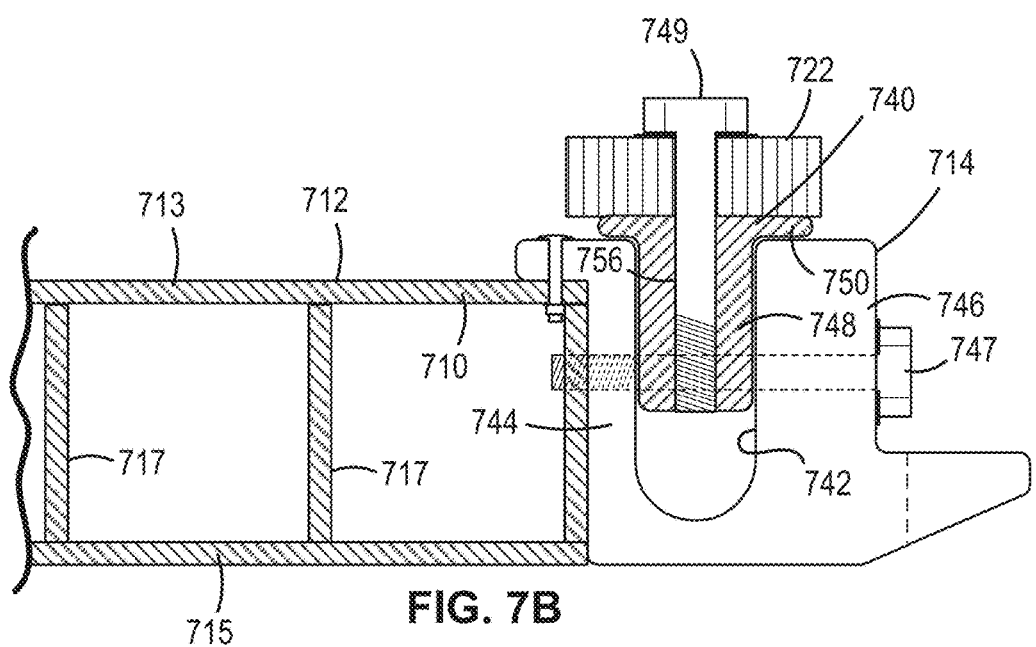
FIG. 7B is a section view of the aerial delivery system of FIG. 7A, in accordance with various embodiments.

With reference to FIG. 7A and FIG. 7B, a side frame 722 can be installed onto a side rail 714 of a platform 710 via a fitting 740. In various embodiments, platform 110 of FIG. 1A through FIG. 3C and/or platform 410 of FIG. 4 can be similar to platform 710. The fitting 740 can comprise a "T" shape cross-section, for example as illustrated in FIG. 7B. The fitting 740 can comprise a rectangular shape cross-section, for example as illustrated in FIG. 14. A first portion 748 of the fitting 740 can be inserted into a slot 742 of the side rail 714. One or more fasteners 747 can be positioned to extend through the side rail 714 and the first portion 748 of the fitting 740 to secure the fitting 740 to the side rail 714. The fastener(s) 747 can extend between and to a first wall 744 and a second wall 746 of the side rail 714. The side frame 722 can be secured to the fitting 740 via one or more fasteners 749. In the illustrated embodiment, the fastener 749 extends through a vertically oriented aperture 756, which may be threaded. However, the side frame 722 could also be coupled to the fitting 740 via a laterally extending aperture (e.g., see aperture 656 of FIG. 6) or a longitudinally extending aperture (see aperture 658 of FIG. 6) extending through the second portion 750.

In various embodiments, the platform 710 includes one or more panels 712, each panel 712 including a first skin 713 (e.g., a top skin) and a second skin 715 (e.g., a bottom skin) and a plurality of support ribs 717 extending therebetween. The first skin 713 can be spaced apart from the second skin 715 via the support ribs 717. The first skin 713 can include an outer surface facing a first direction (i.e., upward in FIG. 7B) and the slot 742 defines an opening facing the first direction.

Figure 8:
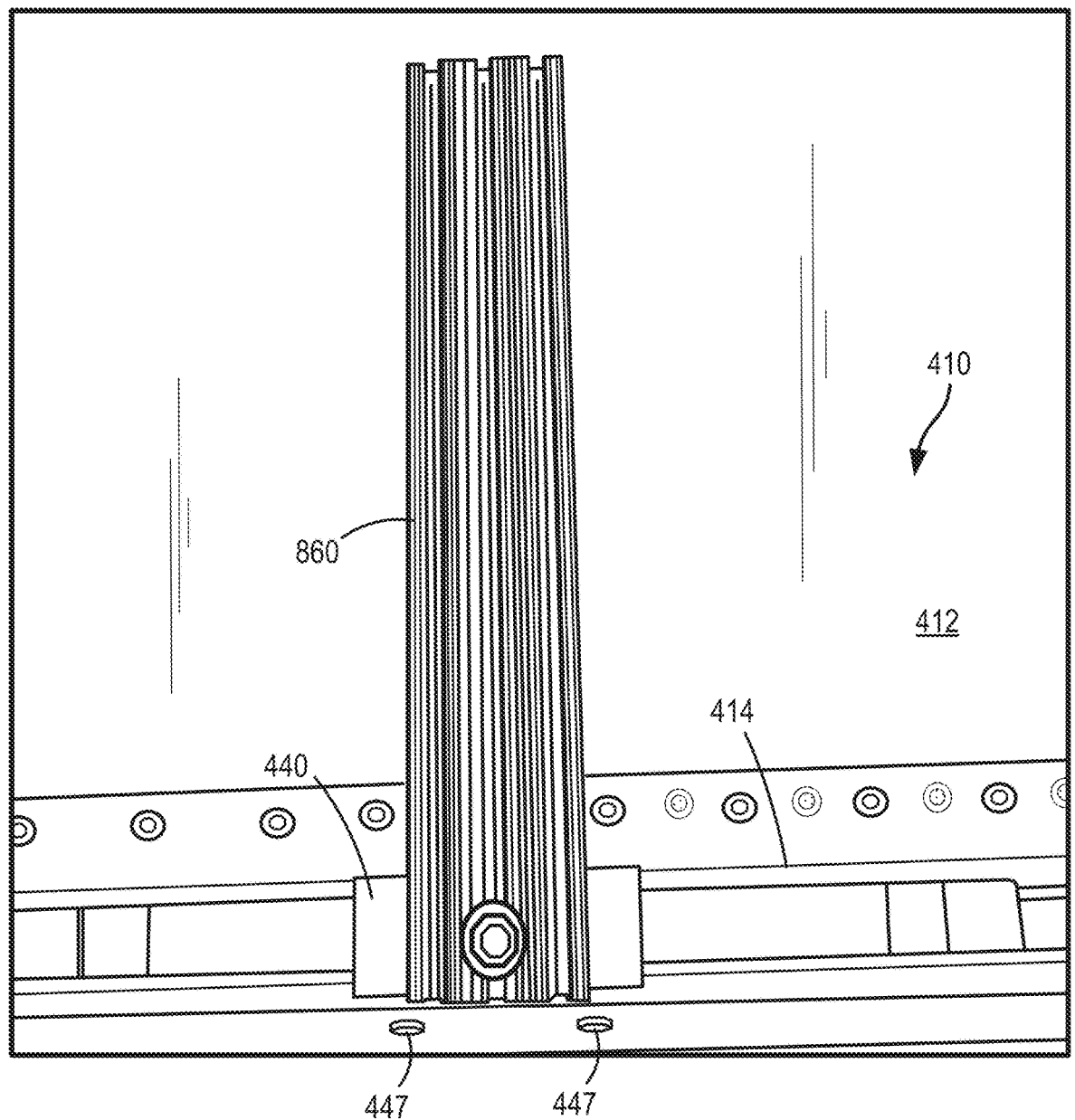
FIG. 8 is a top view of a bracket installed onto a side rail of a platform via a fitting, in accordance with various embodiments.

With reference to FIG. 8, a fitting 440 installed to a side rail 414 of a platform 410 is illustrated, in accordance with various embodiments. With respect to FIG. 8, elements with like element numbering, as depicted in FIG. 4, are intended to be the same and will not necessarily be repeated for the sake of clarity. In various embodiments, a bracket 860 can be attached to the fitting 440 for coupling one or more items to the platform 410. In various embodiments, the bracket 860 is a rail- or a track-type attachment feature that extends laterally over the panel 412 from the fitting 440.

Figure 9:
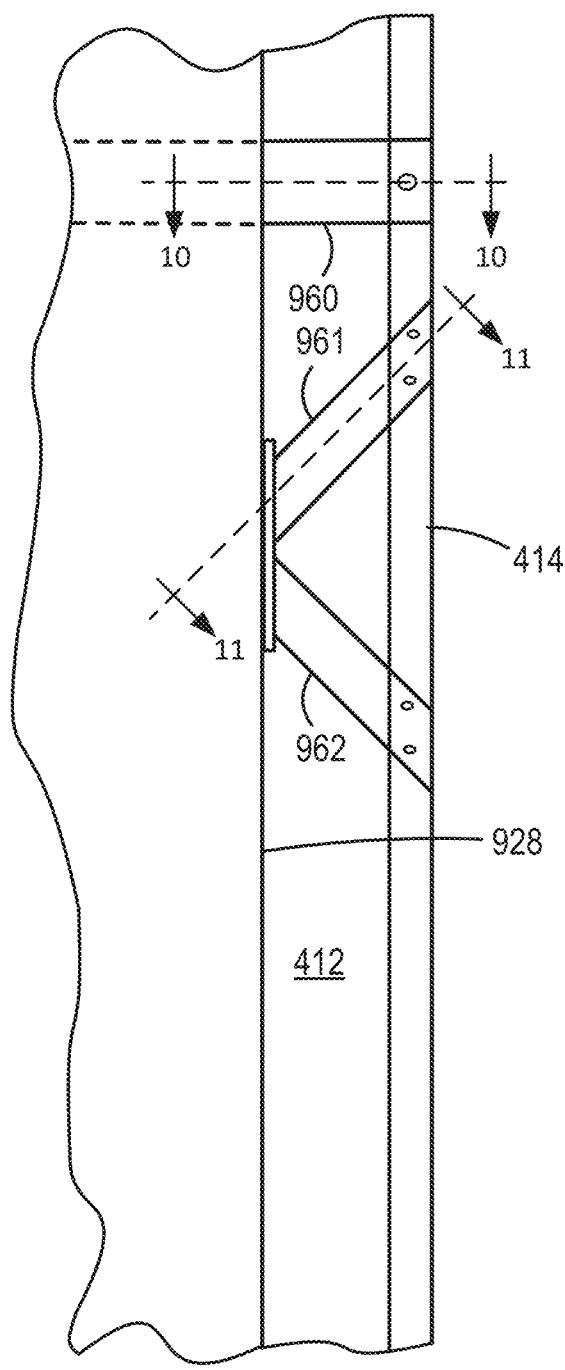
FIG. 9 is a schematic, top view of a payload mounted to an aerial delivery system via a first mounting bracket extending beneath the payload and a second bracket coupled to a side of the payload, in accordance with various embodiments.

With reference to FIG. 9, a bracket 960 is illustrated extending from the side rail 414, across the panel 412, and beneath a payload 928. Stated differently, the bracket 960 can be disposed between the panel 412 and the payload 928. In various embodiments, the bracket 960 extends from a fitting, similar to fitting 440 of FIG. 8, to the payload 928. For example, the payload 928 can rest against and be attached to the bracket 960 at an underside thereof. Moreover, one or more brackets (e.g., bracket 961 and bracket 962) can extend from the side rail 414 and attach to a side of the payload 928. In various embodiments, the bracket 961 and/or the bracket 962 extends from a fitting, similar to fitting 440 of FIG. 8, to the payload 928.

Figure 10:
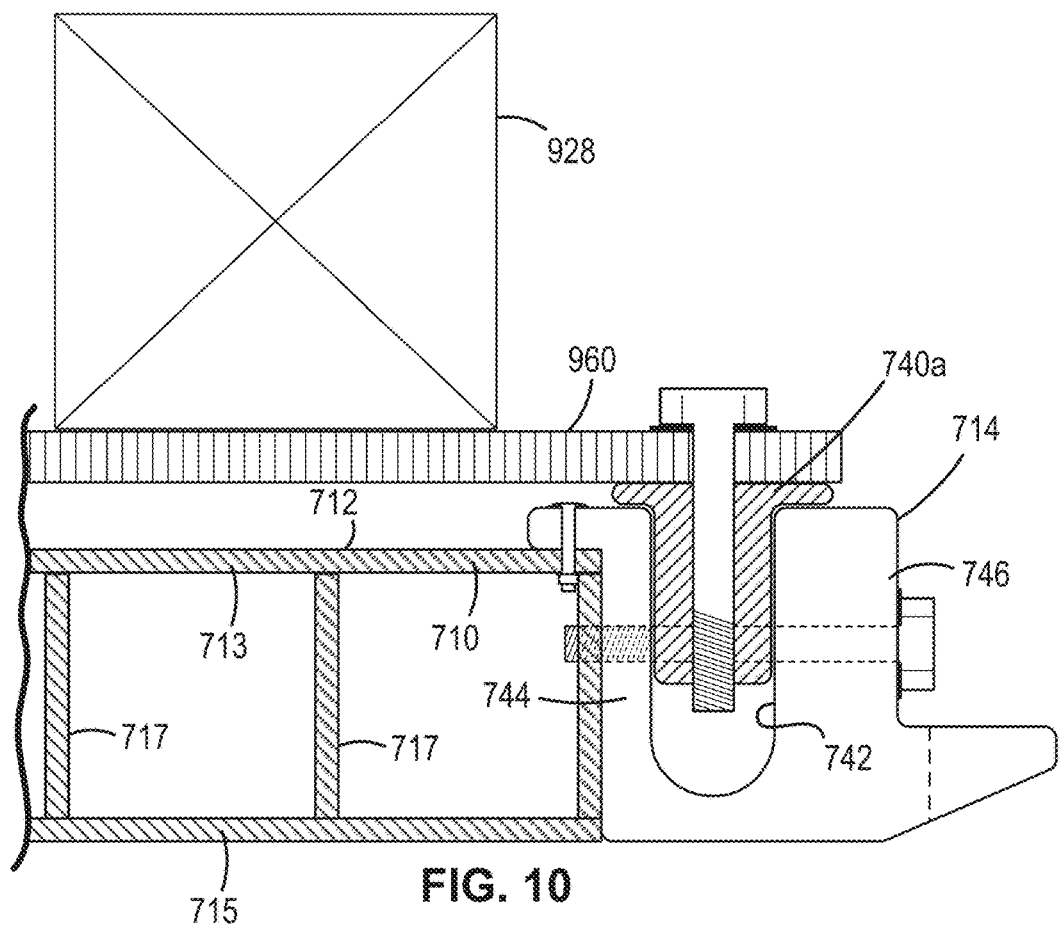
FIG. 10 is a section view of the first bracket of FIG. 9, in accordance with various embodiments.

With reference to FIG. 10, a section view of the bracket 960 attached to a fitting 740a and the payload 928 is illustrated, in accordance with various embodiments. With respect to FIG. 10 and FIG. 11, elements with like element numbering, as depicted in FIG. 7B, are intended to be the same and will not necessarily be repeated for the sake of clarity. Fitting 740a can be the same as, or similar to, fitting 740 of FIG. 7B.

Figure 11:
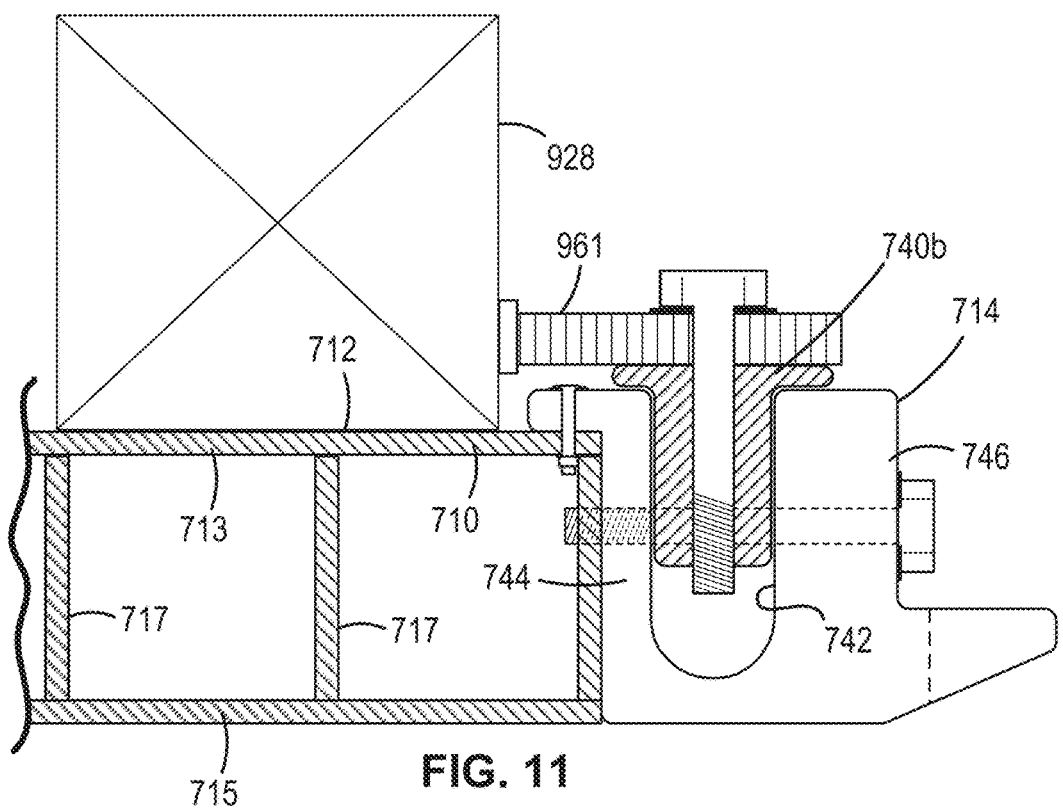
FIG. 11 is a section view of the second bracket of FIG. 9, in accordance with various embodiments.

With reference to FIG. 11, a section view of the bracket 961 attached to the fitting 740b and the payload 928 is illustrated, in accordance with various embodiments. Fitting 740b can be the same as, or similar to, fitting 740 of FIG. 7B.

Figure 12:
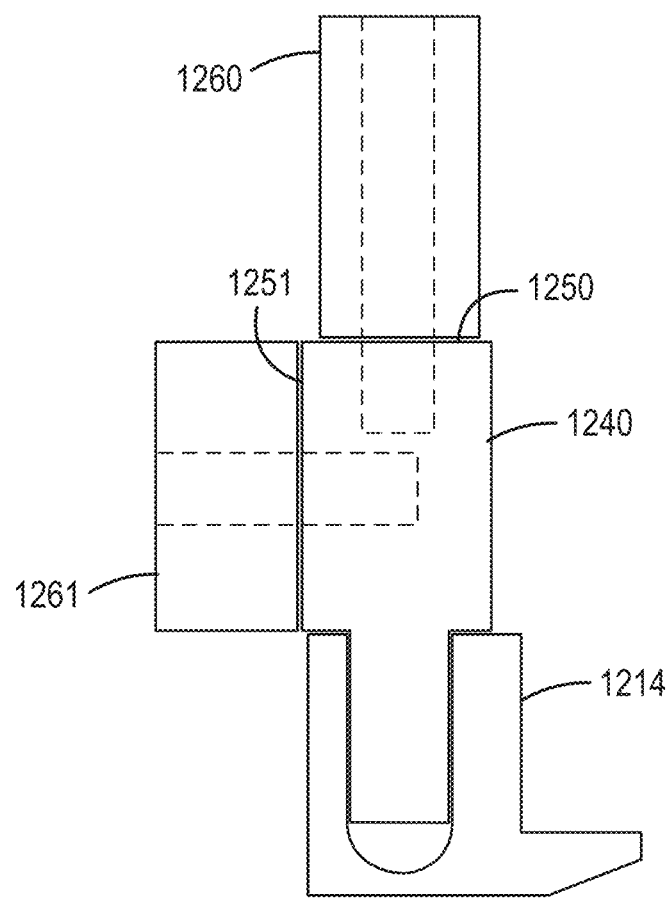
FIG. 12 is a schematic view of a fitting having a part coupled to a vertical surface of the fitting and a part coupled to a top or horizontal surface of the fitting, in accordance with various embodiments.

With reference to FIG. 12, a fitting 1240 installed on a side rail 1214 is illustrated with a first element 1260 attached to an upper surface thereof and a second element 1261 attached to a side surface thereof. Accordingly, the fitting 1240 can be designed to have an item (e.g., an adapter side frame, a payload, a bracket, etc.) secured to either or both the top surface 1250 and/or the side surface 1251.

With reference to FIG. 13, a fitting 1340 installed on a side rail 1314 is illustrated with the fitting 1340 having a shape or profile that is different from the fitting 1440 of FIG. 14. The fitting 1340 has a first portion 1381 disposed in the slot 1342 of the side rail 1314 that has a lateral dimension 1390 which is less than a lateral dimension 1391 of a second portion 1382 of the fitting 1340 located even further in the slot 1342. A profile of the slot 1342 is complementary to the profile of the fitting 1340 such that the slot 1342 similarly has a narrowed portion near the mouth of the slot 1342 and a wider portion near the bottom of the slot 1342. Accordingly, the fitting 1340 is mechanically blocked from moving out of the slot 1342 by the second portion 1382. Stated differently, the first wall 1344 of the side rail 1314 and the second wall 1346 of the side rail 1314 are configured to block the fitting 1340 from being pulled (vertically in FIG. 13) out of the slot 1342, though the fitting 1340 can be free to translate longitudinally along the slot 1342. Once the desired longitudinal position is achieved, a fastener 1347 can be positioned through the second portion 1382 of the fitting 1340 to block the fitting 1340 from moving longitudinally with respect to the side rail 1314. Accordingly, the fitting 1340 can be installed into the slot 1342 at an end of the platform and slid or translated along the slot 1342 to the desired longitudinal position.

With respect to FIG. 14, elements with like element numbering, as depicted in FIG. 13, are intended to be the same and will not necessarily be repeated for the sake of clarity. With reference to FIG. 14, the fitting 1440 can be similar to the fitting 1340 except that the lateral dimension 1390 of the fitting 1440 is the same along the entire height of the portion 1481 disposed within the slot 1342. Accordingly, instead of having to insert the fitting 1440 at an end of the platform (as with fitting 1340 of FIG. 13), the fitting 1440 can be inserted (vertically in FIG. 14) into the slot 1342 at the desired longitudinal location of the side rail 1314.

Figure 15A:
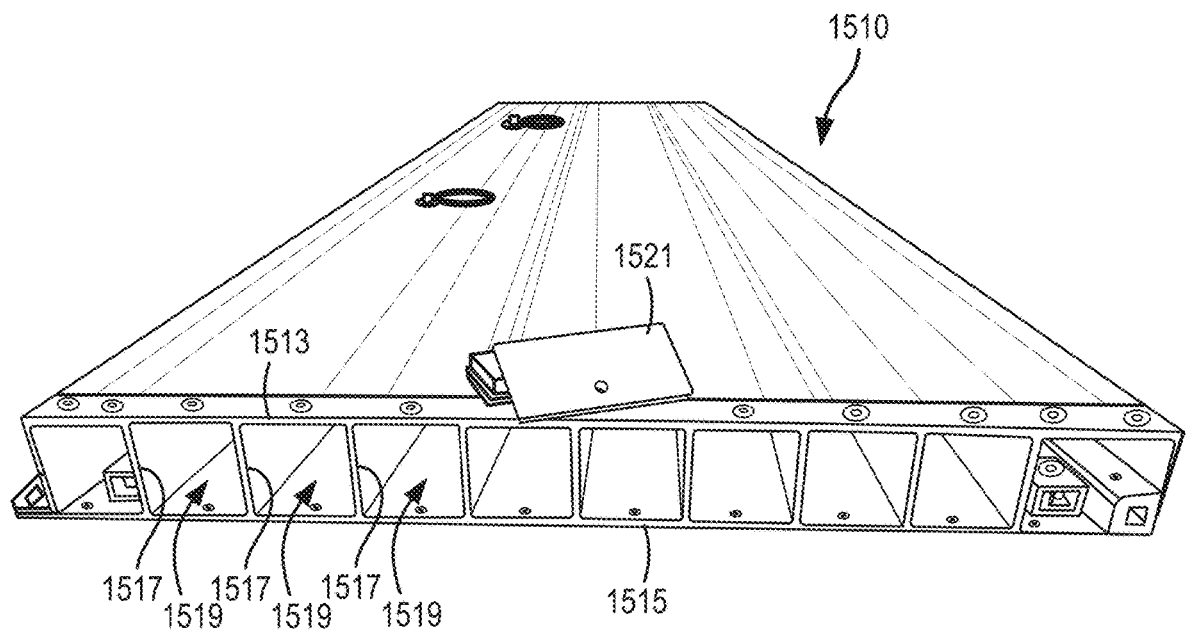
FIG. 15A is a perspective view of a platform panel for an aerial delivery system, in accordance with various embodiments.
Figure 15B:
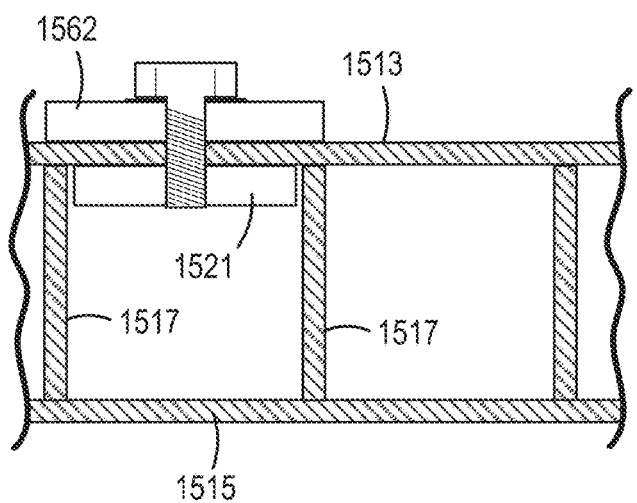
FIG. 15B is a section view of a platform panel for an aerial delivery system with a structural support mounted to a top skin of the platform panel via a reinforcement plate, in accordance with various embodiments.

With reference to FIG. 15A, a platform 1510 is illustrated in accordance with various embodiments. The platform 1510 includes a first skin 1513 and a second skin 1515 and a plurality of support ribs 1517 extending therebetween. The first skin 1513 can be spaced apart from the second skin 1515 via the support ribs 1517, such that a plurality of channels 1519 are defined laterally between adjacent support ribs 1517 and vertically between the first skin 1513 and the second skin 1515. With combined reference to FIG. 15A and FIG. 15B, one or more reinforcement plates 1521 can be disposed within a channel 1519 of the platform for providing a "backing" or reinforcement for fastening an item 1562 (e.g., a crossbar or the like) to the skin 1513. FIG. 15A illustrates a perspective view of a stack of reinforcement plates 1521 resting on the skin 1513 before being installed to the platform 1510. FIG. 15B illustrates a section view of the reinforcement plate 1521 installed to the platform 1510. The reinforcement plate(s) 1521 can be disposed at various longitudinal and/or lateral locations beneath the skin 1513 depending on the desired attachment points for a payload.

Figure 16:
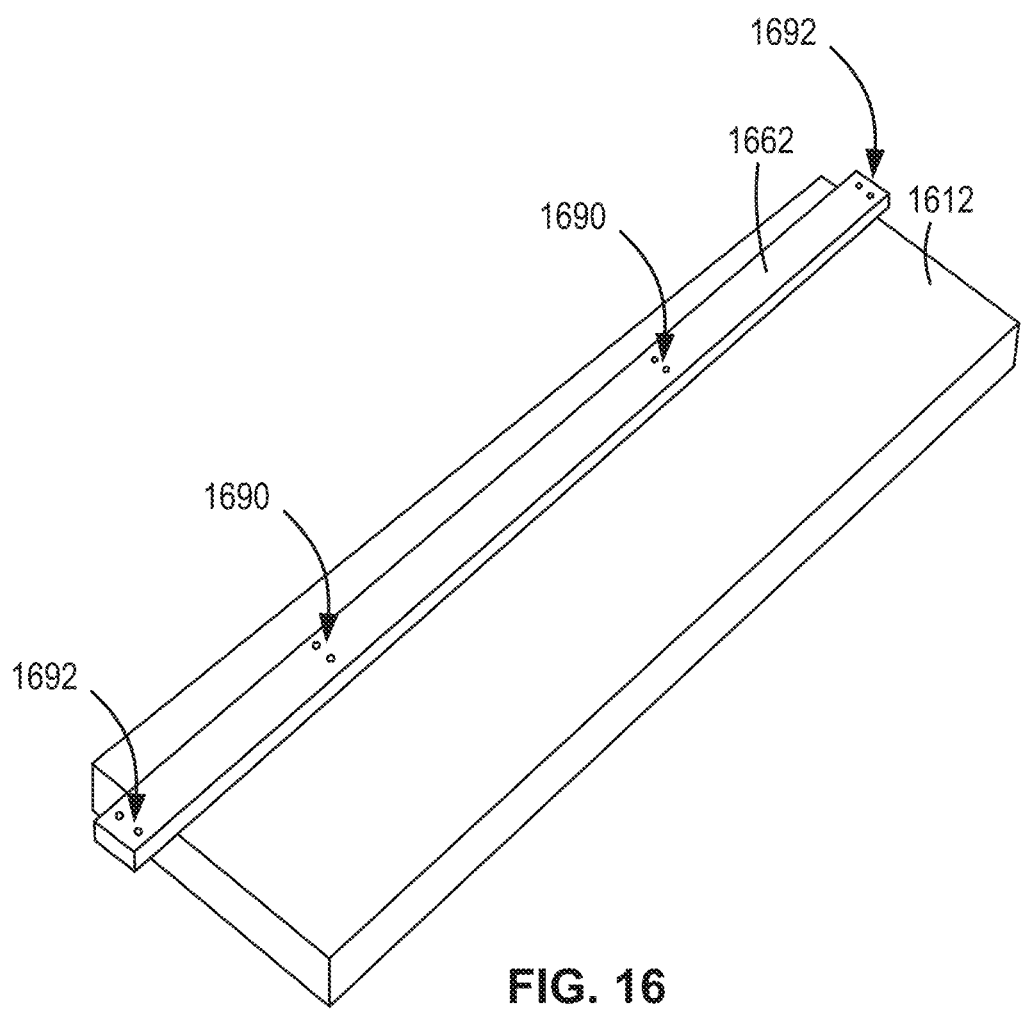
FIG. 16 is a perspective view of a platform panel for an aerial delivery system having a crossbar installed thereon, in accordance with various embodiments.

With reference to FIG. 16, a platform panel 1612 is illustrated with a crossbar 1662 installed thereon. In various embodiments, the platform panel 1612 is similar to the platform panels described with respect to FIG. 22A. The crossbar 1662 can be installed to the platform panel 1612 before a payload is installed onto the platform panel 1612. The crossbar 1662 can be attached to the platform panel 1612 at each location 1690 where reinforcement plates (also referred to as cargo ring nut plates) are located. The outboard ends 1692 of the crossbar 1662 can be anchored to side rail fittings (e.g., similar to any of the side rail fittings described herein) in addition to the cargo ring nut plates. The crossbar 1662 can be anchored to the cargo ring nut plates somewhat near the center of the crossbar 1662. Because the crossbar 1662 extends above the upper surface of the platform panel 1612, the side frames of the adapter can be notched on their bottoms so the crossbars 1662 can fit up into them, for example as illustrated in FIG. 17.

Figure 17:
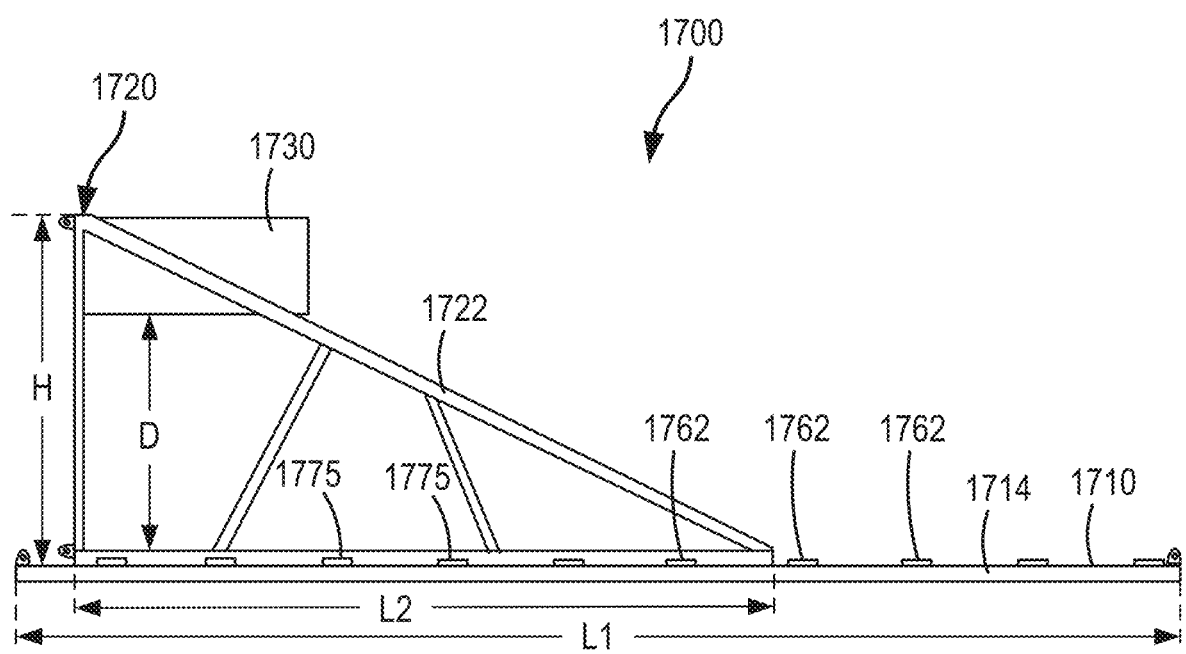
FIG. 17 is a side view of an aerial delivery system having a plurality of crossbars disposed along the platform, in accordance with various embodiments.

With reference to FIG. 17, an aerial delivery system 1700 is illustrated, in accordance with various embodiments. The aerial delivery system 1700 generally includes a platform 1710 with a plurality of crossbars 1762 extending laterally across the platform 1710, each crossbar 1762 spaced apart longitudinally along the length of the platform 1710.

The aerial delivery system 1700 further includes an adapter 1720 including a first side frame 1722 configured to be coupled to a first side rail 1714. The adapter 1720 can be similar to platform adapter 120 of FIG. 1A through FIG. 3C, in accordance with various embodiments. The adapter 1720 can include a plurality of notches 1775, each configured to accommodate (e.g., receive) a crossbar 1762. Accordingly, the crossbars 1762 can extend between the adapter 1720 and the top skin of the platform 1710.

The adapter 1720 can have a total height H, which may be limited by an aircraft cargo door dimension. A distance D between the parachute compartment 1730 and the platform 1710 may be configured so that cargo can be disposed between the parachute compartment 1730 and the platform 1710. A total length L1 of the platform can be greater than a total length L2 of the adapter 1720. The total length L1 can be between 140% and 200% of the total length L2 in various embodiments, between 150% and 190% of the total length L2 in various embodiments, and between 160% and 180% of the total length L2 in various embodiments. In various embodiments, the total length L1 can be between 16 feet and 24 feet (4.88 meters-7.31 meters). In various embodiments, the total length L2 can be between 10 feet and 14 feet (3.05 meters-4.27 meters). However, the dimensions of the platform 1710 and/or the adapter 1720 can vary and/or be scaled according to the size and dimensions of the desired payload.

Figure 18A:
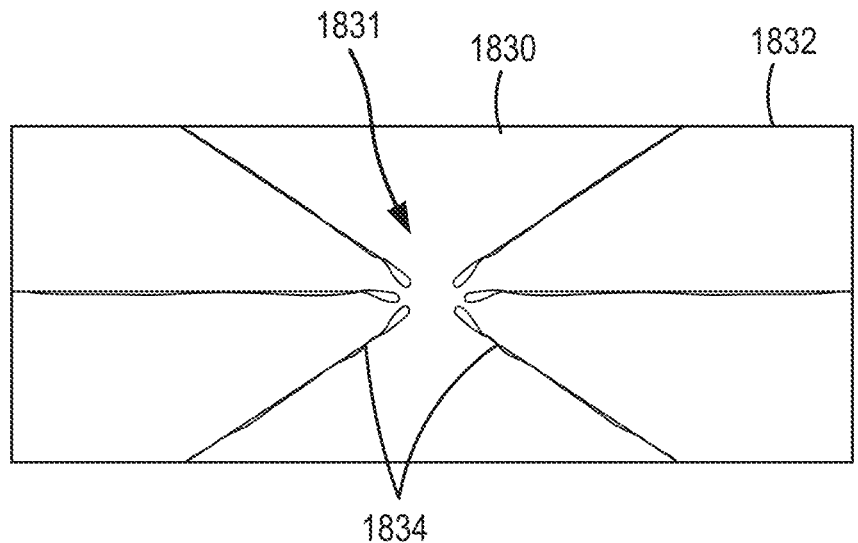
FIG. 18A and FIG. 18B are rear views of a parachute compartment with a parachute retention system in an unsecured state and a secured state, respectively, in accordance with various embodiments.
Figure 18B:
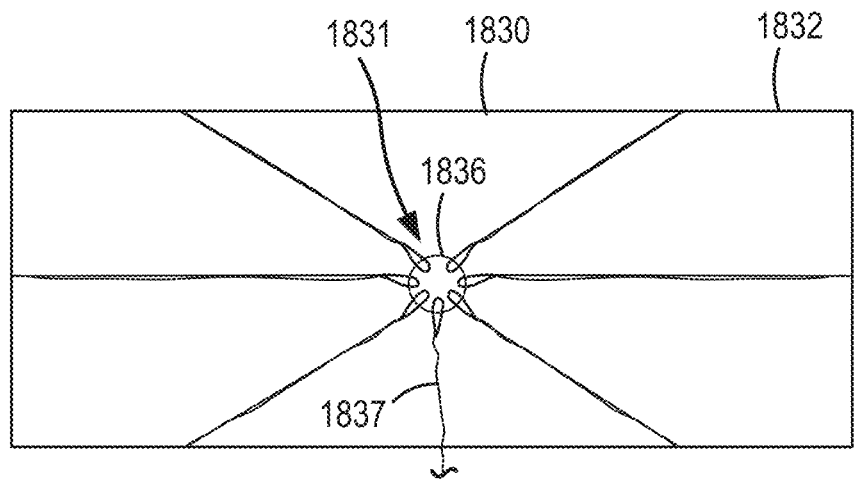

With reference to FIG. 18A and FIG. 18B is a schematic rear view of a parachute compartment 1830 with a rear-facing mouth or opening 1831. The parachute compartment 1830 can include a box 1832 with a rear-facing mouth or opening 1831. Accordingly, parachute rigging may simply include shoving one or more parachutes into the box 1832 and securing a spider leg retention system 1834 with a cut-loop 1836. A knife lanyard 1837 can be coupled to the cut-loop 1836 for releasing the spider leg retention system 1834 to release the parachute. The spider leg retention system 1834 can include a plurality of textile lanyards having loops that are cinched together with the cut-loop 1836. This parachute compartment 1830 can be removable, which allows the parachutes to be rigged away from the adapter and then the parachute compartment 1830 can be installed after the payload dispensers have been installed to the platform.

Figure 19A:
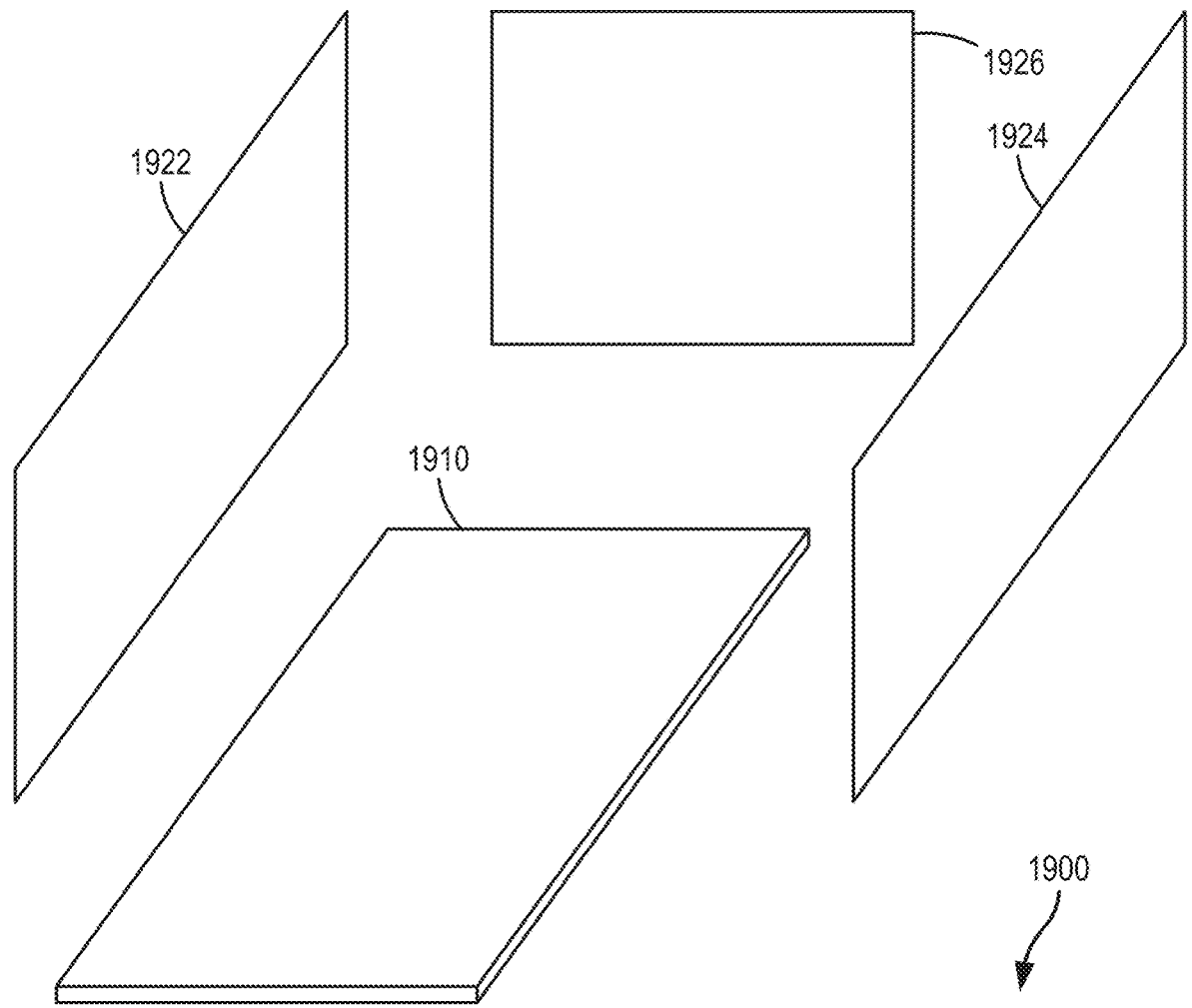
FIG. 19A and FIG. 19B are assembly and perspective views of an aerial delivery system having rectangular frame elements, in accordance with various embodiments.
Figure 19B:
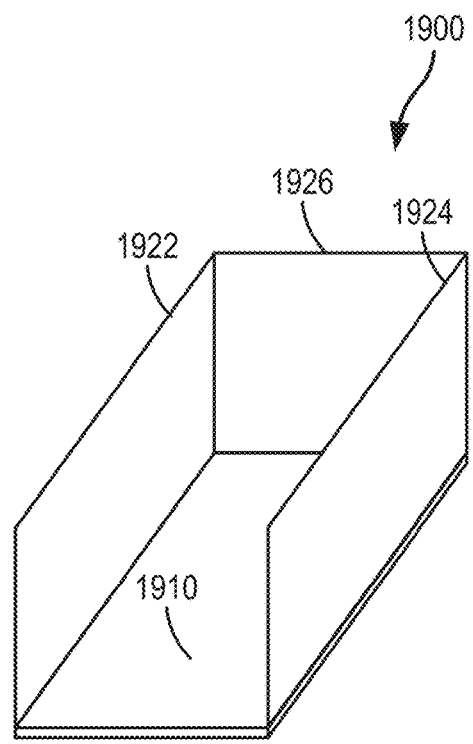

With reference to FIG. 19A and FIG. 19B, an aerial delivery system 1900 including a platform 1910, a first side frame 1922, a second side frame 1924, and a back frame 1926 are illustrated. The first and second side frames 1922, 1924 comprise a rectangular geometry. The back frame 1926 can have a square or a rectangular geometry. The platform 1910 and/or the platform adapter elements (i.e., the first side frame 1922, the second side frame 1924, and the back frame 1926) can be similar to any of the platforms and/or platform adapter elements disclosed herein.

With reference to FIG. 20A and FIG. 20B, an aerial delivery system 2000 including a platform 2010, a first side frame 2022, a second side frame 2024, a back frame 2026, and a front frame 2027 are illustrated. The first and second side frames 2022, 2024 comprise a rectangular geometry. The front frame 2027 and the back frame 2026 can have a square or a rectangular geometry. The platform and/or the platform adapter elements of FIG. 20A and FIG. 20B can be similar to any of the platforms and/or platform adapter elements disclosed herein.

With reference to FIG. 21A and FIG. 21B, an aerial delivery system 2100 including a platform 2110, a first side frame 2122, a second side frame 2124, a back frame 2126, a front frame 2127, and a top frame 2111 are illustrated. The first and second side frames 2122, 2124 comprise a rectangular geometry. The front frame 2127 and the back frame 2126 can have a square or a rectangular geometry. The top frame 2111 can have a rectangular geometry. The platform and/or the platform adapter elements of FIG. 21A and FIG. 21B can be similar to any of the platforms and/or platform adapter elements disclosed herein.

Figure 22A:
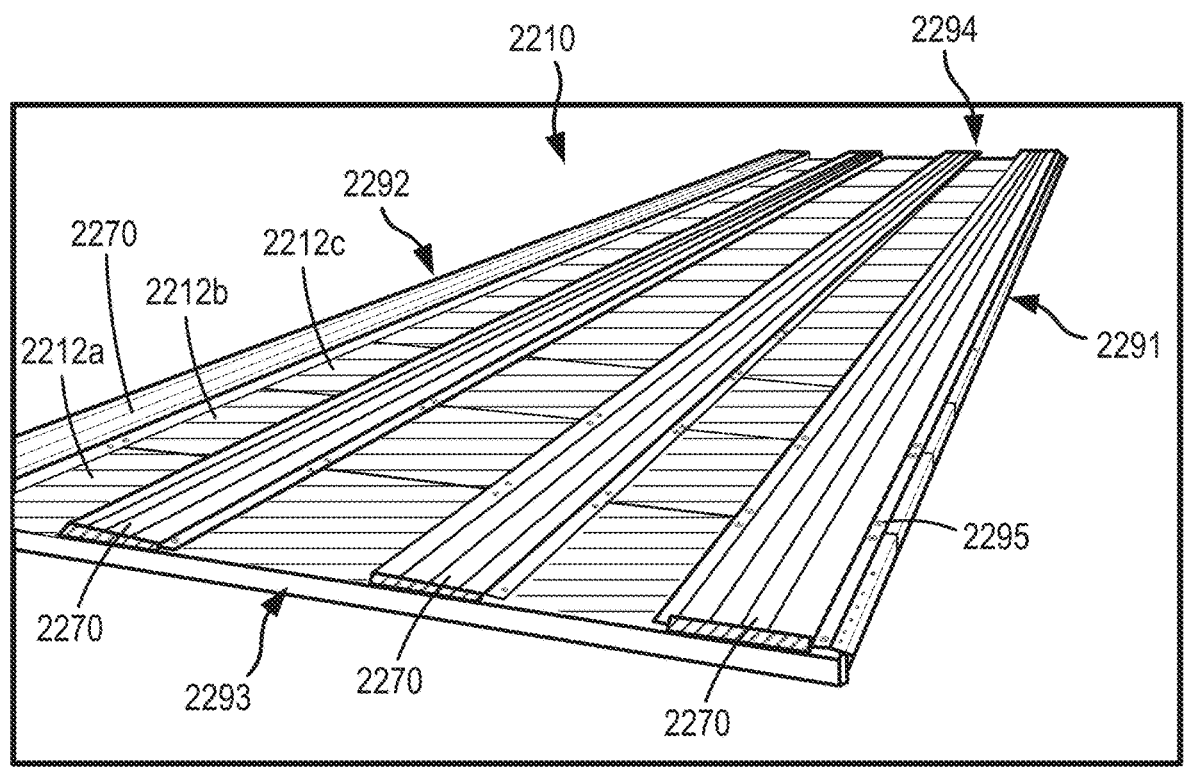
FIG. 22A is a perspective view of a bottom side of a platform for an aerial delivery system having a plurality of roller pads, in accordance with various embodiments.

With reference to FIG. 22A, a perspective view of a bottom surface of a platform 2210 is illustrated, in accordance with various embodiments. The platform 2210 may comprise a plurality of rectangular platform panels (e.g., panel 2212a, panel 2212b, panel 2212c) that extend between and to a first side 2291 of the platform 2210 and a second side 2292 of the platform 2210. A plurality of roller pads 2270 extend longitudinally between and to a first end 2293 of the platform 2210 and a second end 2294 of the platform 2210. The roller pads 2270 extend across the panels 2212a, 2212b, 2212c. The panels 2212a, 2212b, 2212c, etc. can be coupled together via the roller pads 2270. The roller pads 2270 are named as such because they are configured to be positioned atop rollers, similar to conveyer rollers, mounted on the aircraft floor to facilitate the platform rolling into and out of the aircraft.

Figure 22B:
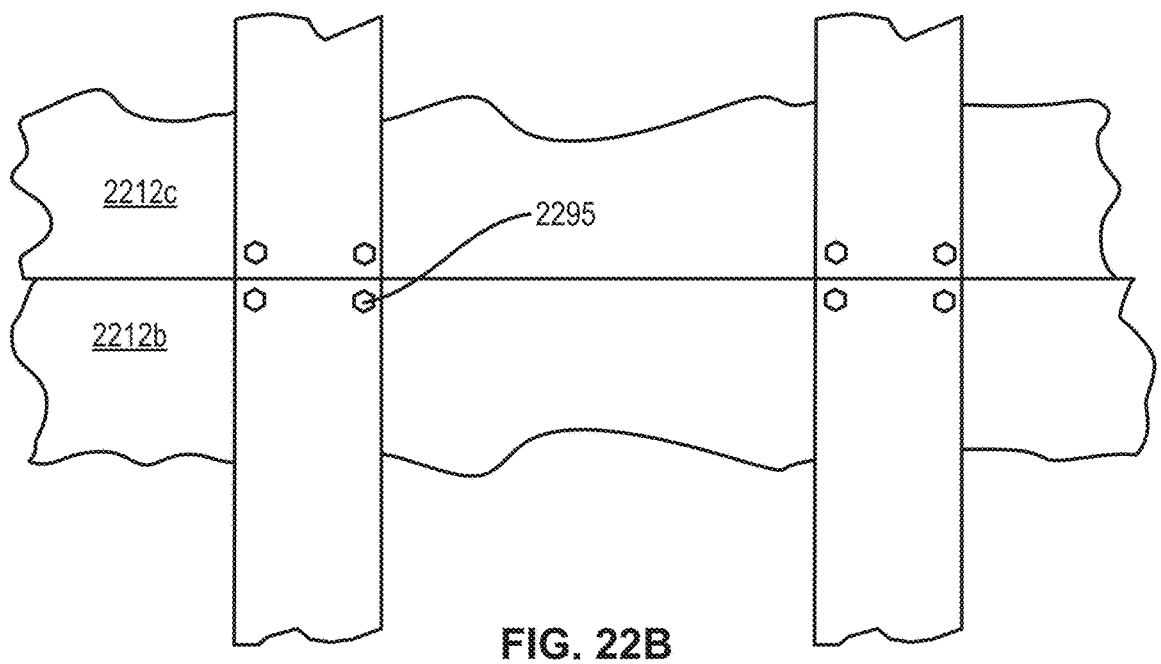
FIG. 22B is a schematic bottom view of the platform with fasteners securing the plurality of roller pads to the platform panels, in accordance with various embodiments.
Figure 22C:
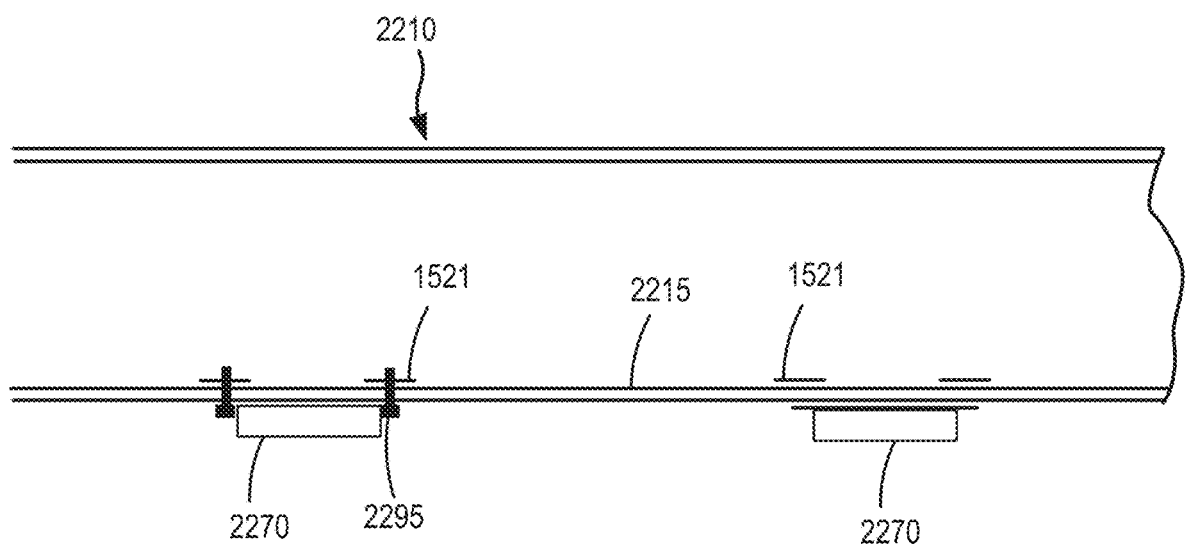
FIG. 22C is a schematic front view of the platform with fasteners securing a roller pad to the platform panels via reinforcement plates, in accordance with various embodiments.

With combined reference to FIG. 22A, FIG. 22B, and FIG. 22C, at each location where a roller pad 270 crosses the interface between two platform panels (e.g., platform panel 2212b and platform panel 2212c), there can be four fasteners 2295 (e.g., bolts or the like) that secure the roller pad 2270 to the panels (e.g., platform panel 2212b and platform panel 2212c). Across the width (i.e., left to right in FIG. 22B) of the platform, and four roller pads, sixteen fasteners 2295 can be used for the connections (i.e., four per roller pad 2270).

With reference to FIG. 22C, a schematic front view of a portion of the platform 2210 is illustrated with fasteners 2295 securing the roller pad 2270 at the left of FIG. 22C to the platform 2210 and with the roller pad 2270 at the right of FIG. 22C in the installed position, but before the fasteners 2295 are installed. One or more reinforcement plates 1521 can be installed within the platform 2210 for securing the fasteners 2295 to the second skin 2215.

Figure 22D:
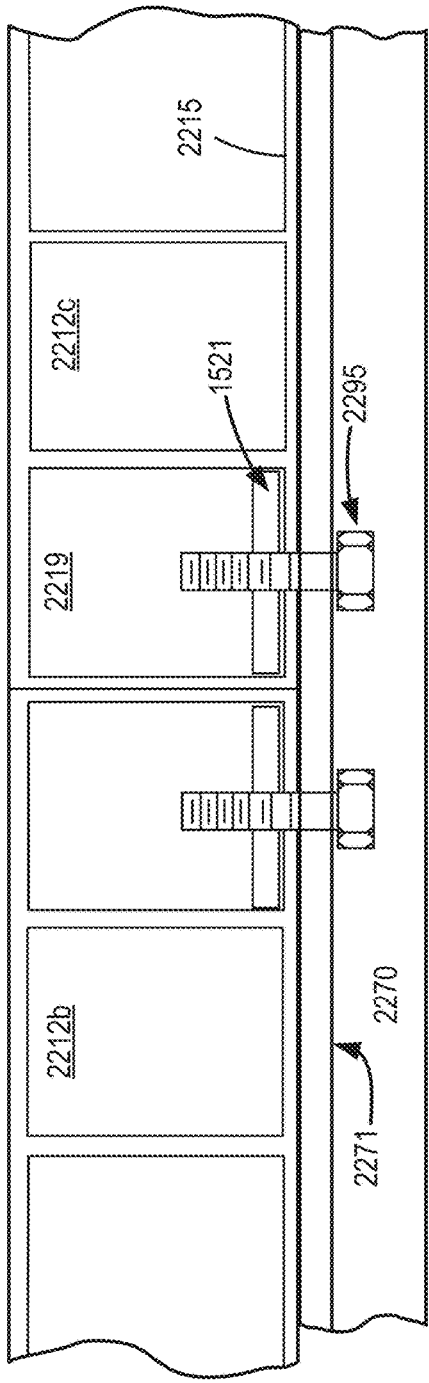
FIG. 22D is a schematic side view of the platform with fasteners securing a roller pad to the platform panels via reinforcement plates, in accordance with various embodiments.

With reference to FIG. 22D, each roller pad 2270 can be fastened between panels (e.g., panel 2212b and panel 2212c) by positioning fasteners 2295 to extend between a flange 2271 of the roller pad 2270, through the second skin 2215 of the panel, and threaded to a reinforcement plate 1521 located within a channel (e.g., channel 2219) of the panel. In various embodiments, the fastener 2295 terminates within the channel 2219.

Figure 22E:
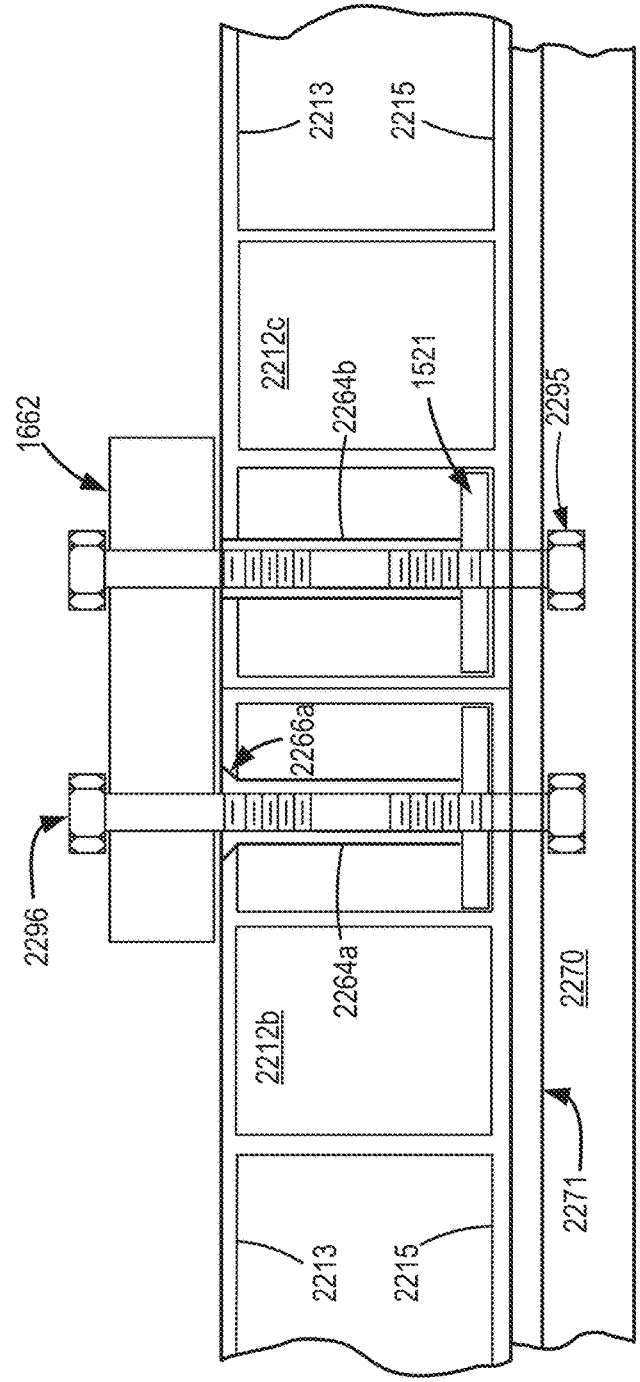
FIG. 22E and FIG. 22F are a schematic side view of the platform with a roller pad and a crossbar secured to the panels via threaded spacers, in accordance with various embodiments.

With reference to FIG. 22E, a threaded spacer (e.g., threaded spacer 2264a and/or threaded spacer 2264b; referred to generally as threaded spacer 2264) can be disposed between the first skin 2213 and the second skin 2215. In various embodiments, the threaded spacer 2264 (also referred to herein as a platform fitting) is configured to receive a fastener 2296 from the first skin 2213. In various embodiments, the threaded spacer 2264 is configured to receive the fastener 2295 from the second skin 2215. The threaded spacer 2264 can define a threaded bore extending therethrough and open at both ends thereof. The fastener 2296 can be received in the threaded spacer 2264 at a first end thereof and the fastener 2295 can be received in the threaded spacer 2264 at a second end thereof. The height of the threaded spacer 2264 can be made to extend from the top skin 2213 to either the bottom skin 2215 or the reinforcement plate 1521. Accordingly, the threaded spacer 2264 can provide a means for attaching a crossbar 1662 to the top skin 2213 of the panels. Moreover, the crossbar 1662 can be attached between the panels (e.g., panel 2212b and panel 2212c). This process can be performed in the field, i.e., away from the factory where the panels/platforms were fabricated. In various embodiments, threaded spacer 2264a includes a flange 2266a configured to recess within the first skin 2213. In this regard, threaded spacer 2264a can be a flanged threaded spacer. Threaded spacer 2264b can be a non-flanged threaded spacer.

Figure 22F:
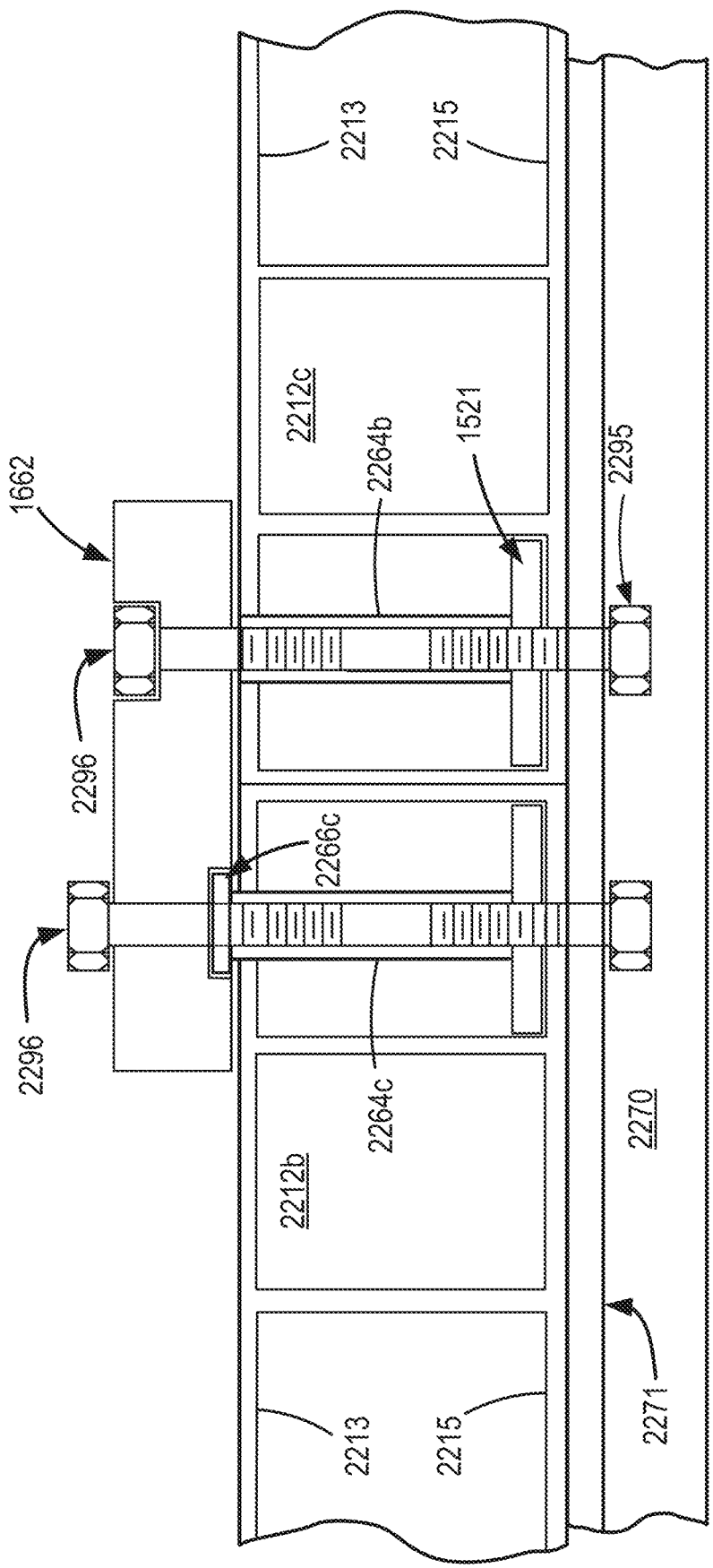

With reference to FIG. 22F, the crossbar 1662 can include one or more depressions so that the head of fastener 2296 does not protrude above the upper surface of the crossbar 1662. Stated differently, the heads of the fasteners 2296 can be inset into the top of the crossbar 1662. In various embodiments, threaded spacer 2264c includes a flange 2266c configured to rest on the upper surface of the first skin 2213. Accordingly, the crossbar 1662 can include one or more depressions to accommodate the flange 2266c. In this regard, threaded spacer 2264c can be a flanged threaded spacer.

Figure 22G:
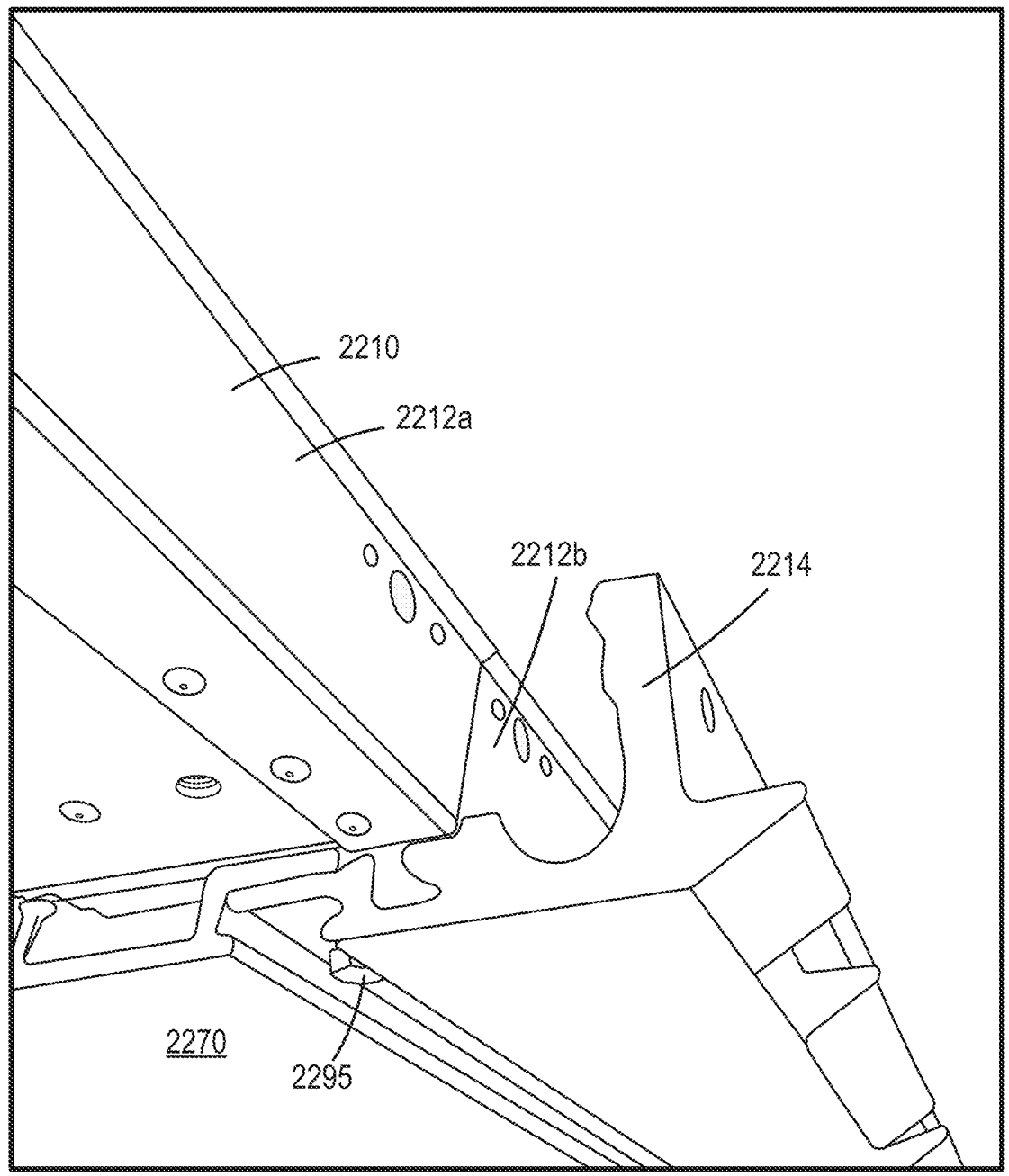
FIG. 22G is a partial section view of a side rail and a roller pad coupled to the platform panels, in accordance with various embodiments.

With reference to FIG. 22G, a partial section view of the platform 2210 with a side rail 2214 fastened to the platform panels (e.g., panel 2212a, panel 2212b, etc.) is illustrated, in accordance with various embodiments. In various embodiments, the side rail 2214 overlaps with the roller pad 2270. In various embodiments, the side rail 2214 and the roller pad 2270 are fastened to the platform 2210 with common fasteners 2295 (see FIG. 22A and FIG. 22G).

Figure 22H:
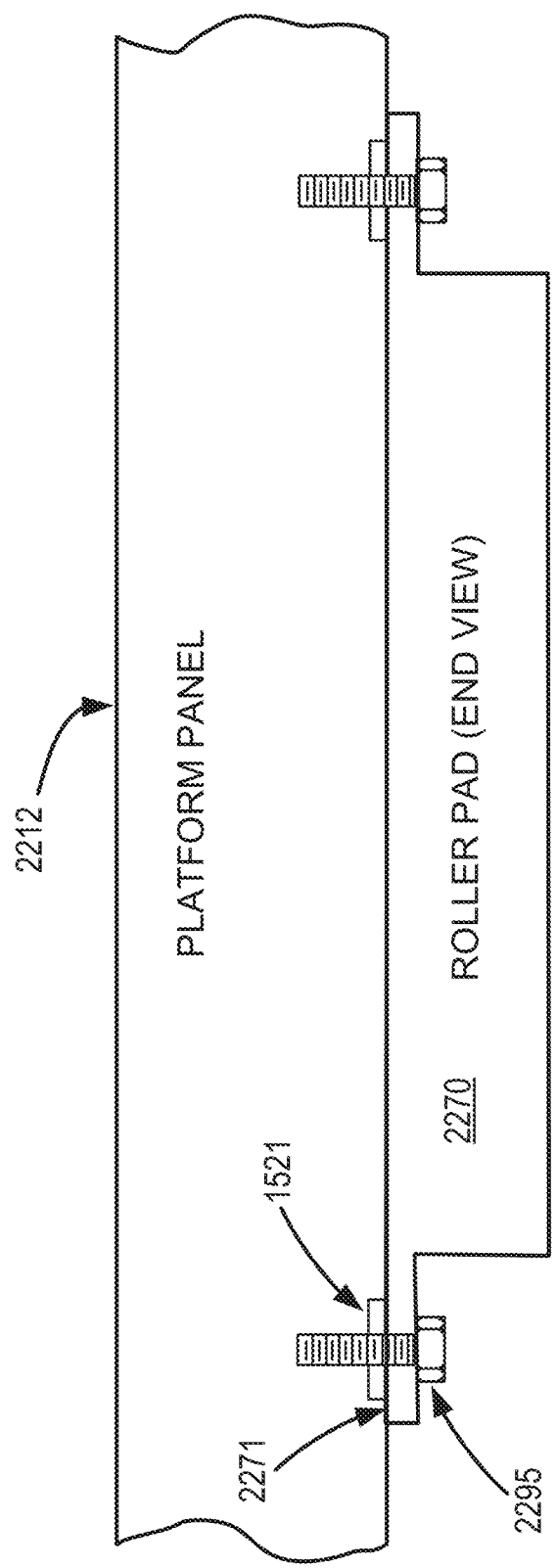
FIG. 22H is a schematic end view of the platform with fasteners securing a roller pad to the platform panels via reinforcement plates, in accordance with various embodiments.

FIG. 22H illustrates a technique used for securing the roller pads 2270 to the platform panels 2212, in accordance with various embodiments. The fasteners 2295 extend through the flange 2271 on the roller pads 2270 before being threaded into the internal reinforcement plates 1521.

Figure 22I:
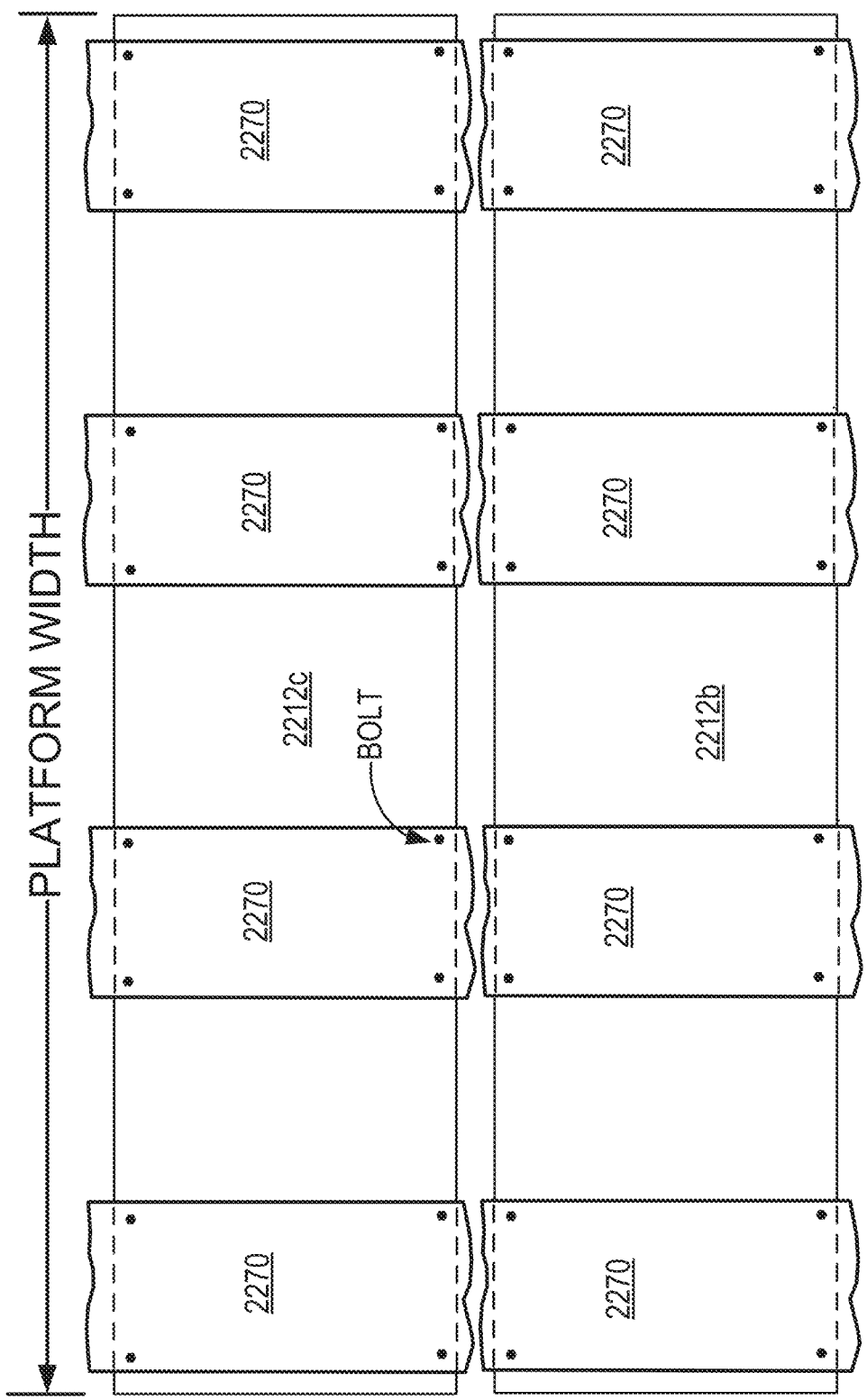
FIG. 22I is a fragmentary schematic bottom view of the platform with platform panels moved slightly apart from one another and the bolt locations for the roller pads, in accordance with various embodiments.

With reference to FIG. 22I, the bottom sides of two platform panels (e.g., panel 2212b and panel 2212c), in close proximity to each other, are illustrated, in accordance with various embodiments. As can be visualized, if the two platform panels 2212b, 2212c were moved tightly together, there would be two rows of eight bolts in each row to act as bottom anchor points for the threaded spacers (e.g., threaded spacers 2264 of FIG. 22E-FIG. 22F). Assuming the platform panels are 24", front to rear, it would result in there being a set of these 16 bolts spaced 2' apart, longitudinally, for the full length of the platform. The exception would be at the extreme front and extreme rear of the platform where there would be only one row of bolts, with each row having only 8 bolts.

Figure 22J:
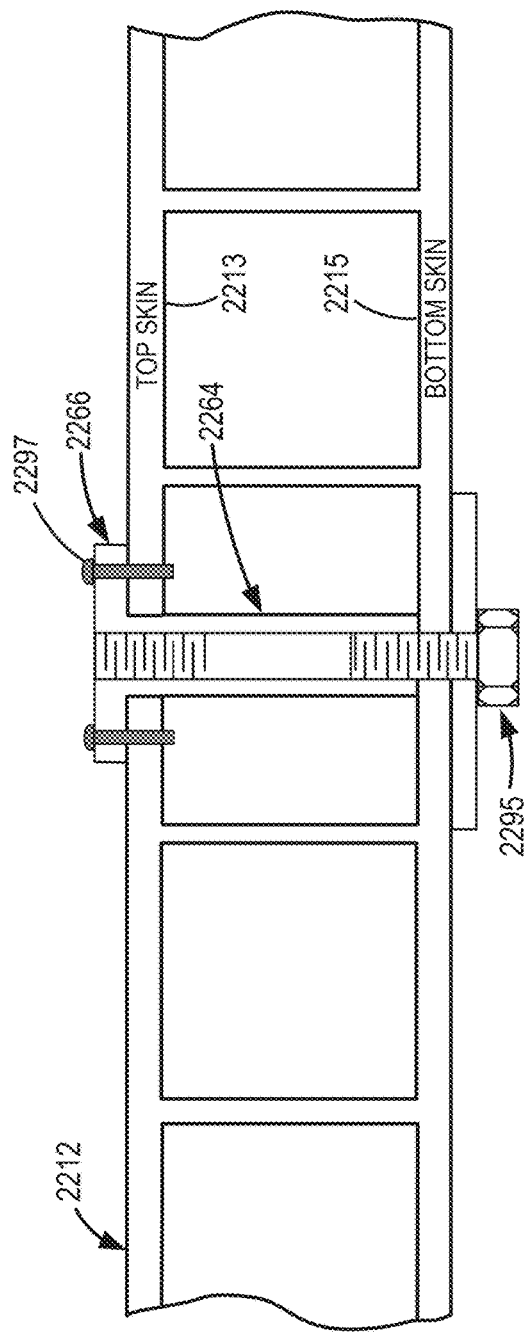
FIG. 22J is a schematic side view of the platform with a threaded spacer installed to a platform panel, in accordance with various embodiments.

The reinforcement plates are intended to prevent the bolts from being torn out of the bottom skin of the platform panel and allowing the roller pads to fall away from the platform assembly while the platform assembly is suspended by something such as a parachute system. However, with reference to FIG. 22J if a threaded spacer 2264 were to be threaded onto a roller pad securing bolt 2295, and an upward force was applied to it by a payload (a downward force could not typically be applied to it because the payload would be setting atop the platform panels and they would oppose the downward force) the upward force would be primarily opposed by the roller pad flange 2271, not the reinforcement plate. With that being the case, reinforcement plates may serve no useful purpose so additional holes could be made through the platform panels and roller pad flanges to allow threaded spacers to be installed nearly anywhere along the length of the roller pads which could, in turn, provide dispenser or other cargo bolting locations at other than the 24" spacing locations. Additionally, if a washer or backing plate that was somewhat similar to the roller pad flange was provided between a bolt head and the lower surface of a platform panel, a bolting point could be established at nearly any lateral location between two roller pads.

Figure 23B:
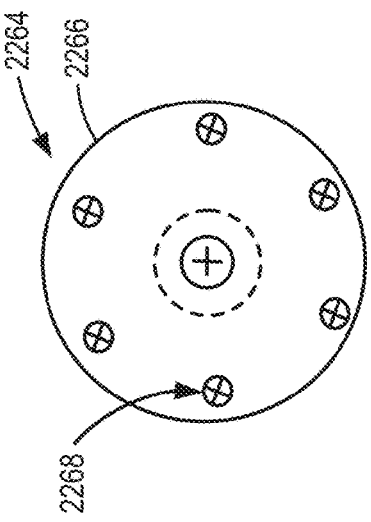
FIG. 23B is an axial view of the threaded spacer of FIG. 22J, in accordance with various embodiments.
Figure 23A:
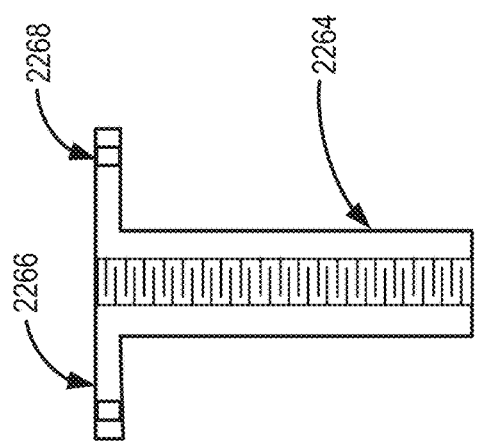
FIG. 23A is a section view of the threaded spacer of FIG. 22J, in accordance with various embodiments.

FIG. 23A shows a section view of the threaded spacer 2264 with a plurality of holes 2268 extending through the flange 2266. With reference to FIG. 23B, an axial view of the threaded spacer 2264 shows the holes 2268 disposed circumferentially around the flange 2266. With additional reference to FIG. 22J, each hole 2268 can receive a fastener (e.g., a rivet) to secure the flange 2266 to the first skin 2213.

With the combination of a bolt securing the bottom of the threaded spacer 2264 and with rivets, or other fasteners, securing the spacer flange 2266 atop the platform panel 2212, a very strong anchoring point can be made without the need for installation of internal reinforcement plates. So, providing anchoring provisions atop an aerial delivery platform, something that has previously been an extremely difficult task once the platform or platform panels had left the fabrication facility, can be accomplished relatively easily in accordance with aspects of the present disclosure.

Figure 24:
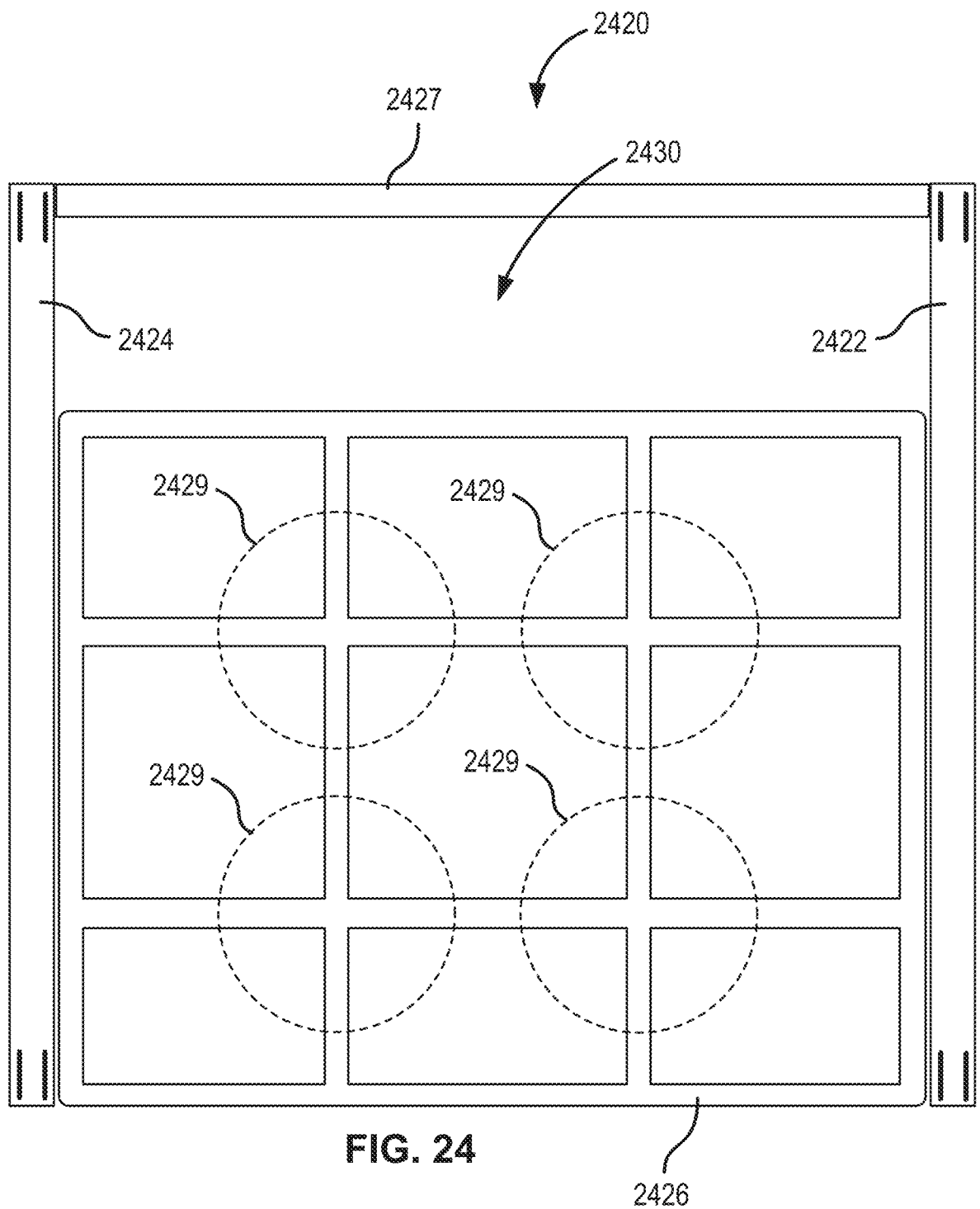
FIG. 24 is a rear view of a platform-to-payload adapter for an aerial delivery system having a crossbar coupled between the top end of a first side frame and a second side frame, in accordance with various embodiments.

With reference to FIG. 24, a rear view of a platform adapter 2420 is illustrated, in accordance with various embodiments. Platform adapter 2420 includes a first side frame 2422, a second side frame 2424, a back frame 2426, and a cross member 2427 extending between and to the first side frame 2422 and the second side frame 2424. The cross member 2427 can be a beam or other structural support coupled to top ends of the first and second side frames 2422 and 2424. The cross member 2427 can prevent the tops of the individual first and second side frames 2422 and 2424 from being cantilevered above the releasable items 2429, which could undesirably allow a parachute side load to be directed into only, or primarily, one side frame (side frame 2422 or side frame 2424). The cross member 2427 can be secured between the side frame 2422 and the side frame 2424 directly above the parachute compartment 2430.

Figure 25:
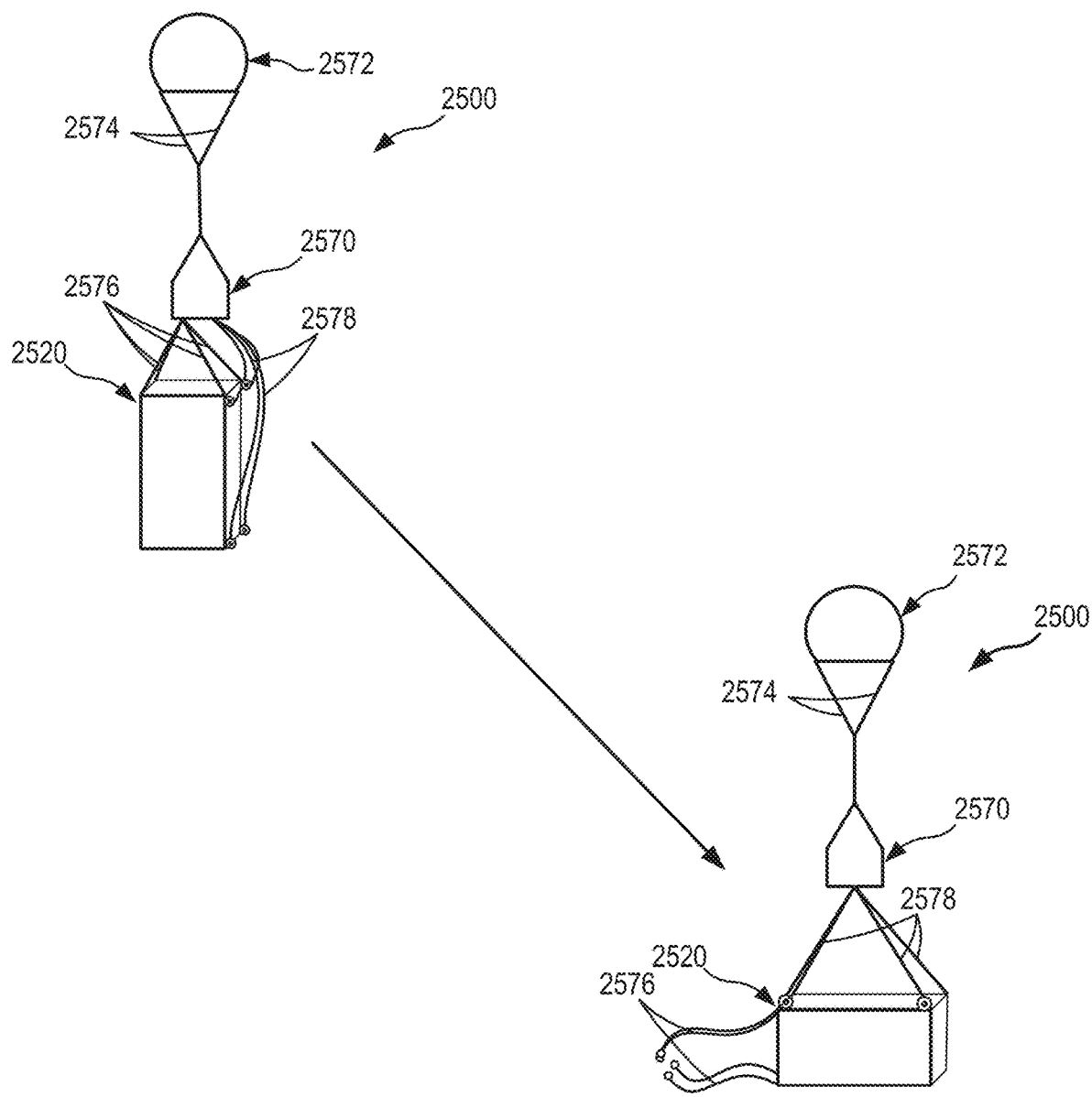
FIG. 25 is a schematic view of an aerial delivery system during a descent in a nose-to-ground attitude and a horizontal attitude, in accordance with various embodiments.

With reference to FIG. 25, an aerial delivery system 2500 is illustrated transitioning from a first attitude (i.e., vertical or nose down) to a second attitude (i.e., horizontal) during an aerial descent, in accordance with various embodiments. Aerial delivery system 2500 can include a parachute release system generally including a parachute release mechanism 2570, which in use is interconnected between a parachute 2572 and an adapter 2520. The parachute release mechanism 2570 can be similar to the parachute release mechanism disclosed in one or more of U.S. Pat. No. 7,264,205 entitled PARACHUTE RELEASE APPARATUS, U.S. Pat. No. 11,035,155 entitled LEVER-LOCK RELEASE SYSTEMS AND METHODS, and U.S. Pat. No. 11,465,760 entitled TENSIONED PARACHUTE RELEASE MECHANISM. That is, a parachute release mechanism 2570, as defined herein, generally refers to an apparatus or device disposed between the parachute 2572 and the adapter 2520 to enable one or more portions of the adapter 2520 to be disconnected (e.g., released) from the parachute 2572. Accordingly, parachute release mechanism 2570 may interface with parachute risers 2574, a first set of payload suspension straps 2576, and a second set of payload suspension straps 2578. Thus, parachute release mechanism 2570 provided herein is configured to releasably couple a parachute 2572 to one or more portions of the adapter 2520, according to various embodiments.

In accordance with an exemplary embodiment, after being extracted from an aircraft, aerial delivery system 2500 will begin transitioning to a vertical attitude due to drag produced by parachute 2572. During an initial portion of a descent, it may be desirable to orient the adapter 2520 nose-to-ground to facilitate the release of one or more releasable items from the adaptor 2520. With aerial delivery system 2500 stabilized in a generally vertical attitude, at least one releasable item may be released at the users' discretion. According to an exemplary embodiment, aerial delivery system 2500 may contain only one releasable item. In other exemplary embodiments, aerial delivery system 2500 contains multiple releasable items. A releasable item may be configured for any specific purpose. For example, a releasable item could be a target for a tracking system; alternatively, a releasable item could be a test vehicle, which could be allowed to free fall to obtain a desired velocity for parachute testing; further, a releasable item could be a piece of ordnance. Upon activation of releasable securing mechanism, gravity causes the releasable item to separate from aerial delivery system 2500 under the influence of a linear guidance device. Aspects of the aerial delivery system 2500 can be similar to the aerial delivery system disclosed in one or more of U.S. Pat. No. 8,186,624 entitled AERIAL DELIVERY SYSTEM and U.S. Pat. No. 9,399,514 entitled AERIAL DELIVERY SYSTEM WITH MUNITION ADAPTER AND LATCHING RELEASE.

At a second portion of the descent, it may be desirable to orient the adapter 2520 horizontally to facilitate the landing of the adaptor 2520, among other reasons. The attitude of the adapter 2520 can be varied by releasing the first set of payload suspension straps 2576 such that the adapter 2520 is suspended by the second set of payload suspension straps 2578. The attachment location and lengths of the first set of payload suspension straps 2576 and the second set of payload suspension straps 2578 will determine the attitude of the adapter 2520 during the descent. The first set of payload suspension straps 2576 can be of about equal length; thus, adapter 2520 is oriented substantially vertically when suspended by the first set of payload suspension straps 2576. The second set of payload suspension straps 2578 can be of about equal length; thus, adapter 2520 is oriented substantially horizontally when suspended by the second set of payload suspension straps 2578. The first plurality of payload suspension straps 2576 are attached to the adapter 2520 at a different location from the second plurality of payload suspension straps 2578. The second plurality of payload suspension straps 2578 can be attached to the adapter 2520 or a platform (e.g., see platform 1710 of FIG. 17) coupled thereto. Various suspension strap mounting locations may be utilized to achieve a desired attitude of adapter 2520. Although described as descending first in a nose-down orientation and subsequently a horizontal orientation, this order can be reversed without departing from the scope of the present disclosure.

Figure 26:
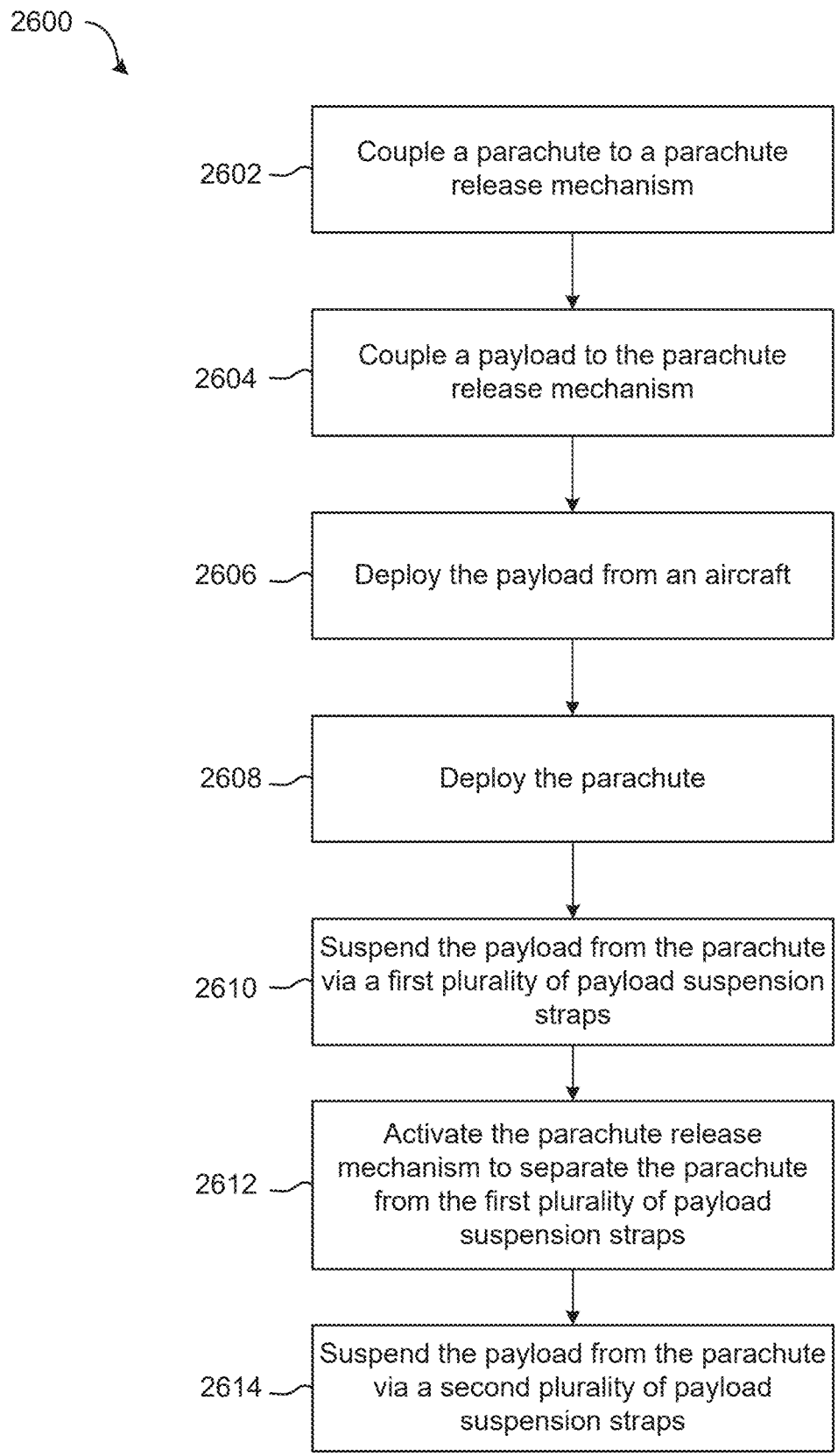
FIG. 26 is a schematic flow chart diagram of a method of controlling an attitude of an aerial delivery apparatus, in accordance with various embodiments.

In various embodiments, and with reference now to FIG. 26, a method 2600 of controlling an attitude of an aerial delivery apparatus is provided. The method 2600 can include coupling a parachute to a parachute release mechanism at step 2602 and coupling a payload (e.g., via an aerial delivery apparatus) to the parachute release mechanism via a first set of payload suspension straps and a second plurality of payload suspension straps at step 2604. At step 2606, the payload (and the aerial delivery apparatus) is deployed from an aircraft. At step 2608 the parachute is deployed to control a descent of the aerial delivery apparatus. At step 2610 the aerial delivery apparatus (with the payload) is suspended from the parachute via the first plurality of payload suspension straps. At step 2612, the parachute release mechanism is activated to separate the parachute from the first plurality of payload suspension straps. At step 2614, subsequent to step 2612, the aerial delivery apparatus (with the payload) is suspended from the parachute via the second plurality of payload suspension straps.

Aspects of an aerial delivery system of the present disclosure make it convenient to attach the adapter to an already assembled aerial delivery platform. One of the ways to do that is to simplify the way in which items are anchored to the platform siderails, the primary structural members of an aerial delivery platform.

As can be seen in FIG. 27, the side rail 2714 can include a slot 2742 that is wider at the bottom than at the top. Therefore, items that are designed to fit into the side rail 2714, such as the fitting 2740, can only be inserted from one end of the side rail 2714 or the other. If that fitting 2740 needs to be located at the longitudinal center of the side rail 2714, then all other items between one end of the side rail 2714 and the center of the side rail 2714 must be taken out of the side rail 2714 by first removing their securing bolts and then sliding them all the way to, and out of, one end of the side rail 2714. The fitting 2740 would then be inserted from that end, slid to the center of the side rail 2714 and then all other items can subsequently to be reinstalled and re-bolted.

In various embodiments, the panel end cap 2781, which also functions as part to the load bearing side rail 2714, can be secured to the platform panels 2210 with nothing but rivets 2782; one row at the top and one row at the bottom, in accordance with various embodiments.

As illustrated in FIG. 28, the two lower fasteners 2747 (e.g., bolts) are to properly anchor the individual items to the side rail 2714, such as the fitting 2740, where they belong and also provide anti-shear resistance to help prevent the items from being pulled upward and out of the side rail slot. As illustrated in FIG. 27, inward protrusions 2775 from the side rail 2714 can protrude into notches 2777 disposed in the fitting 2740 to also resist vertical shear loads. The inward protrusions 2775 can be triangular in shape. The notches 2777 can be rectangular or square in shape.

Figure 29:
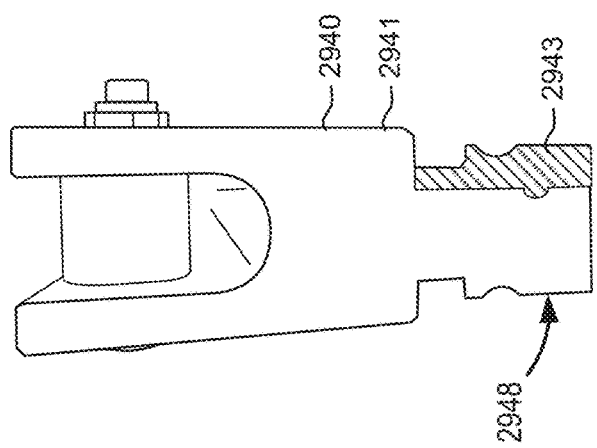
FIG. 29 is a schematic view of a two-piece fitting for an aerial delivery platform side rail, in accordance with various embodiments.
Figure 30:
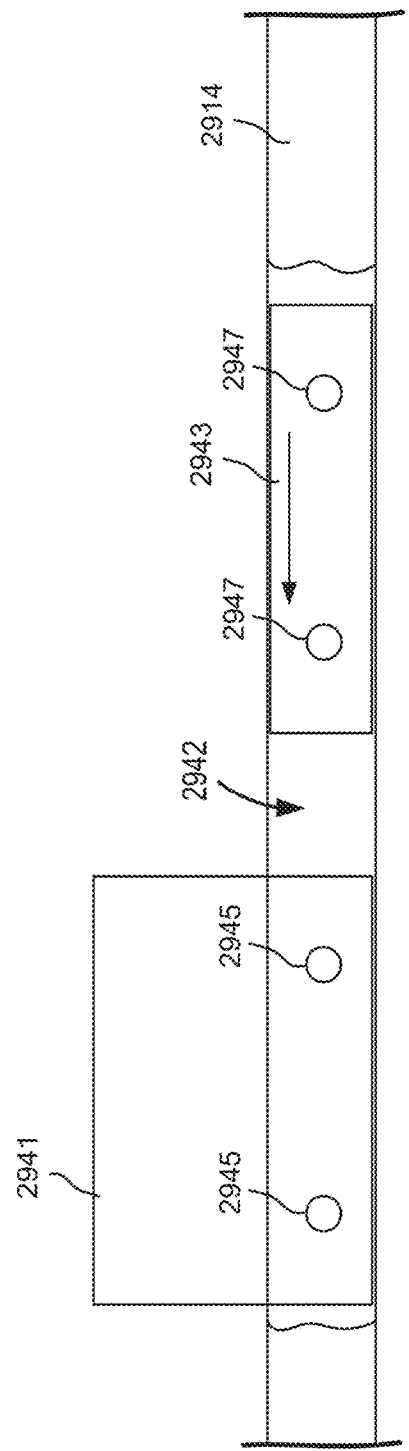
FIG. 30 is a fragmentary schematic view of the two-piece fitting being installed through a top opening of an aerial delivery platform side rail slot, in accordance with various embodiments.

Accordingly, the fitting 2740 may not be quickly or easily inserted into the side rail 2714 from the top of the slot 2742. However, with reference to FIG. 29, a two-piece fitting 2940 is illustrated including a main body 2941 and a locking body 2943 formed as two separate pieces. The fitting 2940 can be quickly and easily inserted into a side rail from the top of the slot (e.g., from the top of the side rail slot 2742 of side rail 2714). The locking body 2943 can form part of a first portion 2948 of the fitting 2940 configured to be received into the slot 2942. With reference to FIG. 30, the main body 2941 and the locking body 2943 can both be inserted downward into the slot 2942 disposed in the side rail 2914 from a top of the slot 2942 at a desired longitudinal position, as illustrated. Subsequently, the locking body 2943 can be moved longitudinally within the slot 2942, represented by the arrow in FIG. 30, until the fastener holes 2945 of the main body 2941 align with the fastener holes 2947 of the locking body 2943. With the locking body 2943 and the main body 2941 in the installed position in the side rail 2942, the locking body 2943 and the main body 2941 can resist vertical shear loads to physically stop the fitting 2940 from upwardly exiting the slot 2942. Accordingly, with the two-piece fitting 2940, there is no need to go through the previously mentioned steps of removing parts from the side rail 2914 to facilitate installation of the fitting 2940.

Figures 31A, 31B:
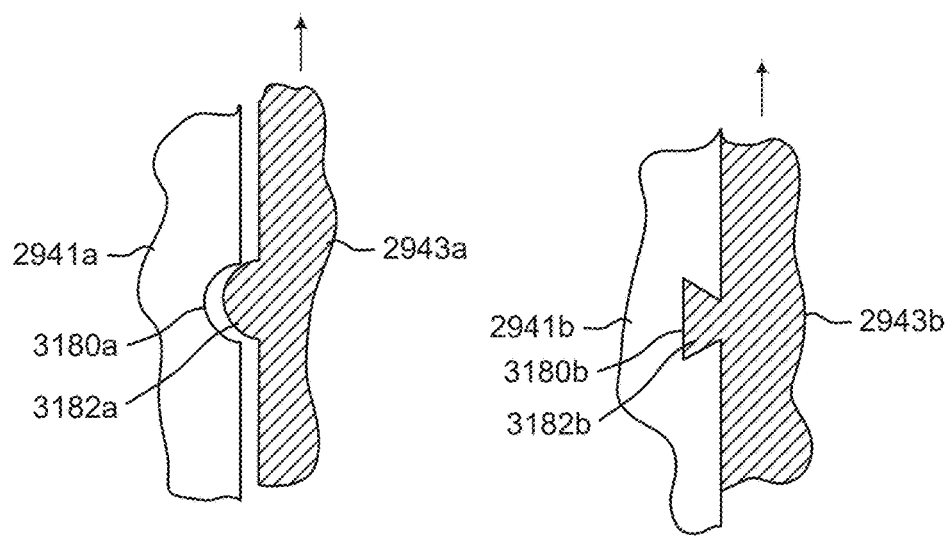
FIG. 31A, FIG. 31B, FIG. 31C, FIG. 31D, and FIG. 31E are schematic views of different shaped keyways for a two-piece fitting, in accordance with various embodiments.

With reference to FIG. 31A, the main body 2941a can include a keyway 3180a that defines a longitudinal channel, slot, or groove in the main body 2941a. The locking body 2943a can include a protrusion 3182a having a geometry that is complementary to that of the keyway 3180a. The keyway 3180a can have a semicircular geometry. The semicircular protrusion 3182a can aid in alignment between the two parts. The semicircular protrusion 3182a can assist in sharing vertical shear loading between the two parts. However, if there is any excess width inside the side rail (e.g., if a width of the side rail slot is greater than a width of the first portion of the fitting), there could be lateral movement between the two parts (i.e., the main body 2941a and the locking body 3182b), which could result in some vertical movement between the main body 2941a and the locking body 3182b, as illustrated in FIG. 31A. To prevent this, the protrusion 3182a and the keyway 3180a can be shaped as illustrated in any of FIG. 31B, FIG. 31C, or FIG. 31D.

With reference to FIG. 31B, the keyway 3180b of the main body 2941b and the protrusion 3182b of the locking body 2943b can have a dovetail geometry.

Figures 31C, 31D:
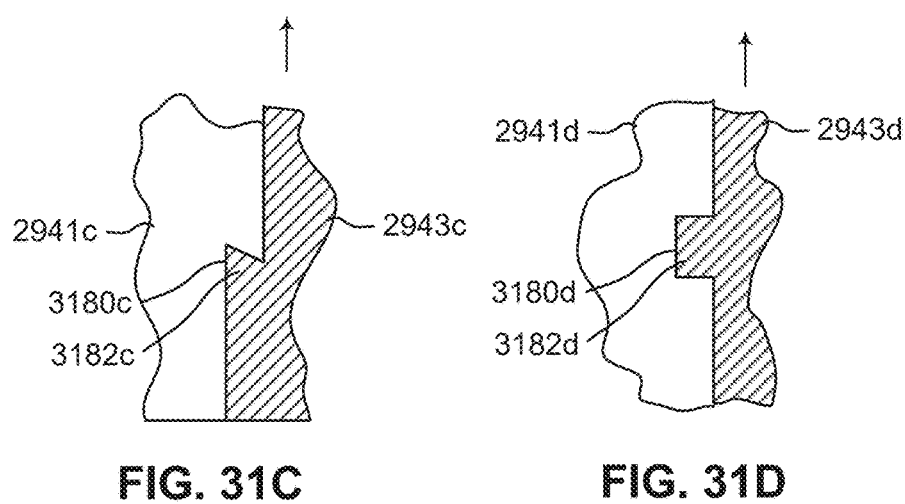

With reference to FIG. 31C, the keyway 3180c of the main body 2941c and the protrusion 3182c of the locking body 2943c can have a partial dovetail geometry where the protrusion 3182c is locked from lateral movement with respect to the main body 2941c.

With reference to FIG. 31D, the keyway 3180d of the main body 2941d and the protrusion 3182d of the locking body 2943d can have a rectangular geometry.

Figure 31E:
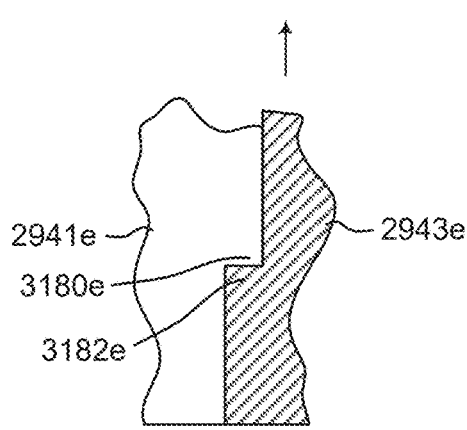

With reference to FIG. 31E, the main body 2941e can have a stepped portion 3180e that engages a stepped portion 3182e of the locking body 2943e to stop the locking body 2943e from sliding vertically upward with respect to the main body 2941e.

Figure 32:
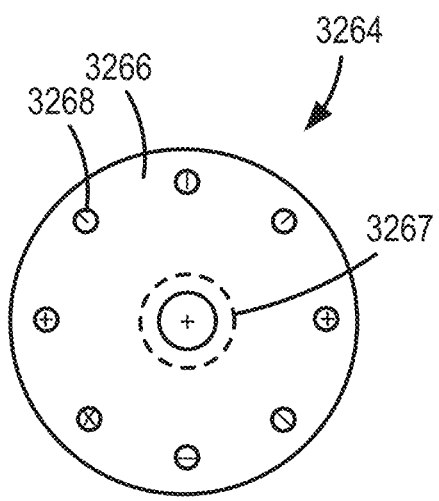
FIG. 32 is a top view of a platform fitting having a single support post, in accordance with various embodiments.

With reference to FIG. 32, an axial view of a platform fitting 3264 is illustrated, in accordance with various embodiments. In various embodiments, the platform fitting 3264 can be similar to the platform fitting 2264 of FIG. 23A and FIG. 23B. The platform fitting 3264 can be made of metal (e.g., aluminum, stainless steel, etc.). As described herein with respect to FIG. 23A and FIG. 23B, the platform fitting 3264 can include a circular flange 3266 that would allow it to rest on the top skin of a panel that is part of an aerial delivery platform and a leg/post 3267 can extend downward through the top skin to the bottom skin of the panel. The circular flange 3266 can have one or more holes 3268 for allowing it to be affixed to the top skin of an aerial delivery platform panel, with one or more fasteners. The bottom of the leg/post 3267 can be attached to the bottom skin. This configuration could be reversed, where the flange 3266 is attached to the top skin and the leg/post 3267 extends upward toward the top skin. Moreover, a platform fitting or fitting of the present disclosure can be formed into various shapes and sizes as desired.

Figure 33:
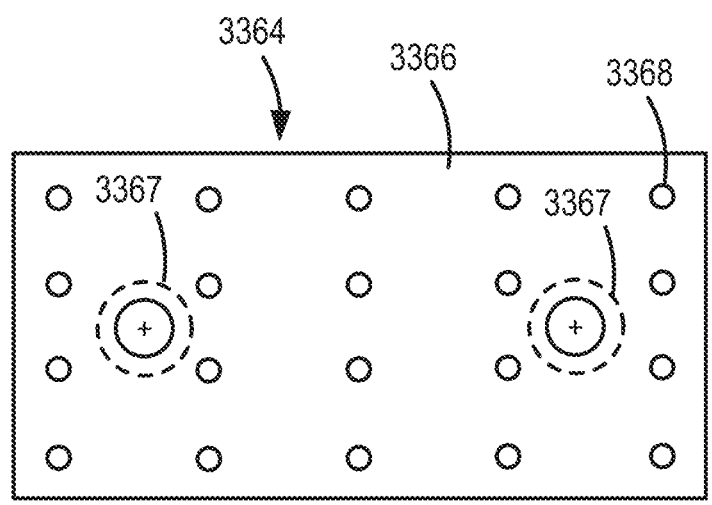
FIG. 33 is a top view of a platform fitting having two support posts, in accordance with various embodiments.

With reference to FIG. 33, a platform fitting 3364 is illustrated having a rectangular geometry. The platform fitting 3364 can have a flange 3366 comprising a rectangular geometry. A plurality of holes 3368 can be disposed in the flange 3366. Each hole 3368 can receive a fastener (e.g., a rivet) to secure the flange 3366 to the first skin 2213. Platform fitting 3364 can have two or more (two in the illustrated embodiment) legs/posts 3367. In this regard, platform fitting 3364 can be at least twice as strong as the platform fitting 3264 of FIG. 32.

Figure 34:
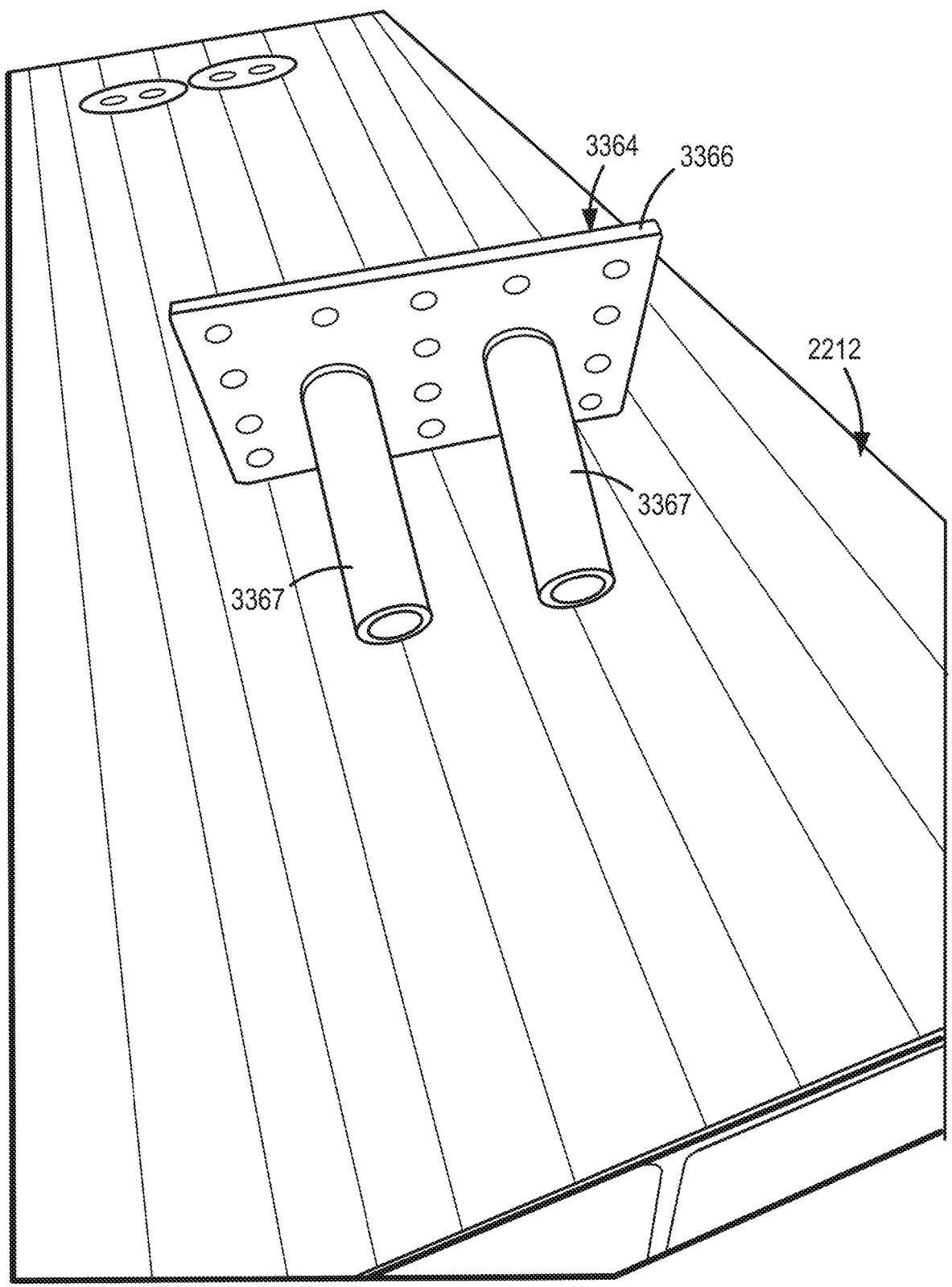
FIG. 34 is a perspective view of the platform fitting having two support posts resting on an aerial delivery platform panel, in accordance with various embodiments.

With reference to FIG. 34, the platform fitting 3364 is illustrated resting on an aerial delivery platform 2212. The platform fitting 3364 includes a first leg/post 3367 and a second leg/post 3367 extending from the flange 3366.

Figure 35:
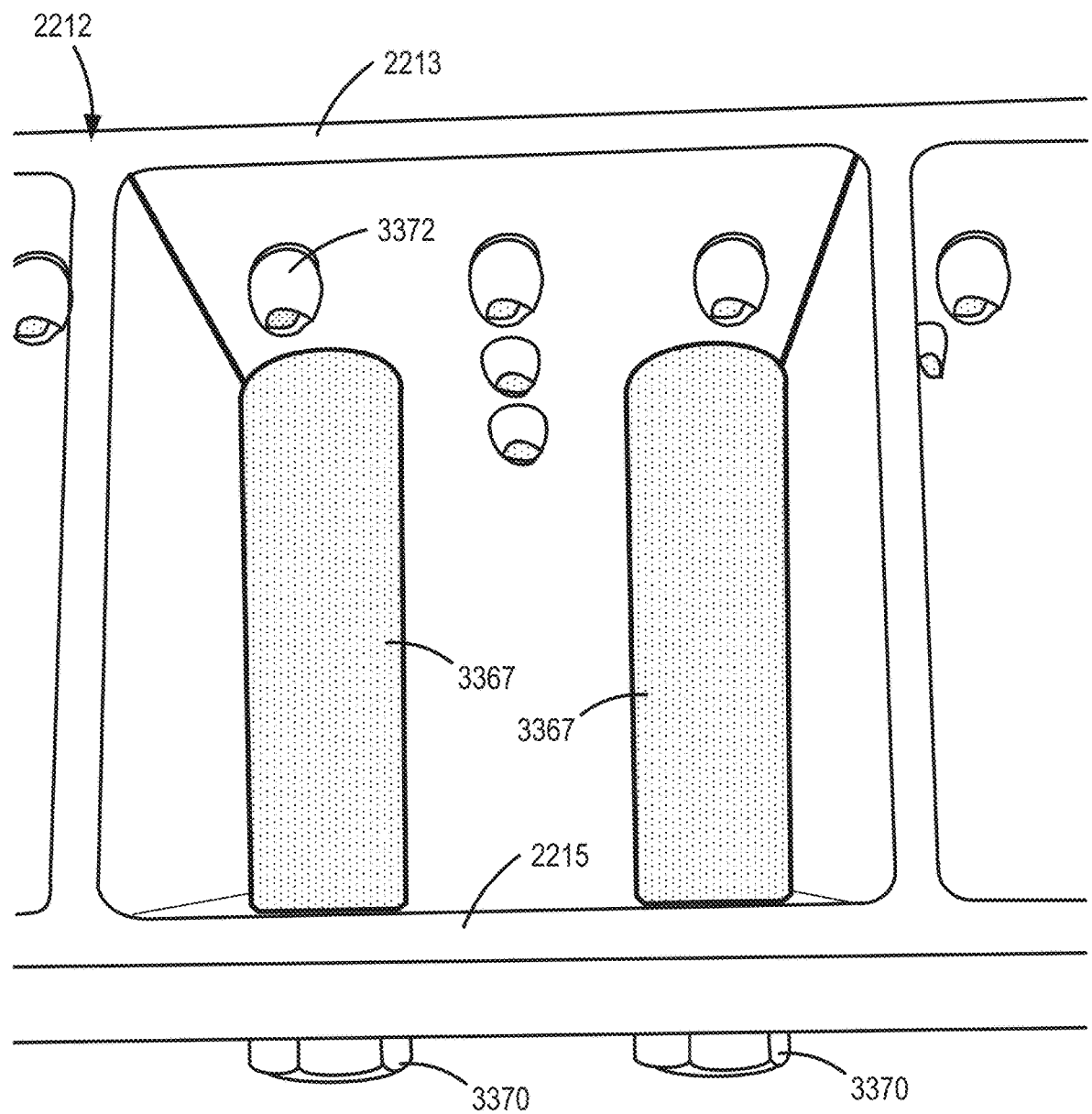
FIG. 35 is a side view of the platform fitting having two support posts installed on the aerial delivery platform panel, in accordance with various embodiments.

With reference to FIG. 35, a side view of the platform 2212 with the platform fitting 3364 installed thereon is illustrated, in accordance with various embodiments. The posts 3367 can extend from the upper skin 2213 to the lower skin 2215. A fastener 3370 (e.g., a bolt) can be disposed through the lower skin 2215 and coupled to the posts 3367 to secure the platform fitting 3364 to the lower skin 2215. In various embodiments, the flange 3366 (see FIG. 34) can be attached to the upper skin 2213 via a plurality of fasteners 3372 (e.g., rivets).

Figure 36:
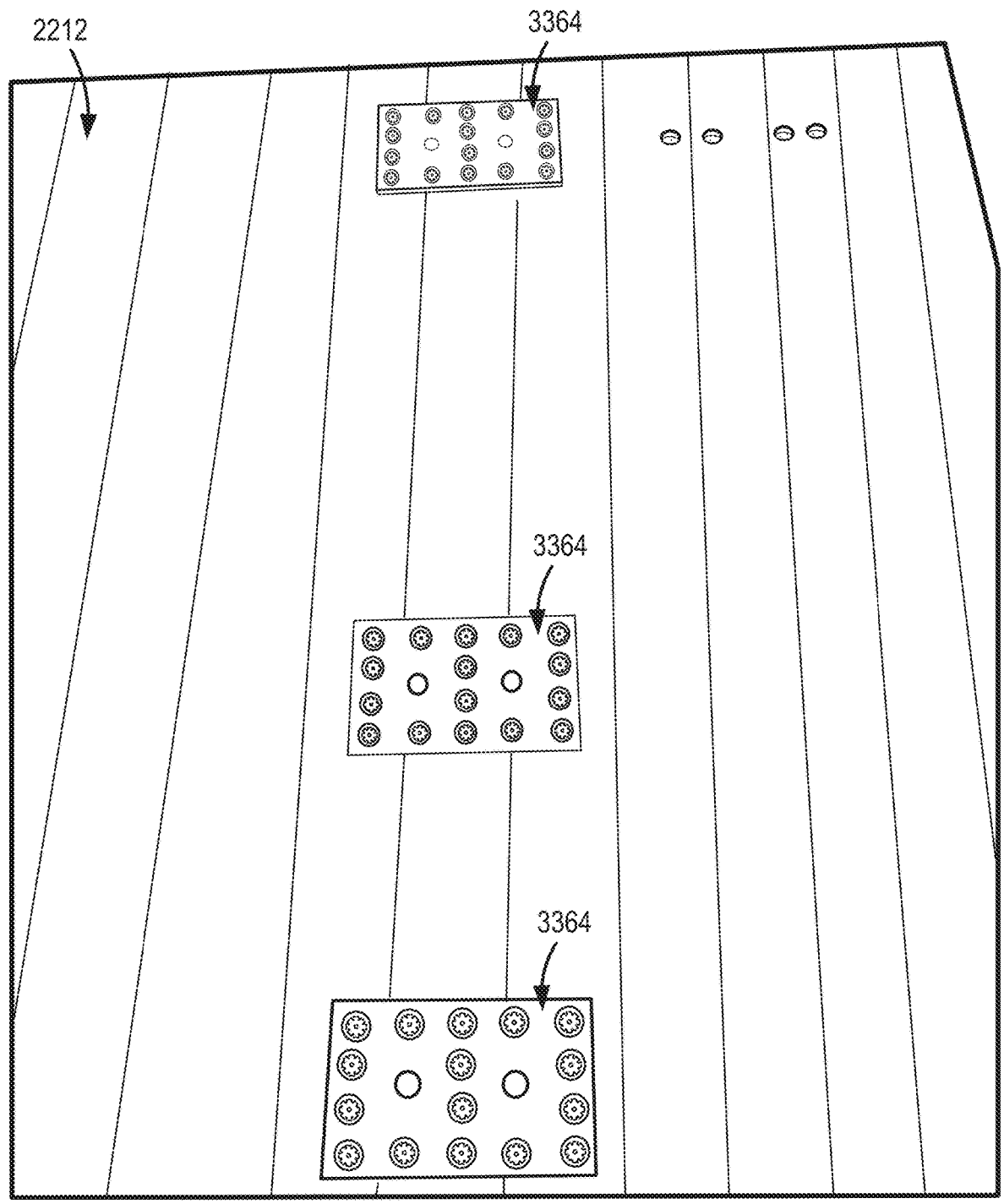
FIG. 36 is a perspective top view of a plurality of platform fittings having two support posts installed on the aerial delivery platform panel, in accordance with various embodiments.

With reference to FIG. 36, a perspective view of a plurality of platform fittings 3364 installed to the upper skin 2213 of the platform panel 2212 is illustrated, in accordance with various embodiments. The platform fittings 3364 can be disposed laterally along the upper skin 2213.

Figure 37:
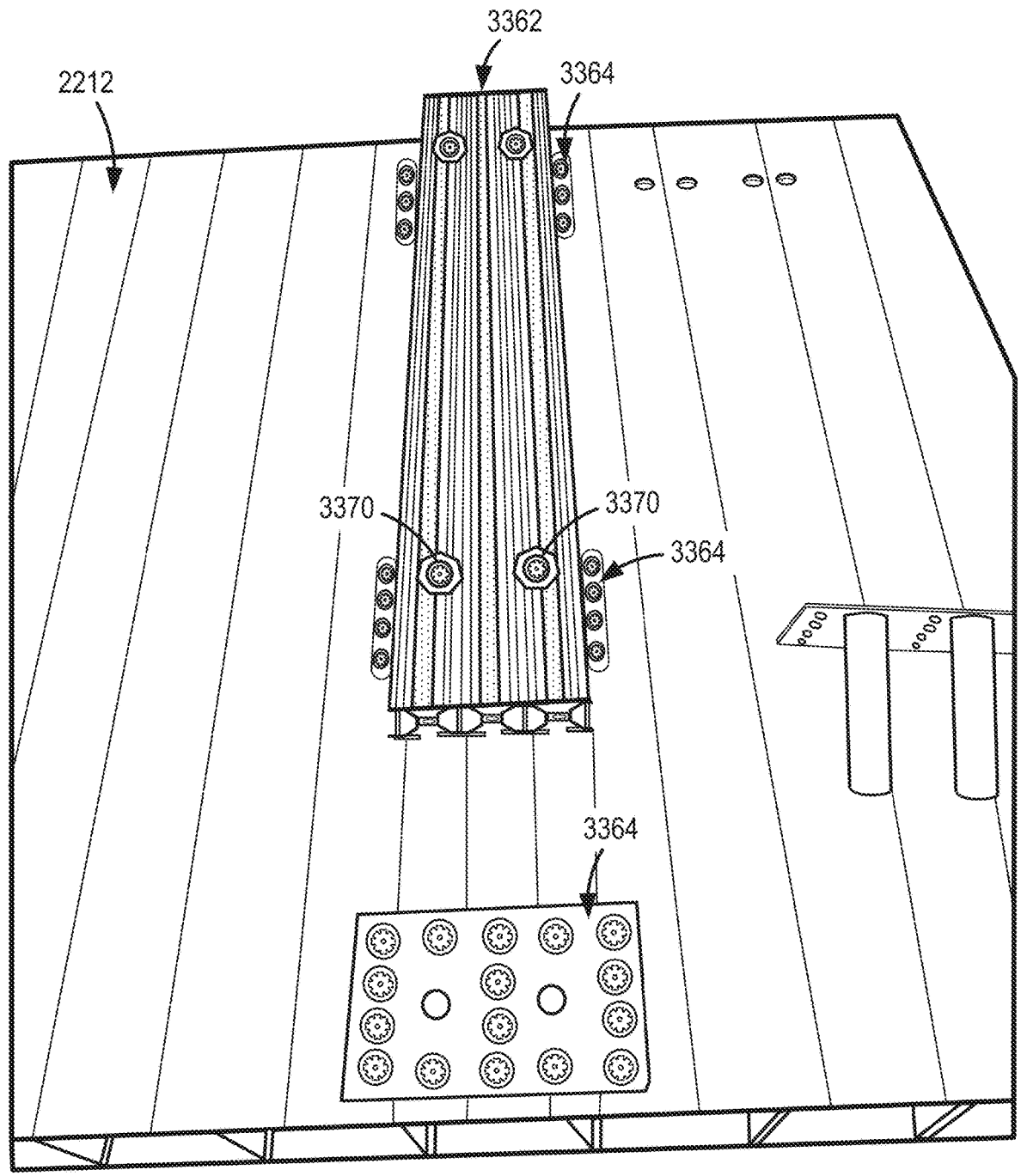
FIG. 37 is a perspective top view of the plurality of platform fittings having two support posts installed on the aerial delivery platform panel and a cutaway view of a support beam installed to the platform fittings, in accordance with various embodiments.

With reference to FIG. 37, an item, such as a crossbar 3362, of which a section view is depicted for clarity purposes, can be installed over, and attached to, the platform fittings 3364. Although illustrated as a crossbar 3362, it should be understood that any suitable item can be secured to the platform panel 2212 with the platform fittings 3364. The fasteners 3370 can be used to secure the crossbar 3362 to the platform fittings 3364.

Figure 38:
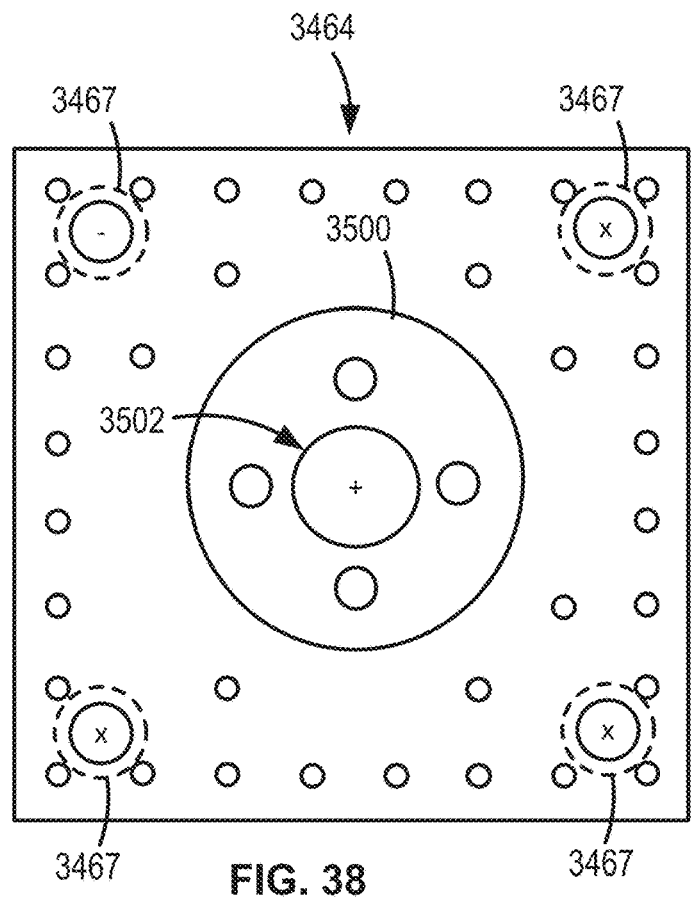
FIG. 38 is a top view of a platform fitting having four support posts and a central receptacle, in accordance with various embodiments.
Figure 39:
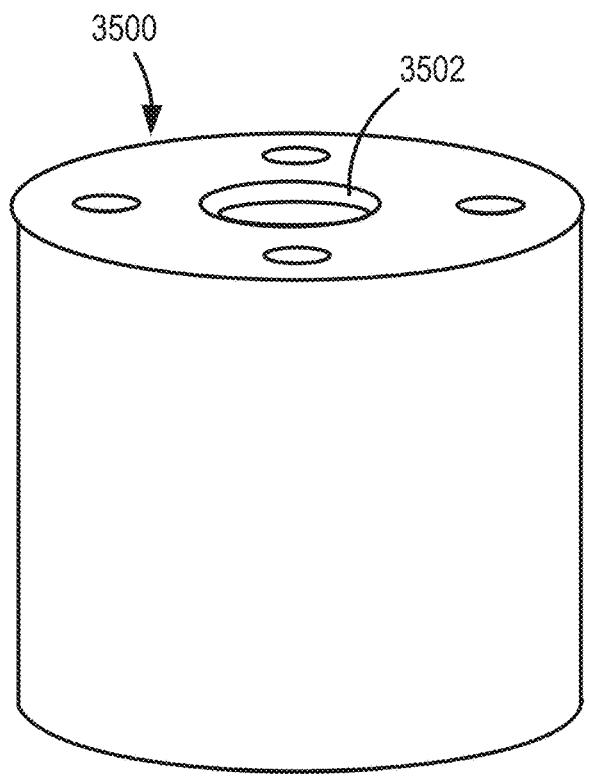
FIG. 39 is a perspective view of the central receptacle of FIG. 38, in accordance with various embodiments.

With reference to FIG. 38, a platform fitting 3464 can have four legs/posts 3467. The platform fitting 3464 can be configured with a central receptacle 3500. In various embodiments, the central receptacle 3500 can be configured to accept a threaded fastener, such as a bolt for example. The central receptacle 3500 can have a threaded aperture 3502 configured to receive the threaded fastener. With reference to FIG. 39, the central receptacle 3500 can be cylindrical.

Figure 40:
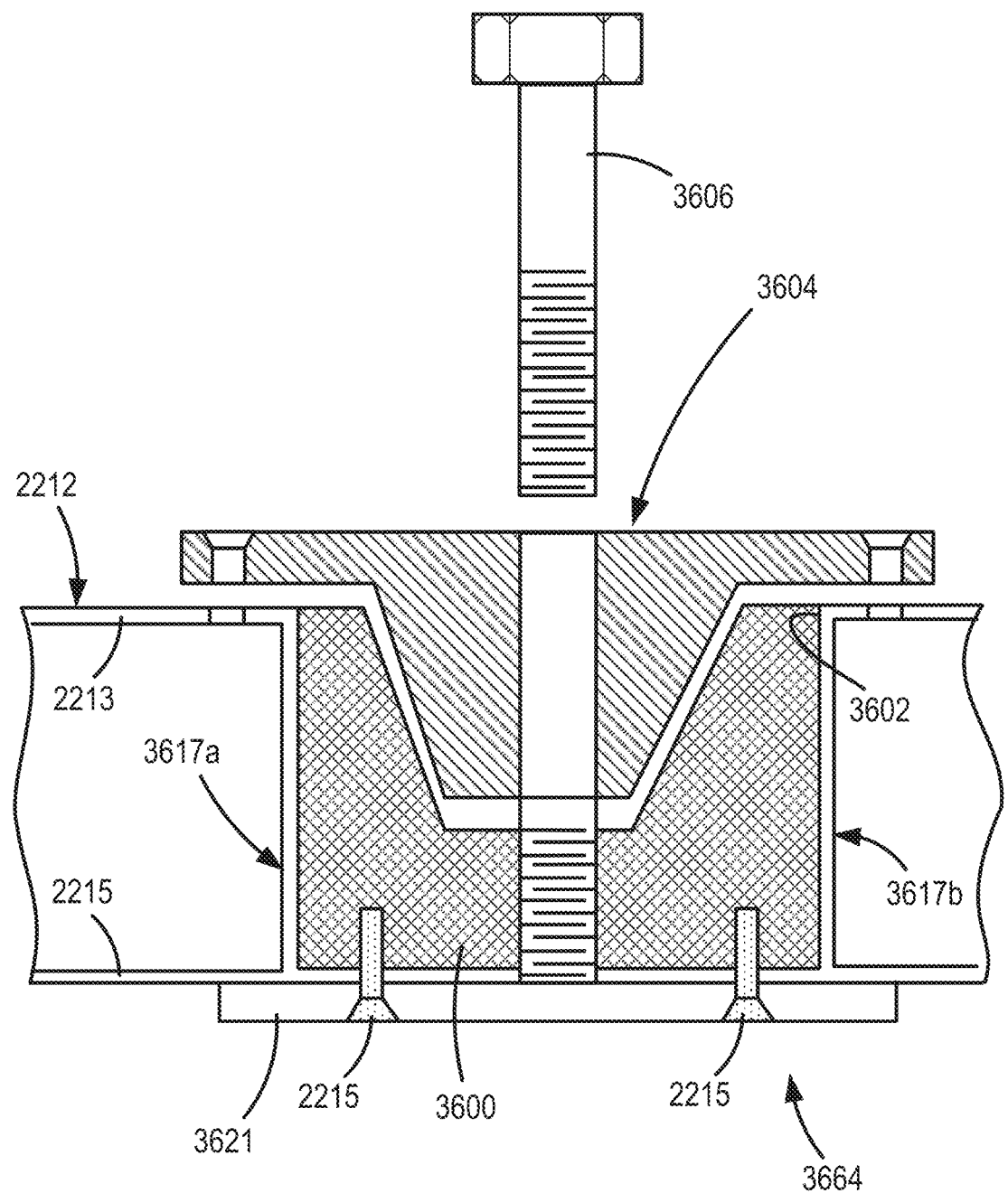
FIG. 40 is a schematic view of a platform fitting being installed onto an aerial delivery platform panel, the platform fitting including a backing plate, in accordance with various embodiments.

With reference to FIG. 40, a platform fitting 3664 is illustrated being installed onto an aerial delivery platform panel 2212. In various embodiments, platform fitting 3464 of FIG. 38 can be configured to be coupled to a platform panel 2212 similar to platform fitting 3664. The platform fitting 3664 generally includes a central receptacle 3600 configured to be disposed between the top skin 2213 and the bottom skin 2215 of the platform panel 2212 and a backing plate 3621 whereby the central receptacle 3600 is coupled to the platform panel 2212. The central receptacle 3600 can be secured to the bottom skin 2215 with a backing plate 3621. The bottom skin 2215 can be sandwiched between the central receptacle 3600 and the backing plate 3621. Fasteners 2215 (e.g., bolts, rivets, etc.) can be used to secure the backing plate 3621 to the central receptacle 3600. The fasteners 2215 can be installed from the external surface of the bottom skin 2215 of the platform panel 2212. Moreover, the central receptacle 3600 can be inserted into the platform panel 2212 via an aperture 3602 disposed in the top skin 2213. In this manner, ease of installation of the platform fitting 3664 is increased.

In various embodiments, the backing plate 3621 extends laterally between and to, and in some embodiments past, a first rib 3617a and a second rib 3617b. In this manner, the strength of the platform fitting 3464 is increased due to the added structural support of the support ribs 3617. Stated differently, both the top and bottom flanges bridge across two internal ribs (it could be more than two), providing substantially more tear-out resistance than can be achieved from loading only the panel skins in a quite localized area.

The central receptacle 3600 can be configured to receive a male alignment feature 3604 on an item being installed on the platform panel 2212. In this manner, the desired alignment of the item being installed on the platform panel 2212 can be achieved. The male alignment feature 3604 can be fastened to the top skin 2213. The male alignment feature 3604 can be fastened to the central receptacle 3600 via a fastener 3606 (e.g., a bolt). The bolt 3606 can extend through a center of the central receptacle 3600. The central receptacle 3600 can be sandwiched between the male alignment feature 3604 and the bottom skin 2215. The top skin 2213 and the bottom skin 2215 can be sandwiched between the male alignment feature 3604 and the backing plate 3621.

Once aerial delivery panels have been fabricated, the panels become sealed units, making it difficult to impossible to install conventional internal nut-plates without first disassembling the panel parts, a very difficult and, perhaps destructive, task. And, once the panels have been assembled as part of an aerial delivery platform, the task would become even more difficult. A platform fitting of the present disclosure (e.g., platform fitting 3664) that can be installed from the exterior, with no disassembly of the platform, is convenient to install and use. Because various platform fittings of the present disclosure attaches to both the top and bottom skins of the platform, the platform fitting provides much more holding power than does a conventional nut-plate, which attaches to only the top skin and sometimes allows only one small bolt per nut-plate. Accordingly, disclosed herein are platform fittings that can be installed from the exterior of the upper or lower panel skin, after one or more appropriately shaped openings has been made in either the top or bottom skin of the panel and, once the fitting has been properly secured to the panel, the platform fitting can then transfer force on it to both the top and bottom skins of the panel, thereby increasing the holding power of the attachment means relative to an internal nut-plate.

Figure 41:
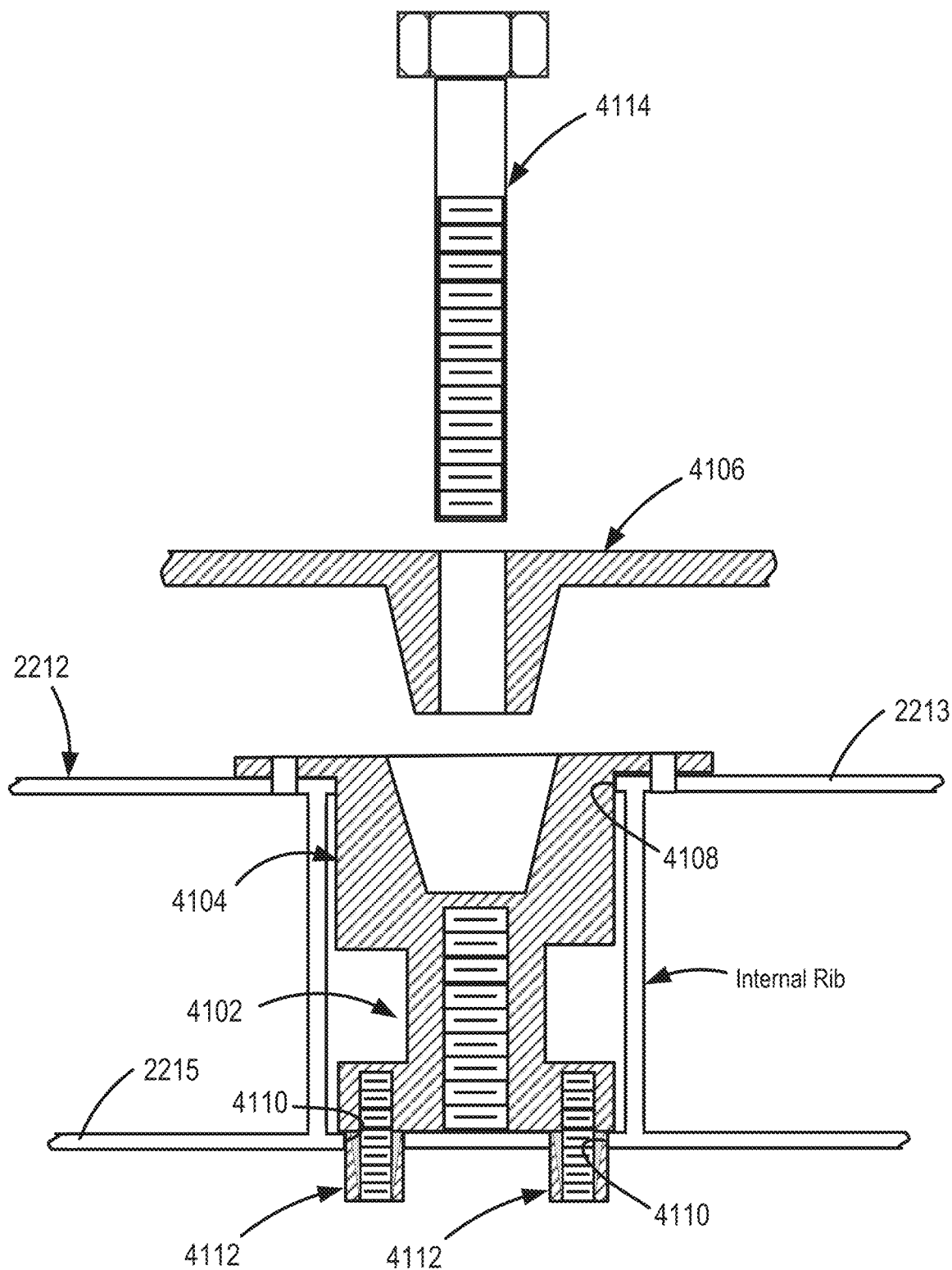
FIG. 41 is a schematic view of a platform fitting being installed onto an aerial delivery platform panel, the platform fitting including expansion features, in accordance with various embodiments.

With reference to FIG. 41, a platform fitting 4164 is illustrated being installed onto an aerial delivery platform panel 2212. Various platform fittings may require access to both top and bottom surfaces of the platform panel to enable installing the bottom backing plate and fasteners, a situation that may not always be convenient. The platform fitting 4164 only requires access to a single surface of an aerial delivery platform to enable installation. The platform fitting 4164 generally is made of two primary parts, a bottom element 4102 and a top element 4104. Assuming that the item 4106 to be secured to the platform panel 2212 will be secured to the top surface of the platform panel 2212, an opening 4108 can be made in the top skin 2213 of the platform panel 2212 to allow the bottom element 4102 to be inserted into the hollow panel 2212. The bottom skin 2215 can have at least one opening 4110 formed therein to allow at least one expansion feature 4112 of the bottom element 4102 to pass therethrough whereby the bottom element is attached to the bottom skin 2215. A primary fastener 4114 can pass through the item 4106 and be threadingly coupled to the top element 4104 and/or the bottom element 4102 to secure the item 4106 to the platform panel 2212.

Figure 42A:
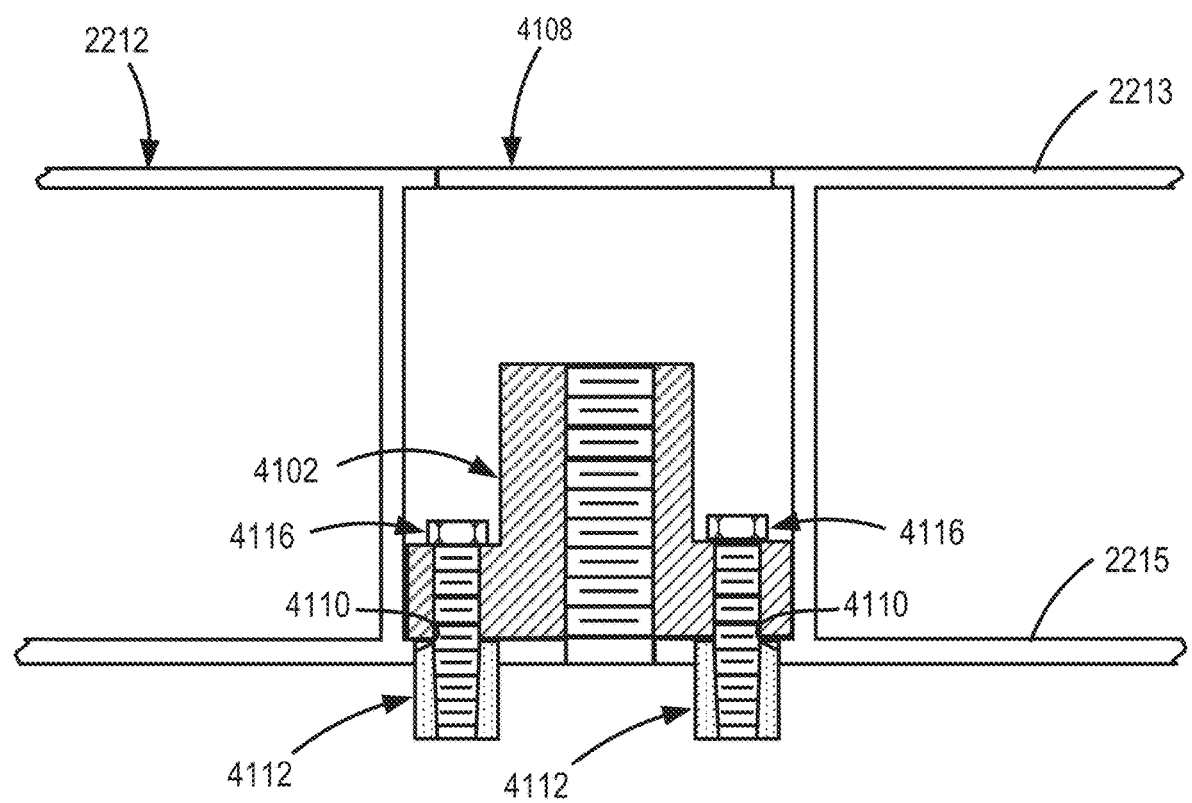
FIG. 42A is a schematic view of a bottom portion of the platform fitting of FIG. 41 positioned within an aerial delivery platform panel with expansion features in a non-expanded state, in accordance with various embodiments.
Figure 42B:
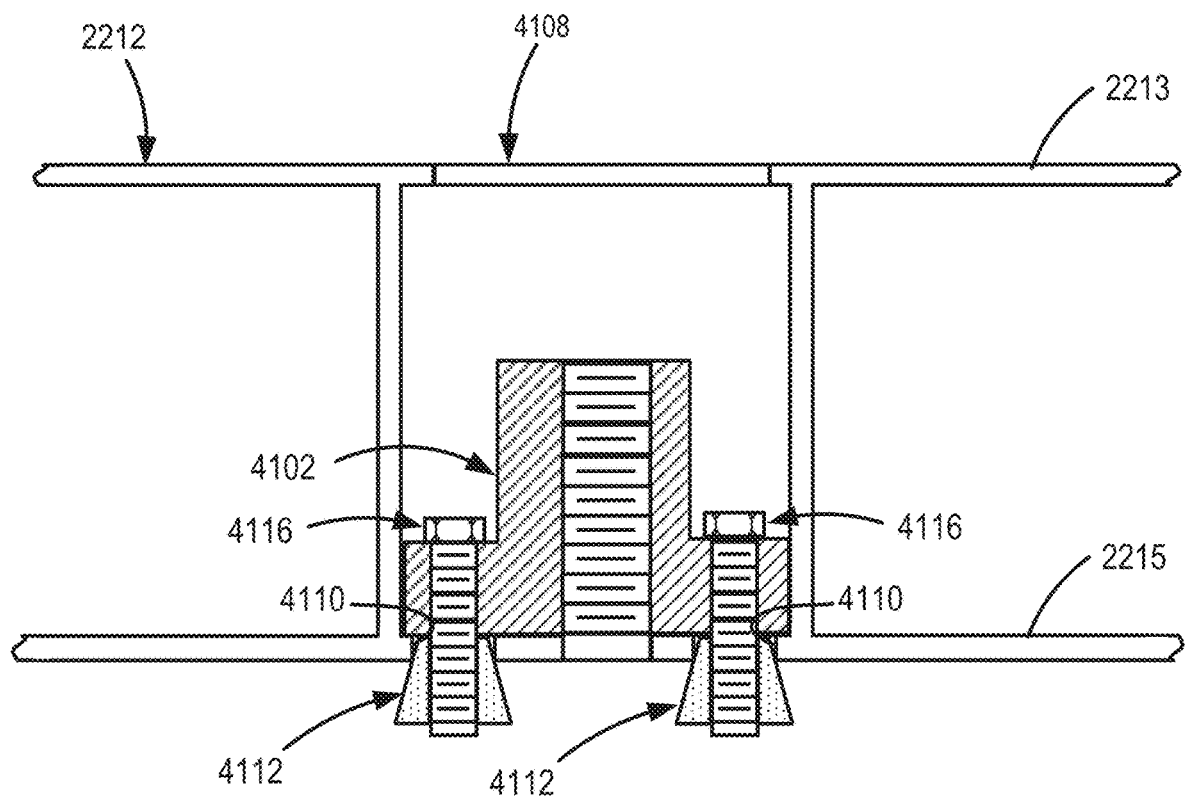
FIG. 42B is a schematic view of a bottom portion of the platform fitting of FIG. 41 positioned and secured within the aerial delivery platform panel with expansion features in an expanded state, in accordance with various embodiments.

FIG. 42A and FIG. 42B illustrate how an example expansion feature can function. With particular focus on FIG. 42A, the bottom element 4102 can be placed into the hollow panel 2212 through the opening 4108. The expansion feature(s) 4112 can be passed through the openings 4110. With particular focus on FIG. 42A, the threaded fasteners 4116 can be tightened which cause the expansion feature(s) 4112 to compress and expand so that the expansion feature(s) 4112 resist being pulled back through the openings 4110 and secure the bottom element 4102 to the bottom skin 2215. Other expansion elements, such as rivet nuts or blind rivets (aka pop rivets) could also function for securing the bottom element 4102 to the bottom skin 2215.

Figure 43A:
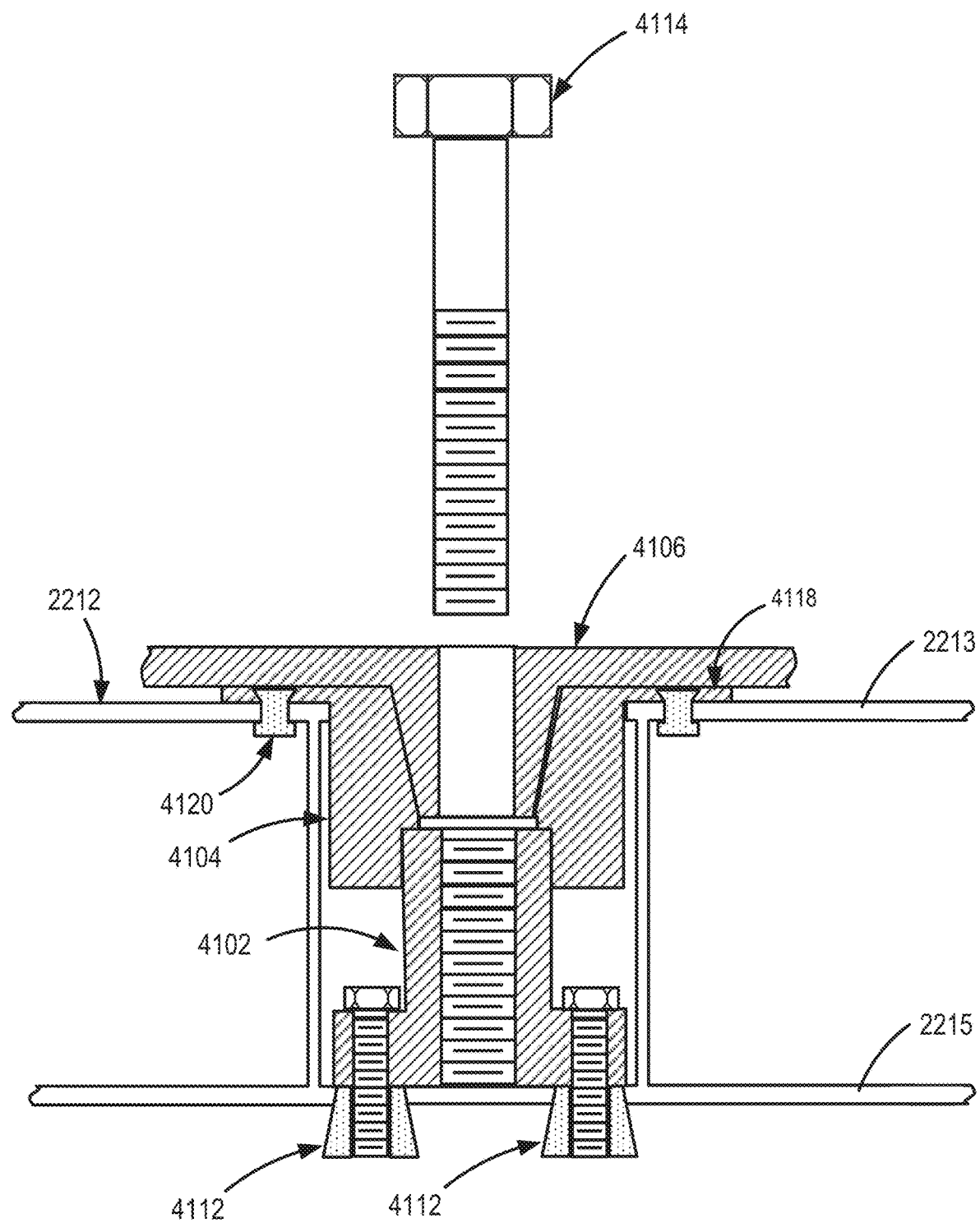
FIG. 43A is a schematic view of the platform fitting of FIG. 41 installed to the aerial delivery platform panel with a primary fastener about to be installed, in accordance with various embodiments.
Figure 43B:
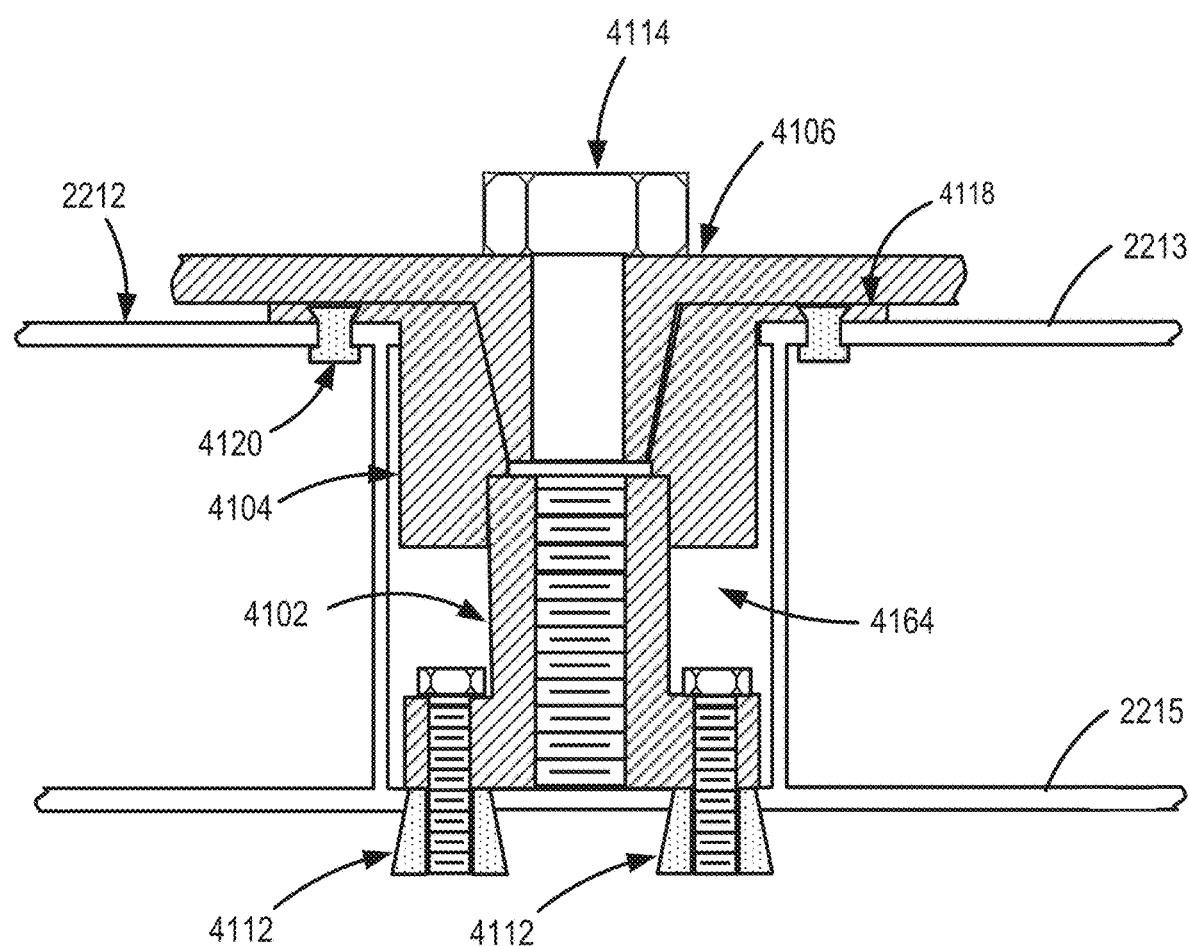
FIG. 43B is a schematic view of the platform fitting of FIG. 41 installed to the aerial delivery platform panel with the primary fastener installed, in accordance with various embodiments.

With reference to FIG. 43A, the top element 4104 can be positioned to engage with the bottom element 4102 and the top element flange 4118 can be secured to the top skin 2213 of the panel 2212. The top element flange 4118 can be secured to the top skin 2213 via a plurality of fasteners 4120 (e.g., expansion features such as a rivet or the like). FIG. 43A depicts the platform fitting 4164 in the installed position with the primary fastener 4114 about to be installed to secure the item 4106 to the platform fitting 4164. FIG. 43A depicts the item 4106 properly positioned with respect to the fitting 4164 with the exception of the primary fastener 4114 having not yet been installed. FIG. 43B depicts the item 4106 properly positioned with respect to the fitting 4164 and with the primary fastener 4114 in an installed and tightened position (i.e., "ready for flight"). In various embodiments, the top element 4104 is in coaxial alignment with the bottom element 4102.

Figure 44:
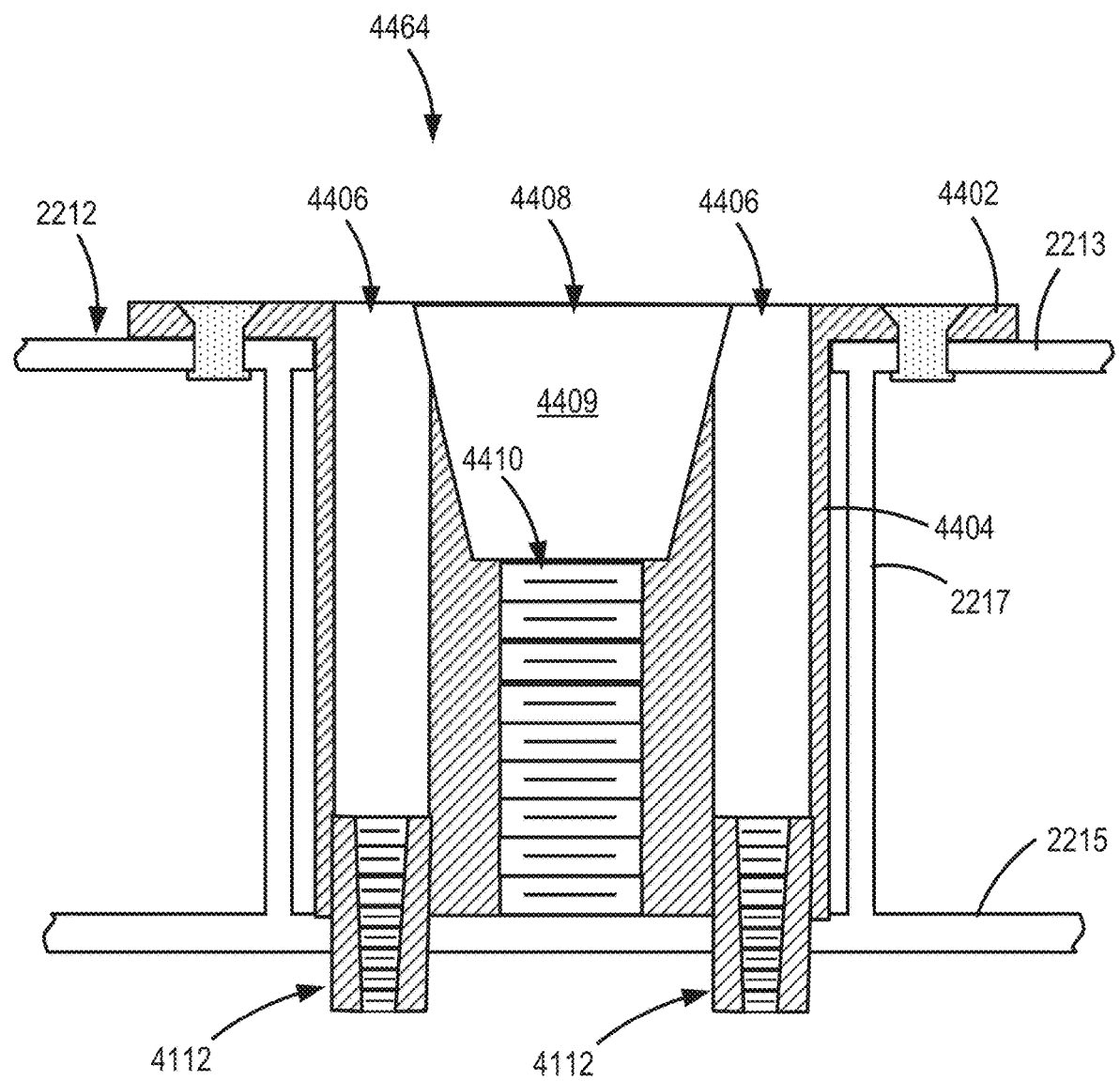
FIG. 44 is a schematic view of a one-piece platform fitting installed onto an aerial delivery platform panel, the platform fitting including expansion features, in accordance with various embodiments.

With reference to FIG. 44, the same job can be done with a one-piece fitting 4464 instead of the two-piece fitting 4164 described with respect to FIG. 41 through FIG. 43B. It should be understood that a one-piece fitting (or a two-piece fitting), can have expansion elements that are pressed into the parent body, but will be seen as an appendage of that body. The fitting 4464 includes a top flange 4402 configured to be attached to the top skin 2213. The top flange 4402 can be sized to extend across at least two internal ribs 2217. A main body portion 4404 can extend from the top flange 4402 to the bottom skin 2215. The main body portion 4404 can include apertures 4406 that extend from the top flange 4402 to the opposite end of the main body portion 4404 whereby the expansion features 4412 are coupled (e.g., press fit or the like) to the fitting 4464. The apertures 4406 can also provide access to the expansion features 4412, for example to accommodate a tool for tightening the expansion features 4412. The main body portion 4404 can have a primary bore 4408 which can define a central axis of the fitting 4464. The primary bore 4408 can have a tapered portion 4409 and a threaded portion 4410. The tapered portion 4409 can be configured to receive a portion of an item to be installed on the platform panel 2212. The threaded portion 4410 can be configured to receive a primary fastener (e.g., see primary fastener 4114 of FIG. 43B). The primary bore 4408 can be oriented parallel to the apertures 4406.

Figure 45:
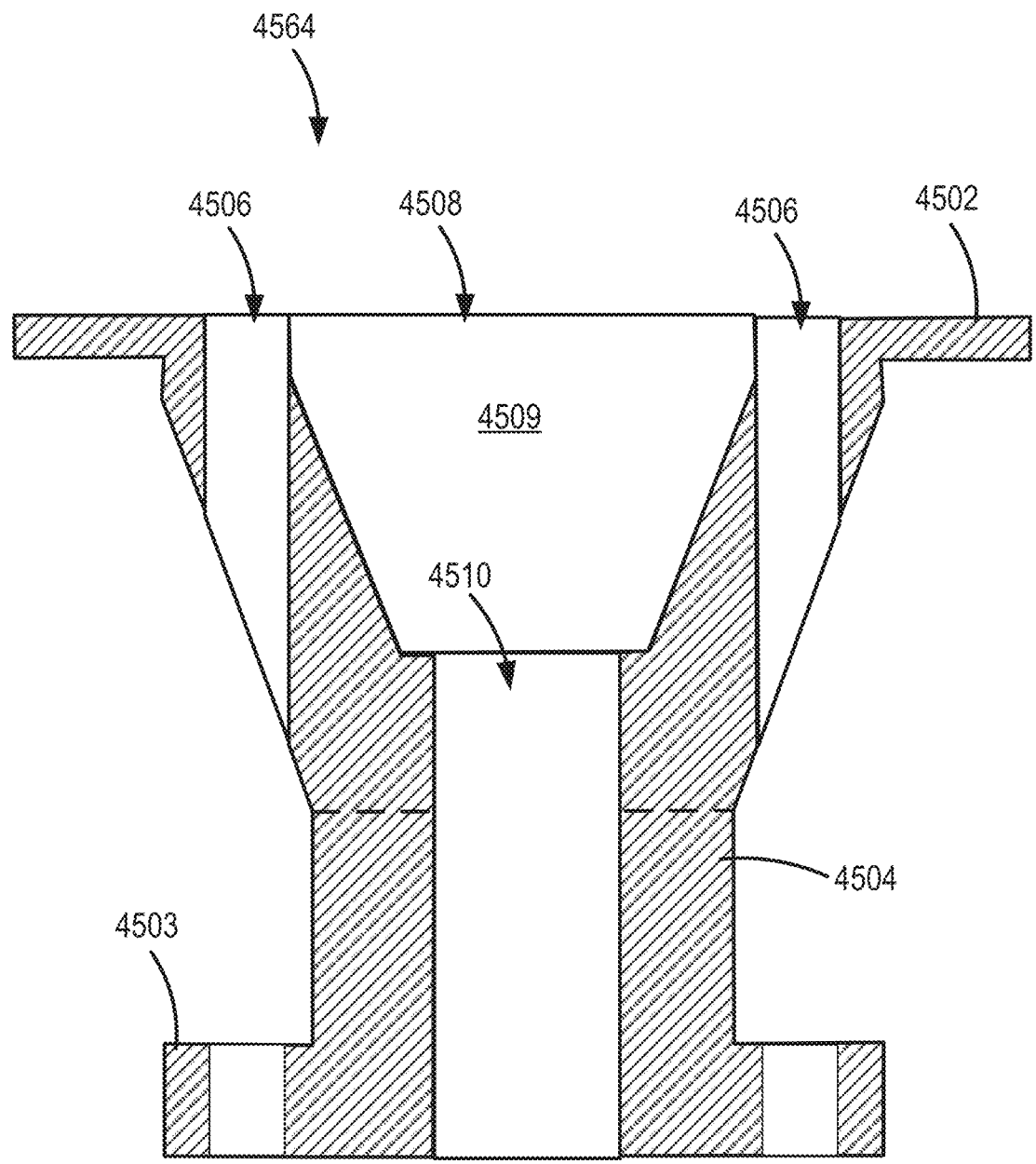
FIG. 45 is a schematic view of a one-piece platform fitting including expansion features, in accordance with various embodiments.

With reference to FIG. 45, a one-piece fitting 4564 is illustrated for securing one or more items to an aerial delivery platform. The fitting 4564 is functionally similar to the fitting 4464 of FIG. 44, except the main body portion 4504 is tapered so that the apertures 4506 define an exit near a central portion of the main body portion 4504. The fitting 4564 includes a top flange 4502 and the main body portion 4504 extending from the top flange 4402. The main body portion 4504 can include the apertures 4506 that extend from the top flange 4402 to a tapered surface of the main body portion 4504 to provide access to one or more fasteners used to secure the fitting 4564 to the platform panel. A bottom flange 4503, located opposite the main body portion from the top flange 4502, can extend from the main body portion 4504. Fasteners and/or expansion features can be coupled to, and/or pass through, the bottom flange 4503 to secure the fitting 4564 to the platform panel. The main body portion 4504 can have a primary bore 4508 which can define a central axis of the fitting 4564. The primary bore 4508 can have a tapered portion 4509 and a threaded portion 4510. The tapered portion 4509 can be configured to receive a portion of an item to be installed on the platform panel. The threaded portion 4510 can be configured to receive a primary fastener (e.g., see primary fastener 4114 of FIG. 43B). The primary bore 4508 can be oriented parallel to the apertures 4506.

Figure 46:
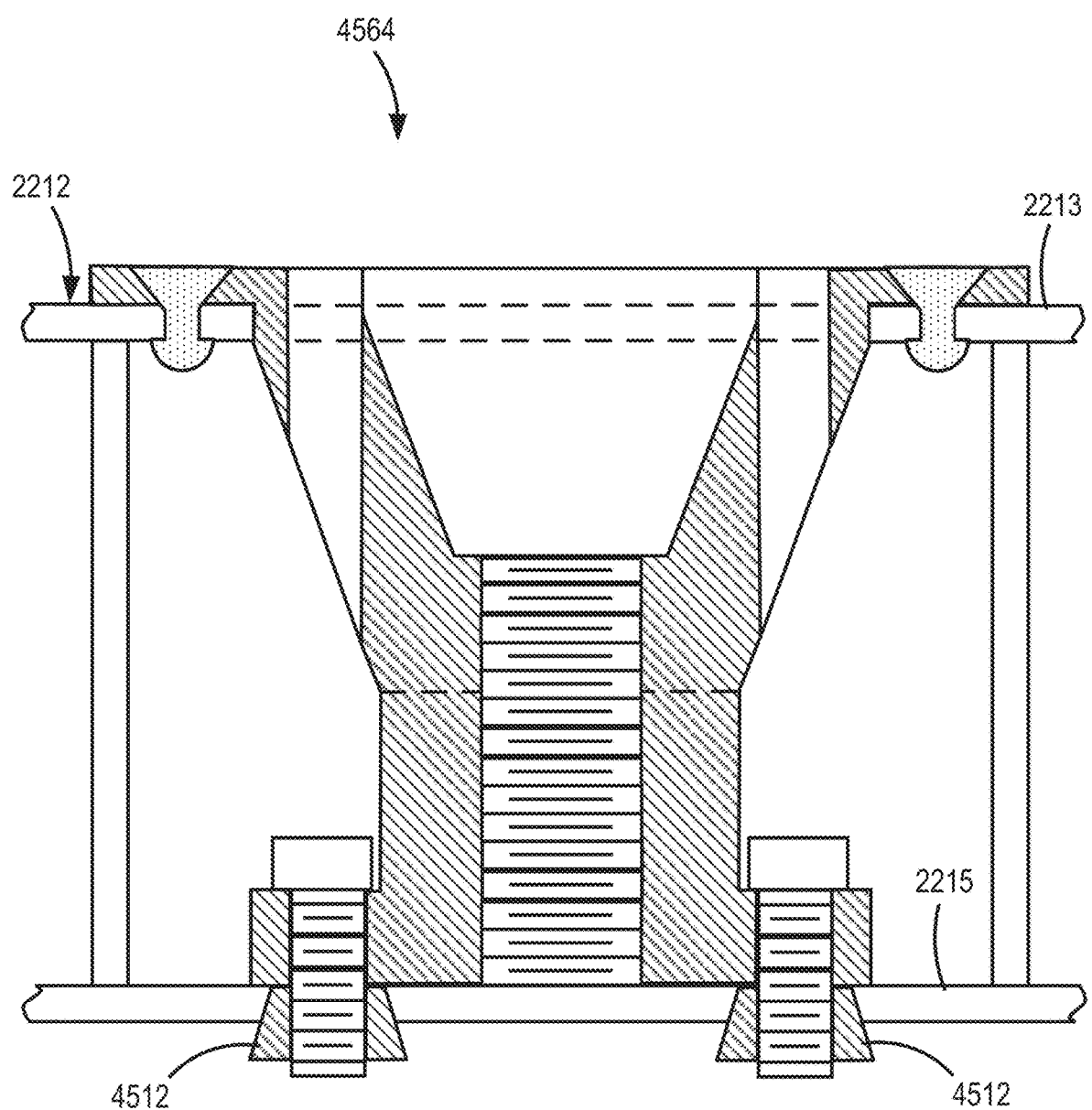
FIG. 46 is a schematic view of the one-piece platform fitting of FIG. 45 installed onto an aerial delivery platform panel, in accordance with various embodiments.

With reference to FIG. 46, the fitting 4564 is illustrated installed to a platform panel 2212. Fasteners (e.g., a nut fastener and a bolt fastener, a bolt fastener, and/or an expansion feature) can be used to secure the fitting 4564 to the platform panel. In the illustrated embodiment, expansion fasteners 4512 are installed and in an expanded state. In various embodiments, the expansion fasteners 4512 are pre-installed to the fitting 4564 (e.g., via a press fit or the like) so that the fitting 4564 and the expansion fasteners 4512 are pre-assembled as a sub-unit.

Figure 47:
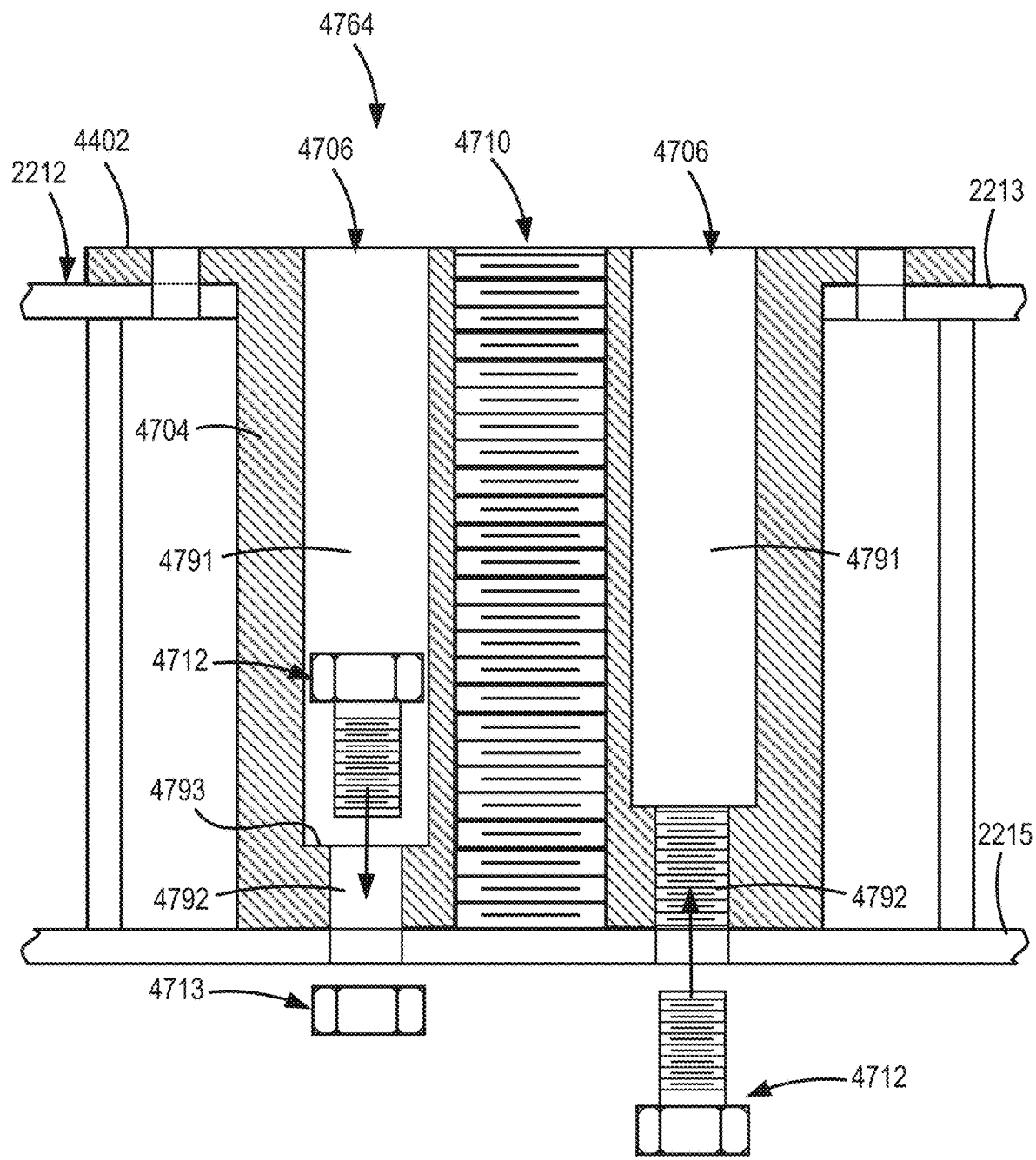
FIG. 47 is a schematic view of a one-piece platform fitting being installed onto an aerial delivery platform panel and depicting multiple configurations for attaching fasteners, in accordance with various embodiments.

With reference to FIG. 47, a one-piece fitting 4764 is illustrated for securing one or more items to an aerial delivery platform. The fitting 4764 is functionally similar to the fitting 4764 of FIG. 44, except multiple ways of securing the fitting 4764 to the platform panel 2212 are illustrated in FIG. 47. The fitting 4764 can include a main body portion 4704 having apertures 4706 that extend from a top flange 4702 of the fitting 4764 toward the opposite end of the main body portion 4704. With particular focus on the left aperture 4706 of FIG. 47, the apertures 4706 can have a first portion 4791 sized to accommodate a fastener 4712 (e.g., a bolt or other fastener) to move longitudinally within the aperture 4706 and a second portion 4792 having a smaller diameter than the first portion 4791, thereby forming a flange 4793 configured to contact the fastener 4712. The fastener 4712 can extend through the second portion 4792 and through the second skin 2215 whereby a threaded fastener 4713 (e.g., a nut fastener) can be tightened onto the fastener 4712 to compress the flange 4793 of the main body portion 4704 between the second skin 2215 and the fastener 4712, thereby securing the fitting 4764 to the platform panel 2212. In various embodiments, the first portion 4791 and the second portion 4792 comprise a generally smooth surface (e.g., not threaded).

With particular focus on the right aperture 4706 of FIG. 47, the second portion 4792 can have a threaded inner diameter surface whereby a fastener 4712 can be threadingly coupled to the main body portion 4704 by inserting the fastener 4712 through the second skin 2215 and into the second portion 4792. The fastener 4712 can be tightened to the second portion 4792 to compress the second skin 2215 between the main body portion 4704 and the fastener 4712, thereby securing the fitting 4764 to the platform panel 2212.

In various embodiments, the apertures 4706 are parallel to the threaded portion 4710. In various embodiments, the threaded portion 4710 can extend from the top flange 4402.

Figure 48:
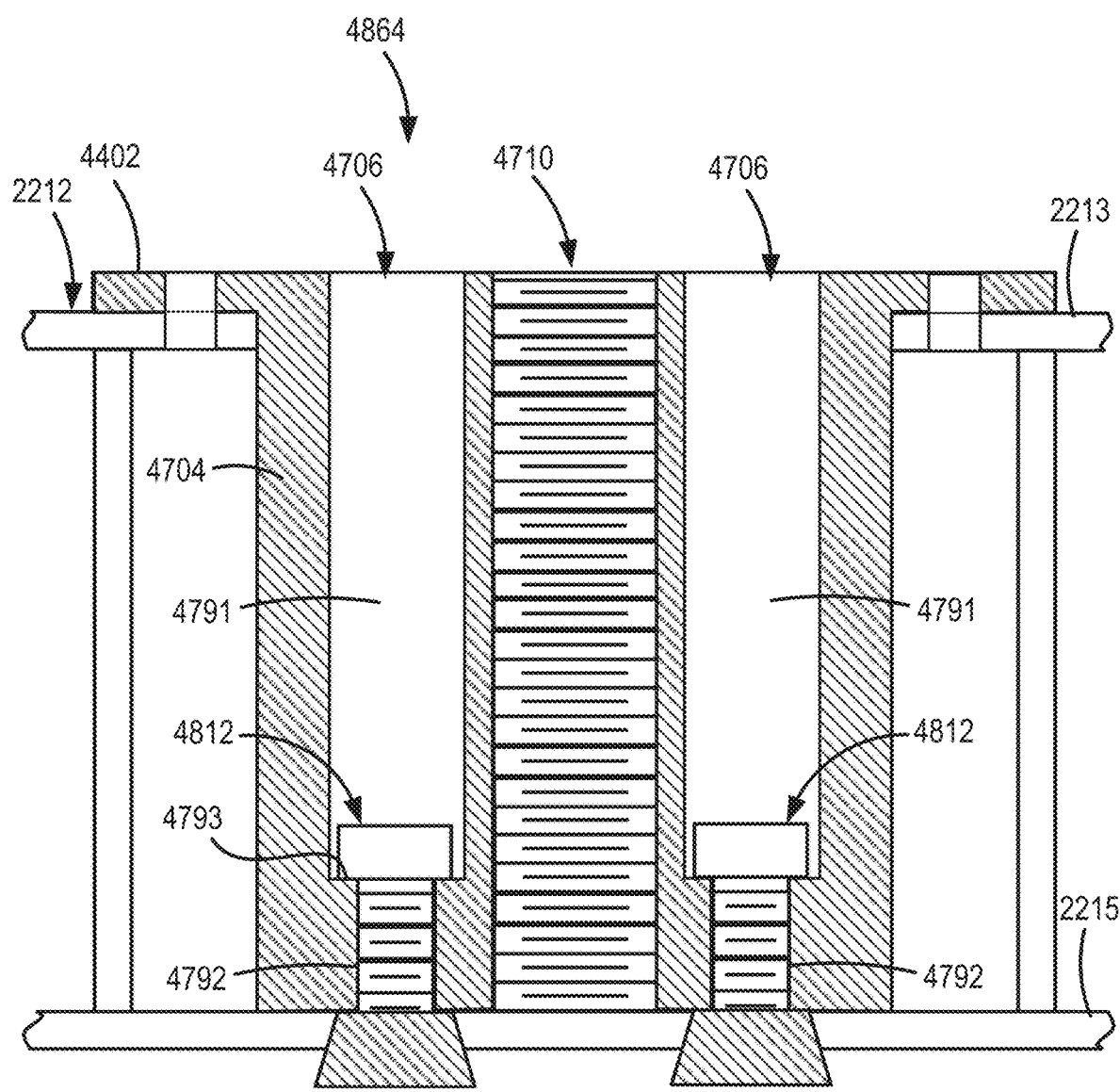
FIG. 48 is a schematic view of a one-piece platform fitting installed onto an aerial delivery platform panel using expansion features, in accordance with various embodiments.

With reference to FIG. 48, a fitting 4864 is illustrated installed and secured to the platform panel 2212. With respect to FIG. 48, elements with like element numbering, as depicted in FIG. 47, are intended to be the same and will not necessarily be repeated for the sake of clarity. Unlike the fitting 4764 of FIG. 47, the fitting 4864 can be coupled to the platform panel 2212 using expansion features 4812. The expansion features 4812 can be similar to those described with respect to FIG. 49A and FIG. 49B herein. The expansion features 4812 can be inserted into the apertures 4706 and secured to the second skin 2215 without having to access the platform from the bottom side (e.g., only access from one side (e.g., the top side) of the fitting is necessary to install the fitting 4864). It should be understood that although described herein as being installed from a top surface, the fittings of the present disclosure can be installed from a bottom surface and vice versa (i.e., the orientation can be reversed).

Figures 49A, 49B:
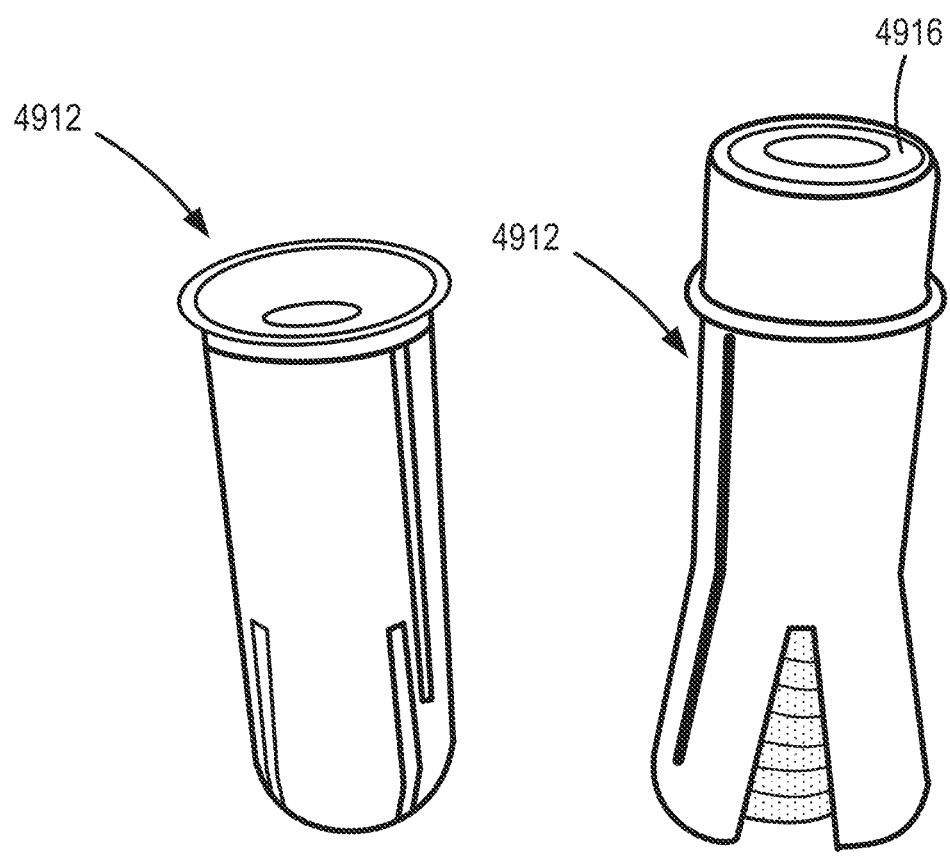
FIG. 49A is a perspective view of an example expansion feature in a non-expanded state, in accordance with various embodiments.
FIG. 49B is a perspective view of the expansion feature of FIG. 47A in an expanded state, in accordance with various embodiments.

With reference to FIG. 49A, an example expansion feature 4912 is illustrated in a non-expanded state.

With reference to FIG. 49B, the expansion feature 4912 is illustrated in an expanded state with a threaded fastener 4916 (e.g., a bolt) threaded into the expansion feature 4912. The expansion feature 4912 can expand as the threaded fastener 4916 is tightened into the threaded fastener 4916, in accordance with various embodiments.

FIG. 50A illustrates a section view of a reinforcement plate 5021 installed to the platform panel 2212. The reinforcement plate 5021 (also referred to as a nut plate) can be a rigid plate having two holes in it. A first hole 5002 is threaded to accept a threaded fastener, such as a bolt for example. A second hole 5004 is used to secure the reinforcement plate 5021 to the bottom of the first skin 2213 (e.g., a top skin) with an expanding fastener, such as a blind/pop rivet. However, the rivet could be replaced with a threaded fastener, such as a screw. Unless the reinforcement plate 5021 is installed during the original panel assembly process, the panel end caps must be removed to allow for its installation. If the panels have already been incorporated into an aerial delivery platform, then the platform side rails must be removed before the end caps can be removed. Accordingly, if the reinforcement plate 5021 is not installed during the initial assembly process, installing the reinforcement plate 5021 becomes a time consuming and expensive process.

The reinforcement plate 5021 can have a threaded aperture 5010. The threaded aperture 5010 can be configured to receive a primary fastener (e.g., see primary fastener 4114 of FIG. 43B) to secure an item to be installed on the platform panel 2212.

FIG. 50B shoes a perspective view of the reinforcement plate 5021.

Figure 51A:
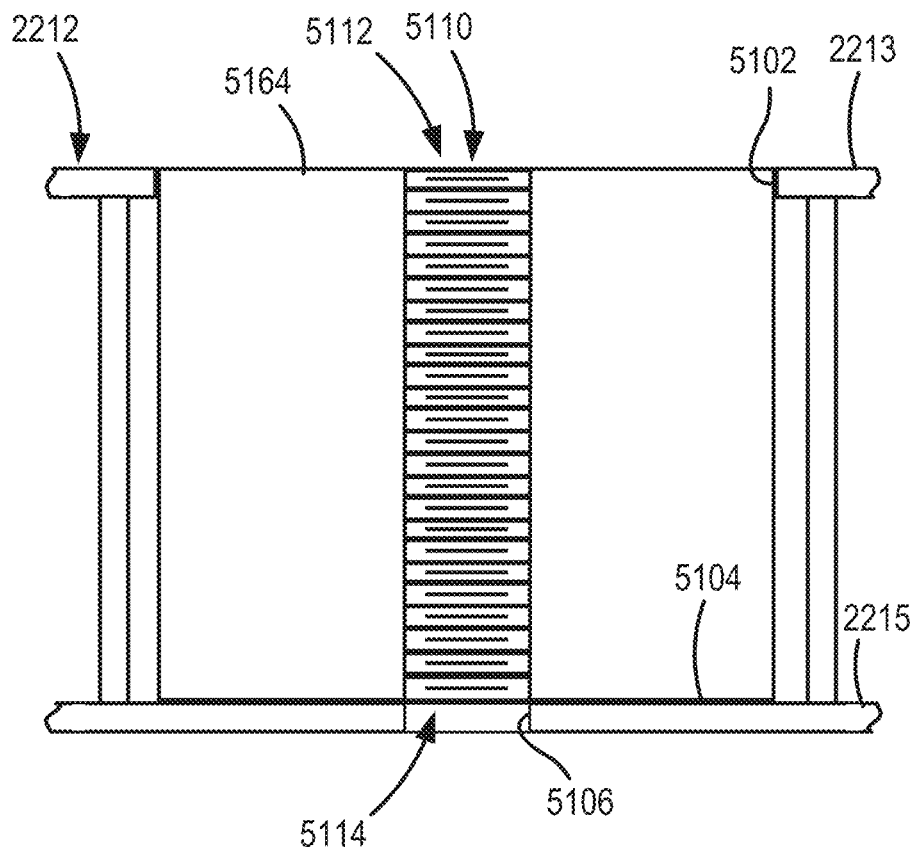
FIG. 51A is a schematic view of a fitting installed onto an aerial delivery platform panel, in accordance with various embodiments.

With reference to FIG. 51, illustrates a section view of a fitting 5164 installed to the platform panel 2212. The fitting 5164 can be designed to sidestep the time consuming installation process of the reinforcement plate 5021 in the event the panel has already been assembled. For example, the fitting 5164 can be installed through an aperture 5102 disposed in the first skin 2213. The fitting 5164 can come to rest on an internal surface 5104 of the second skin 2215. The installation process of fitting 5164 can be easily accomplished at nearly any time after the platform panel 2212 has been fabricated, including after the platform panel 2212 has been incorporated into a platform assembly. The fitting 5164 can be secured to the second skin 2215 through an aperture 5106 in the second skin 2215. For example, a fastener, such as an expanding fastener or a bolt, can be moved through the aperture 5106 into the fitting 5164.

The fitting 5164 can have a threaded aperture 5110. The threaded aperture 5110 can be configured to receive a primary fastener (e.g., see primary fastener 4114 of FIG. 43B) to secure an item to be installed on the platform panel 2212. The threaded aperture 5110 can be configured to receive a fastener to secure the fitting 5164 to the second skin, for example as illustrated in FIG. 46 or FIG. 47.

The fitting 5164 can be received through the aperture 5102 in the first skin 2213 and extending between and to the first skin 2213 and the second skin 2215. The fitting 5164 can include a first opening 5112 at a first end thereof configured to receive a first fastener (e.g., the primary fastener) to secure an item to the platform panel 2212 and a second opening 5114 configured to receive a second fastener through the second skin 2215 to secure the fitting to the second skin 2215.

Figure 51B:
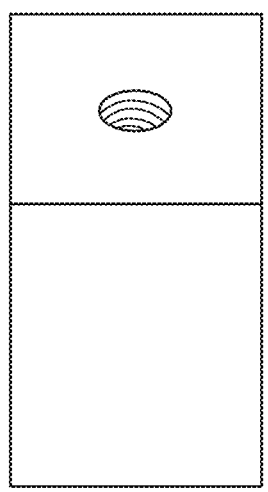
FIG. 51B and FIG. 51C are perspective views of example fittings of FIG. 51A, in accordance with various embodiments.
Figure 51C:
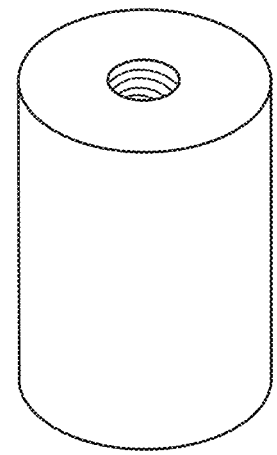

The fitting 5164 can be made as a rectangular fitting as illustrated in FIG. 51B, in accordance with various embodiments. The fitting 5164 can be made as a cylindrical fitting as illustrated in FIG. 51C, in accordance with various embodiments. The shape and size of the aperture 5102 can correspond to the shape and size of the fitting 5164.

Principles of the present disclosure may be compatible with and/or utilize certain components or techniques disclosed in other U.S. Patents and/or U.S. Patent applications, including but not limited to: (i) U.S. Pat. No. 9,789,968 to Fox entitled "RING RELEASE SYSTEM AND METHODS"; (ii) U.S. Pat. No. 9,452,842 to Fox entitled "PARACHUTE CANOPY INSERT"; (iii) U.S. Pat. No. 9,399,514 to Fox entitled "AERIAL DELIVERY SYSTEM WITH MUNITION ADAPTER AND LATCHING RELEASE"; (iv) U.S. Pat. No. 8,864,080 to Fox entitled "EXPENDABLE AERIAL DELIVERY SYSTEM"; (v) U.S. Pat. No. 8,851,426 to Fox entitled "ENHANCED CRUCIFORM PARACHUTE"; (vi) U.S. Pat. No. 8,313,063 to Fox entitled "PARACHUTE RELEASE SYSTEM AND METHOD"; (vii) U.S. Pat. No. 8,210,479 to Fox entitled "PARACHUTE INLET CONTROL SYSTEM AND METHOD"; (viii) U.S. Pat. No. 8,096,509 to Fox entitled "AERIAL DELIVERY SYSTEM"; (ix) U.S. Pat. No. 8,083,104 to Fox entitled "AERIAL DELIVERY SYSTEM"; (x) U.S. Pat. No. 7,967,254 to Fox entitled "SLING RELEASE MECHANISM"; (xi) U.S. Pat. No. 7,264,205 to Fox entitled "PARACHUTE RELEASE APPARATUS"; (xii) U.S. Pat. No. 7,261,258 to Fox entitled "CRUCIFORM PARACHUTE DESIGN"; (xiii) U.S. Pat. No. 6,994,295 to Fox entitled "QUONSET TYPE PARACHUTE"; (xiv) U.S. Pat. No. 6,843,451 to Fox entitled "PARACHUTE SLIDER REEFING WITH FRICTION INDUCED RETARDATION"; (xv) U.S. Pat. No. 6,290,177 to Fox entitled "BI-DIRECTIONAL PILOT PARACHUTE RELEASE ASSEMBLY"; (xvi) U.S. Pat. No. 10,689,123 to Fox entitled "PARACHUTE INLET CONTROL SYSTEM AND METHOD", (xvii) U.S. Provisional Patent Application No. 63/624,871 filed on Jan. 25, 2024 and entitled "PARACHUTE SLIDER REEFING SYSTEMS AND METHODS", and (xviii) U.S. patent application Ser. No. 18/830,179 filed on Sep. 11, 2024 and entitled "MIDAIR ITEM DISPENSER SYSTEMS AND METHODS". Each of the foregoing are hereby incorporated by reference in their entireties for all purposes (but except for any subject matter disclaimers or disavowals, and except to the extent that the incorporated material is inconsistent with the express disclosure herein, in which case the language in this disclosure shall control)

In an exemplary embodiment, an aerial delivery apparatus comprises: a platform including a platform panel extending laterally between and to a first side rail and a second side rail; a plurality of crossbars extending laterally between and to the first side rail and the second side rail, and each crossbar extends over the platform panel; and an adapter mounted to the platform via the first side rail and the second side rail, the adapter includes a plurality of anchor points whereby a parachute system is configured to be attached to the platform, and the adapter includes a plurality of notches configured to accommodate the plurality of crossbars.

The aerial delivery apparatus may further comprise a fitting configured to be received at least partially into a slot disposed in the first side rail, and the slot extends longitudinally along the first side rail. The fitting may comprise a "T" shape. The platform panel may include a first skin, a second skin, and a plurality of support ribs extending between the first skin and the second skin; and a channel at least partially defined by, and located between, a first support rib of the plurality of support ribs and a second support rib of the plurality of support ribs, and the channel may be at least partially further defined by, and located between, the first skin and the second skin. The aerial delivery apparatus may further comprise a reinforcement plate located in the channel, and the crossbar may be coupled to the first skin via the reinforcement plate. The platform may include a plurality of platform panels disposed along a length of the platform, the plurality of platform panels includes the platform panel, and each platform panel may extend between and to the first side rail and the second side rail.

In an exemplary embodiment, a method of controlling an attitude of an aerial delivery apparatus may comprise: coupling a parachute to a parachute release mechanism; coupling a payload to the parachute release mechanism, deploying the payload from an aircraft; deploying the parachute; suspending the payload from the parachute via a first plurality of payload suspension straps; activating the parachute release mechanism to separate the parachute from the first plurality of payload suspension straps; and subsequent to activating the parachute release mechanism, suspending the payload from the parachute via a second plurality of payload suspension straps.

The method may further comprise rotating the payload between a first attitude and a second attitude in response to activating the parachute release mechanism. The first plurality of payload suspension straps may be attached to the payload at a different location from the second plurality of payload suspension straps.

In an exemplary embodiment, a two-piece fitting for an aerial delivery platform side rail comprises: a main fitting body having a first portion configured to be received into a side rail slot and a second portion configured to protrude from the side rail slot whereby an item can be secured to the aerial delivery platform side rail; and a locking body configured to engage the first portion of the main fitting body to lock the main fitting body and the locking body within the side rail slot.

The main fitting body may include a longitudinal keyway, and the locking body includes a protrusion configured to be received in the keyway. The keyway may have at least one of a semicircular geometry, a dovetail geometry, a partial dovetail geometry, or a rectangular geometry. The main fitting body may have a first fastener aperture, and the locking body may have a second fastener aperture, and the locking body may be configured to align with the main fitting body so that the first fastener aperture aligns with the second fastener aperture so as to receive a fastener therethrough.

In an exemplary embodiment, an aerial delivery system comprises: a platform panel including a first skin, a second skin, and a plurality of support ribs extending between and to the first skin and the second skin; and a spacer extending between and to the first skin and the second skin, the spacer including a first opening configured to receive a first fastener through the first skin and a second opening configured to receive a second fastener through the second skin.

The spacer may include a flange having a plurality of apertures disposed therein, whereby the spacer is attached to the first skin. The aerial delivery system may further include a reinforcement plate configured to be disposed between the second skin and at least a portion of the second fastener.

In an exemplary embodiment, a fitting for an aerial delivery platform comprises: a main body portion having a primary bore extending axially therethrough; a first flange disposed at a first end of the main body portion and configured to attach to a first skin of the aerial delivery platform; a fastening feature incorporated into a second end of the main body portion and configured to attach to a second skin of the aerial delivery platform; and the main body portion is configured to extend between and to the first skin and the second skin.

The primary bore may include a first portion configured to receive a portion of an item to be secured to the aerial delivery platform and a second portion configured to engage a primary fastener for securing the item to the fitting. The fitting may further comprise an aperture disposed in the main body portion for accommodating a tool for tightening the fastening feature.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, the terms "including," "comprising," "having," and variations thereof mean "including but not limited to" unless expressly specified otherwise. Accordingly, the terms "including," "comprising," "having," and variations thereof are intended to cover a non-exclusive inclusion, such that a process, method, article, or apparatus that comprises a list of elements does not include only those elements but may include other elements not expressly listed or inherent to such process, method, article, or apparatus. An enumerated listing of items does not imply that any or all the items are mutually exclusive and/or mutually inclusive, unless expressly specified otherwise.

Further, in the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Thus, when a particular feature, structure, or characteristic is described in connection with an embodiment, it is submitted that it is within the knowledge of one skilled in the art to affect such feature, structure, or characteristic in connection with other embodiments whether or not explicitly described. Similarly, the use of the term "implementation" means an implementation having a particular feature, structure, or characteristic described in connection with one or more embodiments of the present disclosure. Absent an express correlation to indicate otherwise, an implementation may be associated with one or more embodiments. After reading the description, it will be apparent to one skilled in the relevant art(s) how to implement the disclosure in alternative embodiments.

Reference throughout this specification to features, advantages, or similar language does not imply that all the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. No claim element is intended to invoke 35 U.S.C. 112(f) unless the element is expressly recited using the phrase "means for."

The scope of the disclosure is to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. Further, the term "plurality" can be defined as "at least two." As used herein, the phrase "at least one of", when used with a list of items, means different combinations of one or more of the listed items may be used and only one of the items in the list may be needed. The item may be a particular object, thing, or category. Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A, B, and C. In some cases, "at least one of item A, item B, and item C" or "at least one of item A, item B, or item C" may mean, for example, without limitation, two of item A, one of item B, and ten of item C; four of item B and seven of item C; or some other suitable combination.

All ranges and ratio limits disclosed herein may be combined. Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Different cross-hatching may be used throughout the figures to denote different parts but not necessarily to denote the same or different materials. Surface shading lines may be used throughout the figures to denote different parts or areas but not necessarily to denote the same or different materials. In some cases, reference coordinates may be specific to each figure. Furthermore, the connecting lines shown in the various figures contained herein are intended to represent exemplary functional relationships and/or physical couplings between the various elements. It should be noted that many alternative or additional functional relationships or physical connections may be present in a practical system.

Any reference to attached, fixed, connected or the like may include permanent, removable, temporary, partial, full and/or any other possible attachment option. Additionally, any reference to without contact (or similar phrases) may also include reduced contact or minimal contact. In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The schematic flow chart diagrams included herein are generally set forth as logical flow chart diagrams. As such, the depicted order and labeled steps are indicative of one or more embodiments of the presented method. The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Furthermore, no element, component, or method step in the present disclosure is intended to be dedicated to the public regardless of whether the element, component, or method step is explicitly recited in the claims.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An aerial delivery apparatus comprising:
    a platform including a panel extending laterally between and to a first side rail and a second side rail, the first side rail defines a slot extending longitudinally along the first side rail;
    a side rail fitting received at least partially into the slot, the side rail fitting includes a first aperture and a second aperture, the first aperture extends laterally through the side rail fitting whereby the side rail fitting is configured to be secured to the first side rail; and
    an adapter mounted to the platform via the side rail fitting, the adapter includes:
        a plurality of anchor points whereby a parachute system is configured to be attached to the platform;
        a first side frame coupled to the first side rail and extending vertically from the platform;
        a second side frame coupled to the second side rail and extending vertically from the platform; and
        a rear frame extending between and to the first side frame and the second side frame.

2. The aerial delivery apparatus of claim 1, wherein the first side frame includes a first anchor point of the plurality of anchor points and a second anchor point of the plurality of anchor points whereby the platform is configured to be suspended from the parachute system.

3. The aerial delivery apparatus of claim 2, wherein the second side frame includes a third anchor point of the plurality of anchor points and a fourth anchor point of the plurality of anchor points whereby the platform is configured to be suspended from the parachute system.

4. The aerial delivery apparatus of claim 3, wherein the first side frame is configured to transfer a first parachute force into the first side rail and the second side frame is configured to transfer a second parachute force into the second side rail.

5. The aerial delivery apparatus of claim 4, wherein a total height of the first side frame is at least ten times greater than a total thickness of the platform.

6. The aerial delivery apparatus of claim 1, wherein each of the first side frame and the second side frame comprise at least one of a triangular geometry or a rectangular geometry.

7. The aerial delivery apparatus of claim 6, wherein the rear frame comprises a rectangular geometry.

8. The aerial delivery apparatus of claim 1, wherein the first side rail extends longitudinally between and to a first end of the platform and a second end of the platform.

9. The aerial delivery apparatus of claim 1, wherein the side rail fitting further includes:
  a first portion disposed in the slot, the first aperture is disposed in the first portion; and
  a second portion extending from the first portion and protruding from the slot, the second aperture is disposed in the second portion and the adapter is mounted to the side rail fitting via the second aperture.

10. The aerial delivery apparatus of claim 9, wherein the second aperture is oriented at least one of longitudinally, laterally, or vertically within the second portion of the side rail fitting.

11. The aerial delivery apparatus of claim 1, wherein the platform comprises a first surface facing a first direction, the slot comprises an opening facing the first direction, and the first side rail includes a first wall and a second wall at least partially defining the slot.

12. The aerial delivery apparatus of claim 11, wherein the first surface is a top surface of the platform.

13. The aerial delivery apparatus of claim 1, wherein the adapter further includes a cross member extending between and to a top side of the first side frame and a top side of the second side frame.

14. The aerial delivery apparatus of claim 1, further comprising a parachute compartment coupled to the adapter, the parachute compartment includes a rear-facing opening whereby a parachute is configured to exit the parachute compartment.

15. The aerial delivery apparatus of claim 14, wherein the aerial delivery apparatus is configured to receive a payload between the parachute compartment and the platform.

16. The aerial delivery apparatus of claim 1, further comprising a plurality of roller pads disposed on a bottom surface of the platform.

17. The aerial delivery apparatus of claim 1, wherein:
  the panel comprises a first skin, a second skin, a plurality of support ribs extending between and to the first skin and the second skin, and an aperture disposed in the first skin; and
  the aerial delivery apparatus further comprises a platform fitting received through the aperture in the first skin and extending between and to the first skin and the second skin, the platform fitting including a first opening at a first end thereof configured to receive a first fastener to secure an item to the platform panel and a second opening configured to receive a second fastener through the second skin to secure the platform fitting to the second skin.

18. An aerial delivery apparatus comprising:
  a platform including a panel extending laterally between and to a first side rail and a second side rail, the panel includes a first skin, a second skin, a plurality of support ribs extending between and to the first skin and the second skin, and an aperture disposed in the first skin;
  a platform fitting received through the aperture in the first skin and extending between and to the first skin and the second skin, the platform fitting including a first opening at a first end thereof configured to receive a first fastener to secure an item to the panel and a second opening configured to receive a second fastener through the second skin to secure the platform fitting to the second skin; and
  an adapter mounted to the platform via a side rail fitting, the adapter includes:
    a plurality of anchor points whereby a parachute system is configured to be attached to the platform;
    a first side frame coupled to the first side rail and extending vertically from the platform;
    a second side frame coupled to the second side rail and extending vertically from the platform; and
    a rear frame extending between and to the first side frame and the second side frame.

* * * * *